United States Patent
Cardemon et al.

(10) Patent No.: US 7,029,209 B2
(45) Date of Patent: Apr. 18, 2006

(54) SLIDABLE BORING TOOL WITH FINE ADJUSTMENT

(75) Inventors: Richard A. Cardemon, Muncie, IN (US); Joseph Baker, Farmland, IN (US)

(73) Assignee: Cardemon, Inc., Muncia, IN (US)

(*) Notice: Subject to any disclaimer, the term of this patent is extended or adjusted under 35 U.S.C. 154(b) by 0 days.

(21) Appl. No.: 10/424,652

(22) Filed: Apr. 25, 2003

(65) Prior Publication Data

Related U.S. Application Data

(63) Continuation-in-part of application No. 10/023,243, filed on Dec. 18, 2001, now Pat. No. 6,705,184.

(60) Provisional application No. 60/256,371, filed on Dec. 18, 2000, provisional application No. 60/270,723, filed on Feb. 22, 2001.

(51) Int. Cl.
*B23B 35/00* (2006.01)

(52) U.S. Cl. ............... 408/1 R; 408/143; 408/158; 408/179; 82/1.11; 82/1.4

(58) Field of Classification Search .......... 82/1.11, 82/1.2, 1.4; 408/1 R, 18, 143, 179, 155, 408/172, 158, 168, 169
See application file for complete search history.

(56) References Cited

U.S. PATENT DOCUMENTS

| 560,050 | A |   | 5/1896  | Stone   |         |
|---------|---|---|---------|---------|---------|
| 1,468,827 | A |   | 9/1923  | Morris  |         |
| 1,684,772 | A |   | 9/1928  | Manning |         |
| 2,178,384 | A | * | 10/1939 | Kyle    | 408/169 |
| 2,215,344 | A |   | 9/1940  | Albrecht |        |
| 2,223,041 | A |   | 11/1940 | Maxwell |         |
| 2,227,085 | A |   | 12/1940 | Hassig  |         |
| 2,319,467 | A |   | 5/1943  | Morgan  |         |
| 2,338,073 | A |   | 12/1943 | Behr    |         |
| 2,365,648 | A |   | 12/1944 | Rossmann |        |
| 2,441,158 | A |   | 5/1948  | Krasnow |         |
| 2,457,040 | A | * | 12/1948 | Penn-Gaskell | 82/1.2 |

(Continued)

FOREIGN PATENT DOCUMENTS

CH 242891 6/1946

(Continued)

OTHER PUBLICATIONS

1 English abstract of DE 4022579.

(Continued)

*Primary Examiner*—Daniel W. Howell
(74) *Attorney, Agent, or Firm*—John V. Daniluck; Woodard, Emhardt, Moriarty, McNett & Henry LLP

(57) ABSTRACT

Methods and apparatus for fine adjustment of the position of the cutting tool. In one embodiment, a boring tool includes a coupling member driven by a CNC boring machine, a cutting tool which is slidably coupled to the coupling member, and a slidable adjustment member. A frictional force resists sliding movement of the cutting tool. The frictional force is sufficient to retain the position of the cutting tool during machining operations. However, the frictional force is insufficient to resist an adjusting force applied by the adjustment member. Sliding motion of the adjustment, either by pulling or pushing it, results in movement of the cutting tool. In one embodiment, the cutting tool and the adjustment member are slidable in different directions. In another embodiment, the boring tool is adapted and configured to convert a first, greater amount of movement by the adjustment member to a second, lesser amount of movement by the cutting tool.

42 Claims, 69 Drawing Sheets

U.S. PATENT DOCUMENTS

| | | |
|---|---|---|
| 2,458,753 A | 1/1949 | Wallace |
| 2,495,583 A | 1/1950 | Heron |
| 2,716,360 A | 8/1955 | Cogsdill et al. |
| 2,878,696 A | 3/1959 | Busch |
| 2,945,426 A | 7/1960 | Buchan |
| 2,953,950 A | 9/1960 | Briney, Jr. et al. |
| 3,148,561 A | 9/1964 | Krampert |
| 3,154,974 A | 11/1964 | Greenleaf |
| 3,159,060 A | 12/1964 | Miles |
| 3,274,861 A | 9/1966 | Czubak |
| 3,313,187 A | 4/1967 | Benjamin et al. |
| 3,364,799 A | 1/1968 | Benjamin et al. |
| 3,542,528 A | 11/1970 | Bech |
| 3,606,561 A | 9/1971 | Davis |
| 3,647,307 A | 3/1972 | Kosker |
| 3,700,346 A | 10/1972 | Eckle |
| 3,740,160 A * | 6/1973 | Kimura et al. ............ 408/2 |
| 3,749,508 A | 7/1973 | Schukrafft |
| 3,753,625 A | 8/1973 | Fabrizio et al. |
| 3,795,160 A | 3/1974 | Janlszewski |
| 3,814,535 A | 6/1974 | Steiner |
| 3,854,839 A | 12/1974 | Gottelt |
| 3,877,832 A | 4/1975 | Benjamin |
| 3,963,366 A | 6/1976 | Eckle et al. |
| 4,010,677 A | 3/1977 | Hirakawa et al. |
| 4,022,539 A | 5/1977 | Peuterbaugh |
| 4,097,181 A | 6/1978 | Fisher |
| 4,161,127 A | 7/1979 | Tiffin |
| 4,162,643 A | 7/1979 | Coburn |
| 4,163,624 A | 8/1979 | Eckle |
| 4,170,159 A | 10/1979 | McNally |
| 4,184,391 A | 1/1980 | Eckle |
| 4,188,846 A | 2/1980 | Jones et al. |
| 4,227,841 A | 10/1980 | Hoover |
| 4,230,429 A | 10/1980 | Eckle |
| 4,237,761 A | 12/1980 | Coburn |
| 4,243,348 A | 1/1981 | Paige |
| 4,250,775 A * | 2/1981 | Jerue et al. ............ 82/1.11 |
| 4,269,097 A | 5/1981 | Linn |
| 4,306,473 A | 12/1981 | Eckle et al. |
| 4,334,807 A | 6/1982 | Nessel |
| 4,353,670 A | 10/1982 | Jorgensen |
| 4,354,305 A * | 10/1982 | Plummer et al. ............ 483/31 |
| 4,396,320 A | 8/1983 | Bellmann et al. |
| 4,432,258 A | 2/1984 | Currer |
| 4,443,138 A | 4/1984 | Butera |
| 4,451,185 A * | 5/1984 | Yamakage ............ 408/2 |
| 4,467,679 A | 8/1984 | Johne et al. |
| 4,489,629 A | 12/1984 | D'Andrea et al. |
| 4,500,233 A | 2/1985 | Dehn |
| 4,507,850 A * | 4/1985 | Kielma ............ 483/11 |
| 4,508,475 A | 4/1985 | Peuterbaugh |
| 4,553,884 A | 11/1985 | Fitzgerald et al. |
| 4,576,068 A | 3/1986 | Glatthorn |
| 4,577,535 A | 3/1986 | Klabunde et al. |
| 4,581,811 A | 4/1986 | Eckle |
| RE32,211 E | 7/1986 | Jerue et al. |
| 4,611,958 A | 9/1986 | Vasilchenko |
| 4,612,831 A | 9/1986 | Lehmkuhl |
| 4,615,652 A | 10/1986 | Van Sickle et al. |
| 4,616,738 A | 10/1986 | Shurtliff |
| 4,617,846 A * | 10/1986 | Horsch ............ 82/1.2 |
| 4,621,548 A * | 11/1986 | Kubo et al. ............ 82/1.2 |
| 4,621,958 A | 11/1986 | Ewing |
| 4,628,779 A | 12/1986 | Louis |
| 4,634,324 A | 1/1987 | Eckle et al. |
| 4,646,603 A | 3/1987 | Held |
| 4,652,493 A | 3/1987 | Reichmann et al. |
| 4,653,360 A | 3/1987 | Compton |
| 4,684,301 A | 8/1987 | Eckle |
| 4,698,898 A | 10/1987 | Horsch |
| 4,708,543 A | 11/1987 | Plutschuck et al. |
| 4,714,389 A | 12/1987 | Johne |
| 4,714,390 A | 12/1987 | Eckle et al. |
| 4,719,690 A | 1/1988 | Eckle |
| 4,726,111 A | 2/1988 | Schweizer |
| 4,726,577 A | 2/1988 | Pontis |
| 4,742,738 A * | 5/1988 | Strand ............ 82/1.11 |
| 4,755,077 A | 7/1988 | Eckle |
| 4,772,163 A | 9/1988 | Scheer et al. |
| 4,773,290 A | 9/1988 | Iwata et al. |
| 4,778,313 A | 10/1988 | Lehmkuhl |
| 4,780,029 A | 10/1988 | Beck |
| 4,786,218 A | 11/1988 | Feuser |
| 4,790,221 A | 12/1988 | Iwata et al. |
| 4,793,750 A * | 12/1988 | Eckle ............ 409/231 |
| 4,813,828 A | 3/1989 | Beck et al. |
| 4,847,961 A | 7/1989 | Donovan et al. |
| 4,854,789 A | 8/1989 | Evseanko, Jr. |
| 4,863,324 A | 9/1989 | Blessing |
| 4,886,402 A | 12/1989 | Pfalzgraf |
| 4,890,592 A | 1/1990 | Furuyama et al. |
| 4,927,301 A | 5/1990 | Reiterman |
| 4,933,868 A | 6/1990 | McMurtry |
| 4,941,782 A | 7/1990 | Cook |
| 4,944,643 A | 7/1990 | Lehmkuhl |
| 4,954,022 A | 9/1990 | Underwood et al. |
| 4,976,574 A | 12/1990 | Muendlein et al. |
| 4,979,845 A | 12/1990 | Scheer et al. |
| 4,979,852 A | 12/1990 | Noggle |
| 5,025,693 A | 6/1991 | Tidland et al. |
| 5,066,178 A | 11/1991 | Peuterbaugh |
| 5,086,676 A * | 2/1992 | Gifford et al. ............ 82/1.11 |
| RE33,910 E | 5/1992 | Compton |
| 5,120,167 A * | 6/1992 | Simpson ............ 408/158 |
| 5,137,401 A | 8/1992 | Muendlein et al. |
| 5,154,551 A | 10/1992 | Noggle |
| 5,174,695 A | 12/1992 | Bathen et al. |
| 5,193,950 A | 3/1993 | Hunt |
| 5,211,088 A | 5/1993 | Gifford |
| 5,228,813 A | 7/1993 | Scheer et al. |
| 5,238,341 A | 8/1993 | Horsch |
| 5,246,414 A | 9/1993 | Hallbach |
| 5,297,055 A | 3/1994 | Johnstone |
| 5,297,464 A | 3/1994 | Mayer |
| 5,307,714 A | 5/1994 | Muendlein et al. |
| 5,316,417 A * | 5/1994 | Romi ............ 408/153 |
| 5,320,458 A | 6/1994 | Reiterman et al. |
| 5,325,751 A | 7/1994 | Green et al. |
| 5,327,350 A | 7/1994 | Endo |
| 5,336,026 A | 8/1994 | Noggle |
| 5,341,710 A | 8/1994 | Peuterbaugh |
| 5,344,260 A * | 9/1994 | Suzuki et al. ............ 408/168 |
| 5,346,335 A | 9/1994 | Harpaz et al. |
| 5,354,157 A | 10/1994 | Wells et al. |
| 5,394,335 A | 2/1995 | Rush |
| 5,415,066 A | 5/1995 | Erickson et al. |
| 5,421,681 A | 6/1995 | Stephens |
| 5,427,480 A | 6/1995 | Stephens |
| 5,454,667 A | 10/1995 | Cirino et al. |
| 5,482,417 A | 1/1996 | Erickson |
| 5,507,606 A | 4/1996 | Steiner |
| 5,516,242 A | 5/1996 | Andronica |
| 5,538,367 A | 7/1996 | Ashley et al. |
| 5,544,985 A | 8/1996 | Lane |
| 5,573,335 A | 11/1996 | Schinazi |
| 5,580,194 A | 12/1996 | Satran et al. |
| 5,611,651 A | 3/1997 | Wohlhaupter et al. |
| 5,639,194 A | 6/1997 | Harroun |
| 5,692,421 A | 12/1997 | Rohrberg |
| 5,697,271 A | 12/1997 | Friedman et al. |
| 5,704,250 A | 1/1998 | Black |
| 5,713,253 A | 2/1998 | Date et al. |
| 5,775,857 A | 7/1998 | Johne |

| | | |
|---|---|---|
| 5,788,428 A | 8/1998 | Ward et al. |
| 5,791,841 A | 8/1998 | Zones |
| 5,833,403 A | 11/1998 | Barazani |
| 5,836,727 A | 11/1998 | Scheer |
| 5,839,860 A | 11/1998 | Steiner |
| 5,848,860 A | 12/1998 | Steiner |
| 5,863,156 A | 1/1999 | Satran et al. |
| 5,927,911 A | 7/1999 | Steiner |
| 5,971,675 A | 10/1999 | Romi |
| 5,975,816 A | 11/1999 | Cook |
| 5,980,887 A | 11/1999 | Isner et al. |
| 5,992,199 A | 11/1999 | Giannetti |
| 6,013,016 A | 1/2000 | Irvine et al. |
| 6,033,167 A | 3/2000 | Bourgeois |
| 6,035,512 A | 3/2000 | Cook |
| 6,062,778 A | 5/2000 | Szuba et al. |
| 6,074,137 A | 6/2000 | Betman et al. |
| 6,077,003 A | 6/2000 | Laube |
| 6,082,236 A | 7/2000 | Andreassen |
| 6,109,841 A | 8/2000 | Johne |
| 6,109,842 A | 8/2000 | Cook |
| 6,128,985 A | 10/2000 | Muster et al. |
| 6,132,146 A | 10/2000 | Satran et al. |
| 6,134,996 A | 10/2000 | Scheer et al. |
| 6,158,311 A | 12/2000 | Watkins et al. |
| 6,163,950 A | 12/2000 | Bodiker, II et al. |
| 6,196,769 B1 | 3/2001 | Satran et al. |
| 6,196,773 B1 | 3/2001 | Hyatt et al. |
| 6,224,306 B1 | 5/2001 | Hiroumi et al. |
| 6,231,276 B1 | 5/2001 | Muller et al. |
| 6,231,282 B1 | 5/2001 | Yoneyama et al. |
| 6,315,503 B1 | 11/2001 | Oswald et al. |
| 6,354,772 B1 | 3/2002 | Mueller |
| 6,367,359 B1 | 4/2002 | Ropos |
| 6,394,710 B1 | 5/2002 | Kurz |
| 6,402,440 B1 | 6/2002 | Soma |
| 6,554,549 B1 * | 4/2003 | Kurz .................... 408/1 R |
| 6,575,675 B1 | 6/2003 | Larsen |
| 6,625,894 B1 | 9/2003 | Kovach et al. |
| 6,702,526 B1 | 3/2004 | Gamble et al. |
| 6,705,184 B1 * | 3/2004 | Cardemon et al. .......... 82/1.11 |
| 2001/0028832 A1 | 10/2001 | Soma |
| 2003/0129032 A1 | 7/2003 | Hyatt et al. |
| 2003/0180109 A1 | 9/2003 | Leuze et al. |

FOREIGN PATENT DOCUMENTS

| | | |
|---|---|---|
| DE | 1 028 853 | 4/1958 |
| DE | 2 025 006 | 4/1971 |
| DE | 2 012 643 101971 | 10/1971 |
| DE | 31 28 047 A1 | 1/1983 |
| DE | 32 45 195 A1 | 6/1984 |
| DE | 32 46 994 A1 | 6/1984 |
| DE | 4022579 A1 | 1/1991 |
| DE | 198 27 778 A1 | 12/1999 |
| EP | 0 070 488 A1 | 1/1983 |
| EP | 0 070 488 B1 | 1/1983 |
| EP | 0 382 474 A2 | 8/1990 |
| EP | 0 382 474 A3 | 8/1990 |
| EP | 0 382 474 B1 | 8/1990 |
| EP | 0 235 719 B1 | 1/1992 |
| EP | 0 383 458 B1 | 10/1993 |
| EP | 197 17 835 | 10/1998 |
| EP | 0 968 783 A1 | 1/2000 |
| EP | 0 988 910 A2 | 3/2000 |
| EP | 1 123 766 A1 | 8/2001 |
| EP | 1 291 104 A1 | 12/2003 |
| EP | 1 402 979 A1 | 3/2004 |
| FR | 967 093 | 10/1950 |
| FR | 1 038 110 | 9/1953 |
| GB | 391980 | 6/1933 |
| GB | 1573194 | 8/1980 |
| GB | 2131332 | 6/1984 |
| GB | 2 141 054 A | 12/1984 |
| GB | 2204513 A | 11/1988 |
| JP | 58-102610 A2 | 6/1983 |
| JP | 31960905 | 8/1991 |
| JP | 6-39602 | 2/1994 |
| JP | 8-71817 | 3/1996 |
| JP | 9-309002 A2 | 12/1997 |
| JP | 10-244401 A2 | 9/1998 |
| RU | 310737 | 10/1971 |
| RU | 510321 | 6/1976 |
| RU | 804220 | 2/1981 |
| SU | 931325 | 5/1982 |
| SU | 1144786 | 3/1985 |
| WO | WO 87/01319 | 12/1987 |
| WO | WO 89/08519 | 9/1989 |
| WO | WO 95/17275 | 6/1995 |
| WO | WO 95/29783 | 9/1995 |
| WO | WO 86/04842 | 8/1996 |
| WO | WO 97/17153 | 5/1997 |
| WO | WO 98/46964 | 5/1998 |
| WO | WO 00/02692 | 1/2000 |
| WO | WO 00/04243 | 1/2000 |
| WO | WO 00/07762 | 2/2000 |
| WO | WO 00/09282 | 2/2000 |
| WO | WO 00/37203 | 6/2000 |
| WO | WO 00/88305 | 9/2000 |
| WO | WO 00/25988 | 11/2000 |
| WO | WO 01/10585 | 2/2001 |
| WO | WO 01/16841 | 3/2001 |
| WO | WO 01/54849 | 8/2001 |
| WO | WO 02/070177 | 9/2002 |
| WO | WO 03/006195 | 1/2003 |

OTHER PUBLICATIONS

"A Word About Boring Heads", www.criterionmachineworks.com. 3 pages.

"Criterion Boring Heads," Information Sheet, www.criterionmachineworks.com/Pages/Tech/boringheadinfo.htm, 1 page, dated Nov. 24, 2003.

http://www.izstooling.com/howtheydo.asp, 1 page, dated Sep. 17, 2002.

http://www.itstooling.com/whattheydo.asp, 1 page, dated Nov. 22, 2003.

http://www.itstooling.com/main.asp?lang=eng, 1 page, dated Nov. 22, 2003.

http://www.itstooling.com/products/index.asp, 1 page, dated Nov. 22, 2003.

http://www.itstooling.com/products/prod_cbs_tseries.asp?id11, 2 pages, dated Nov. 22, 2003.

http://www.itstooling.com/products/prod_cbs_sseries.asp?=12, 2 pages, dated Nov. 22, 2003.

http://www.itstooling.com/products/prod_cbs_esseds.asp?id=13, 2 pages, dated. Nov. 22, 2003.

http://www.itstooling.com/products/prod_obs_micro.asp?=14, 2 pages, dated Nov. 22, 2003.

http://www.itstooling.com/images/tools/ch8_popuodia.gif, 1 page, dated Nov. 22, 2003.

http://www.itstooling.com/images/tools/ch16_popudia.gif, 1 page, dated Nov. 22, 2003.

http://www.itstooling.com/images/tools/ch26_popudia.gif, 1 page, dated Nov. 22, 2003.

http://www.itstooling.com/products/prod_bch.asp?id=16, 1 page, dated Nov. 22, 2003.

http://www.itstooling.com/images/tools.dia_ots_old.jph, 1 page, dated Nov. 22, 2003.

http://www.itstooling.com/products/prod_cts.asp?id=17, 1 page, dated. Nov. 22, 2003.

http://www.itstooling.com/images/tools/dia_cts_old.jpg, 1 page, dated Nov. 22, 2003.

http://www.itstooling.com/images/tools/dia_cts_old.jpg, 1 page, dated Nov. 22, 2003.

http://www.itstooling.com/company/index.asp, 1 page, dated Sep. 17, 2002.

http://www.itstooling.com/products/prod_ch.asp?=15, 1 page, dated Nov. 22, 2003.

" STARFLEX" Boring Tool Program Brochure, H.B. Rouse & Co., 2 pages.

Rakowski, Leo, "Boring Bar Adjusts in Cut", Modern Machine Shop, Sep. 2002, p. 63.

* cited by examiner

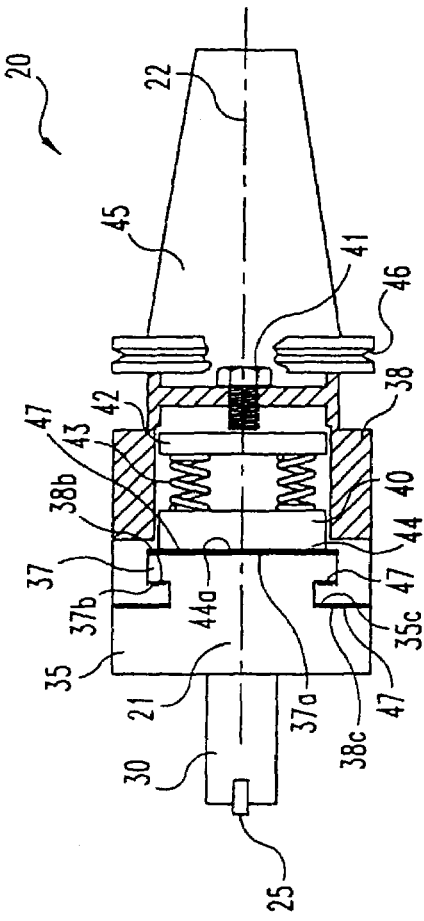
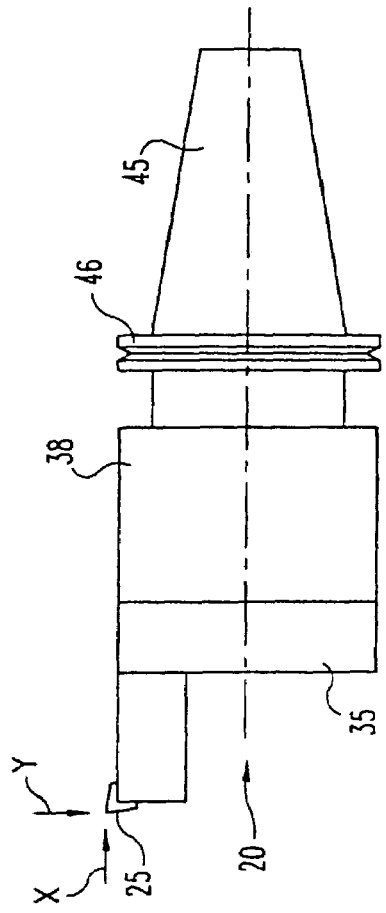
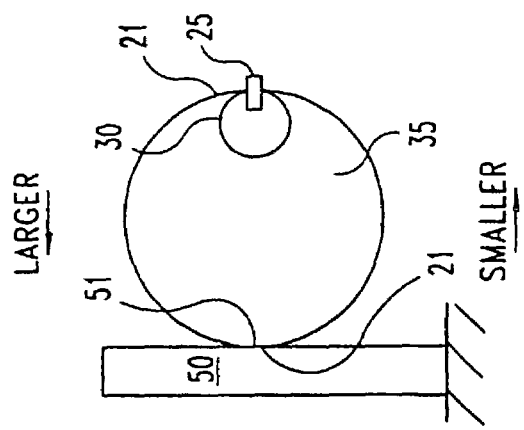

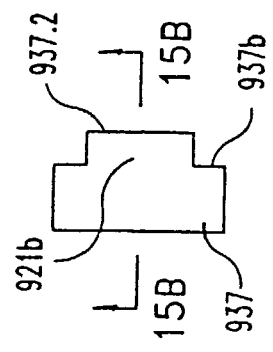
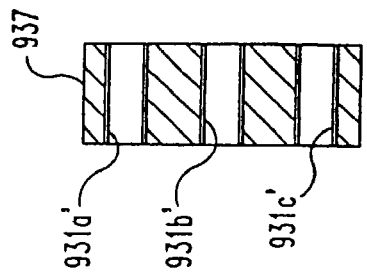
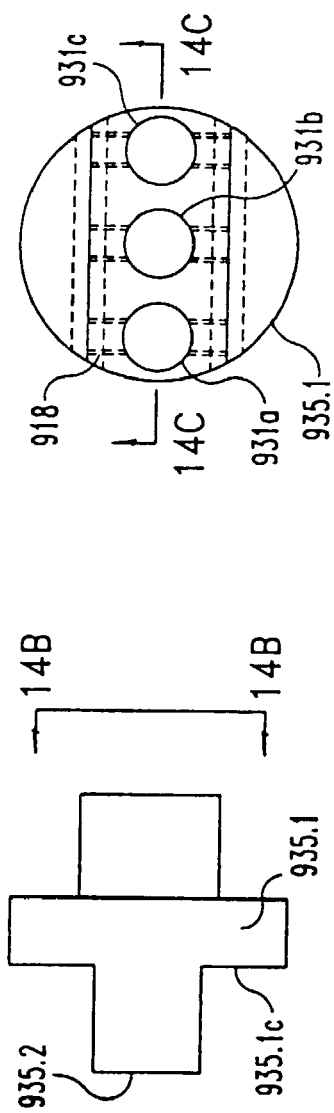
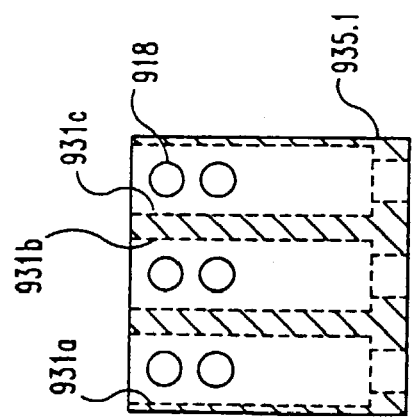

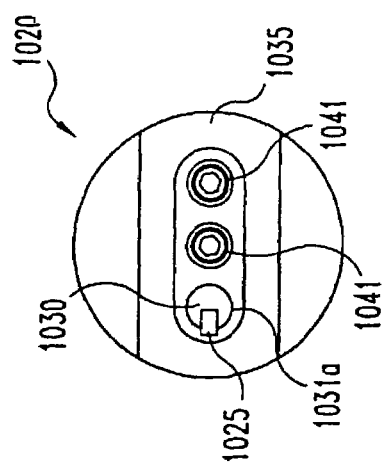
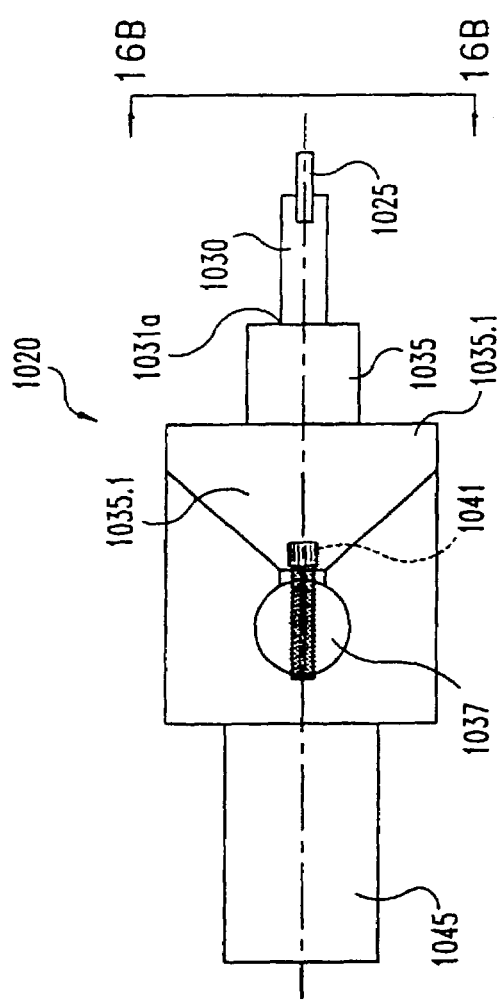
Fig. 16B
Fig. 16A

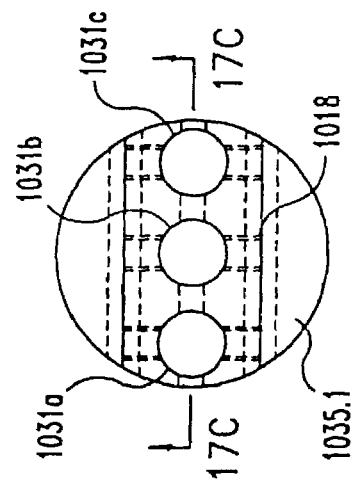
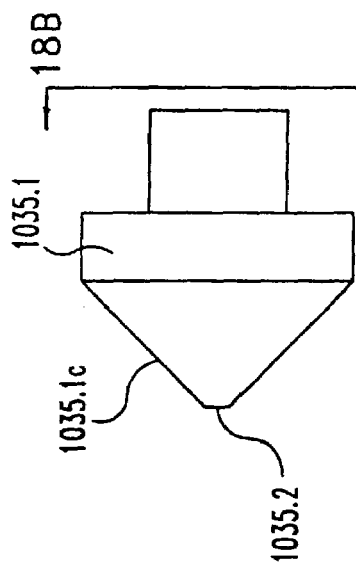
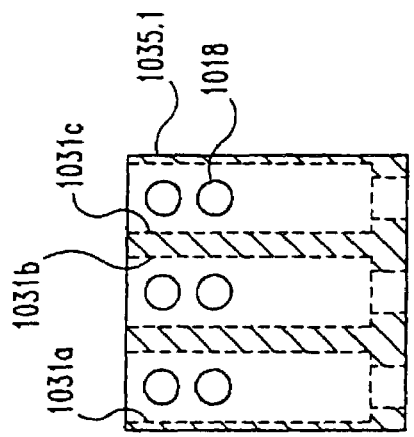
Fig. 18B
Fig. 18A
Fig. 18C

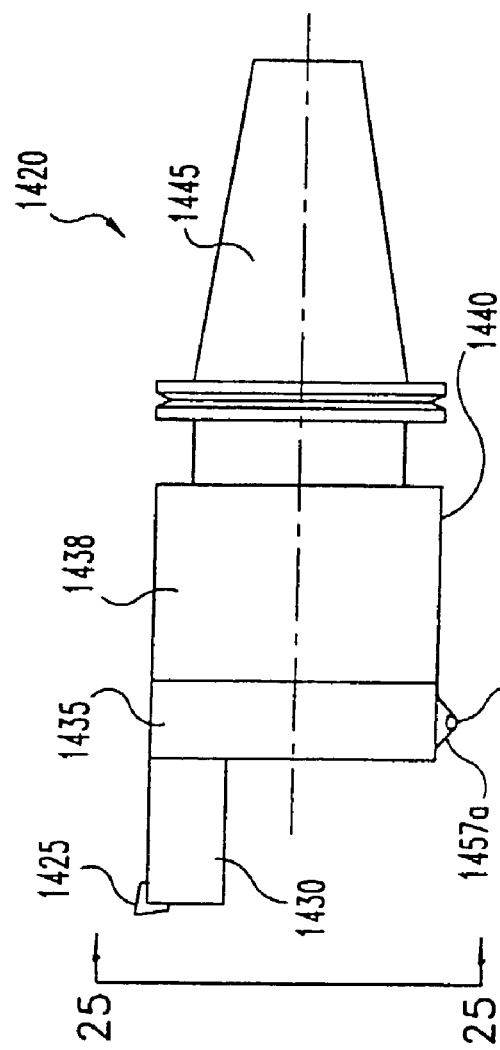
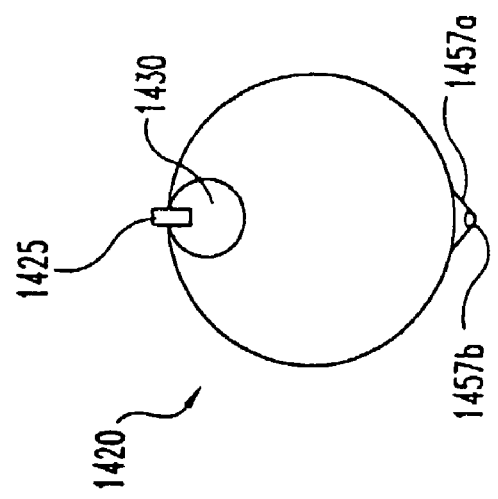

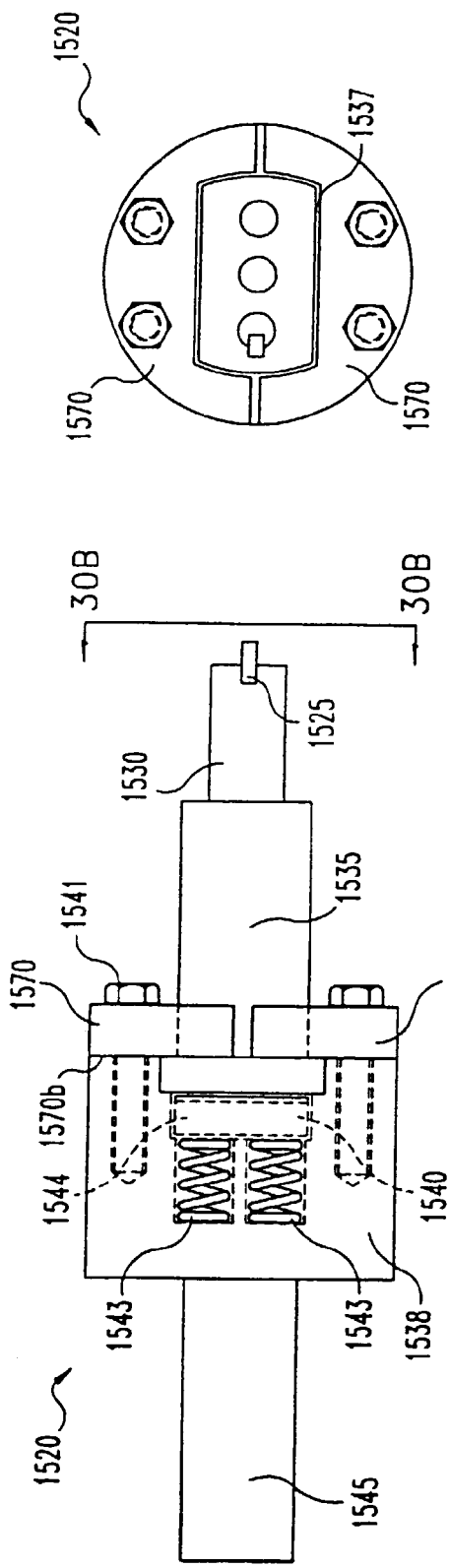
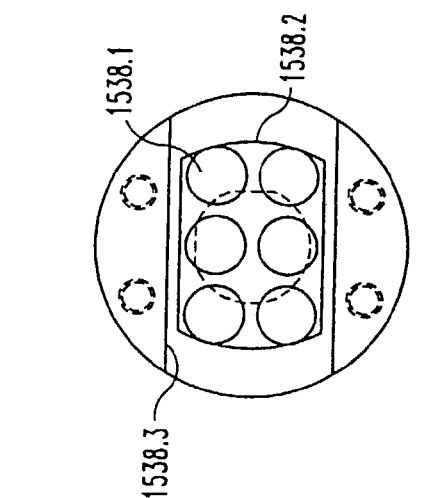
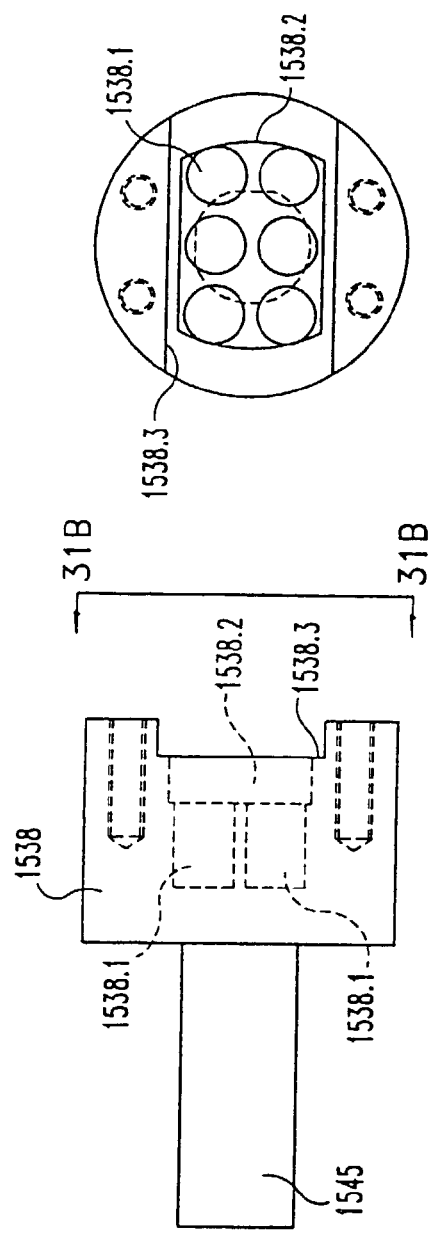
Fig. 30A
Fig. 30B
Fig. 31A
Fig. 31B

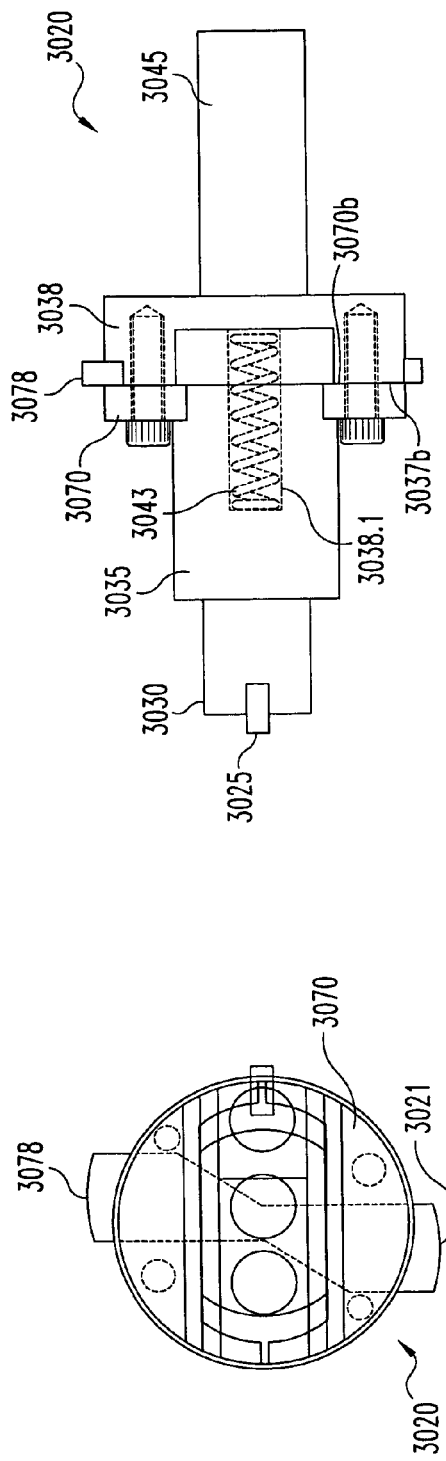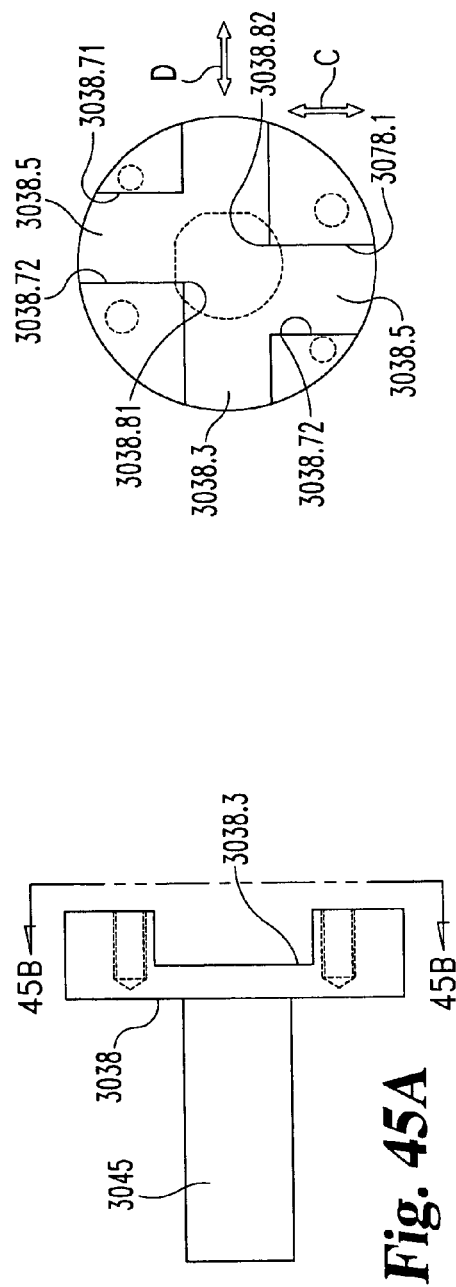

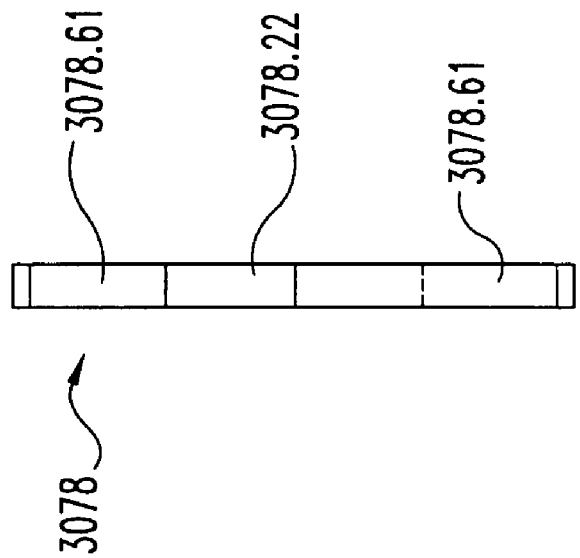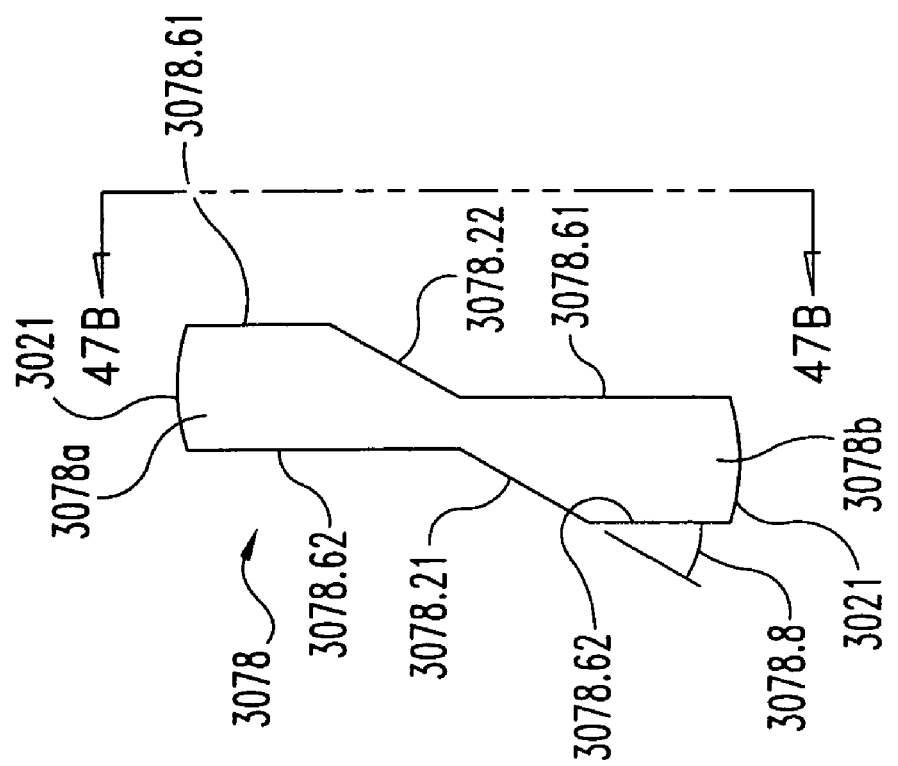

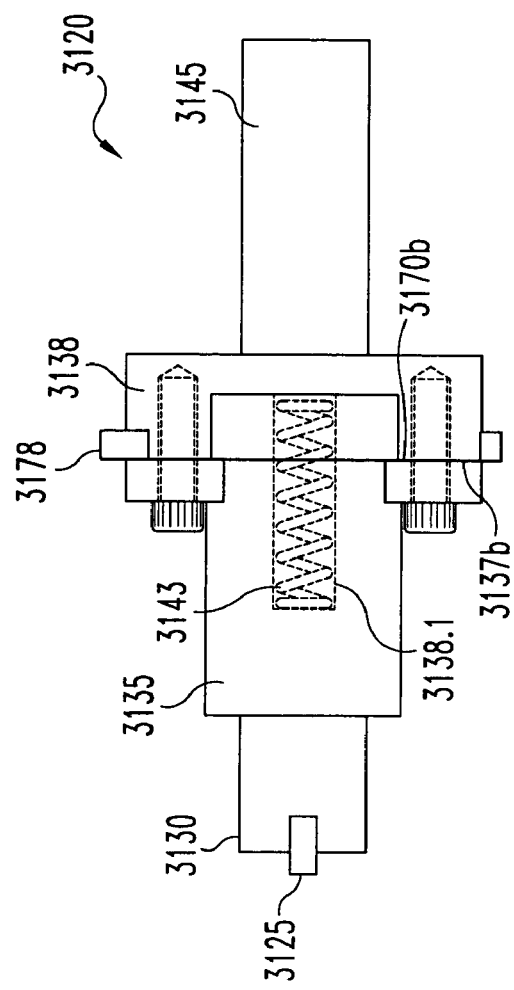
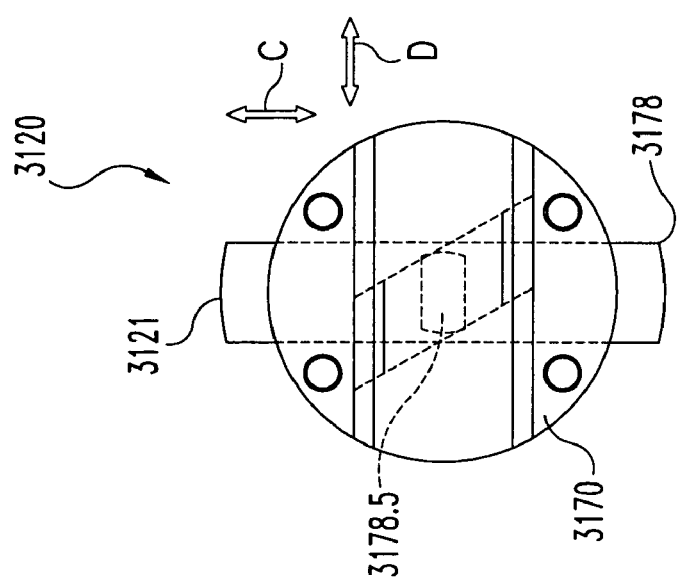
Fig. 49A
Fig. 49B

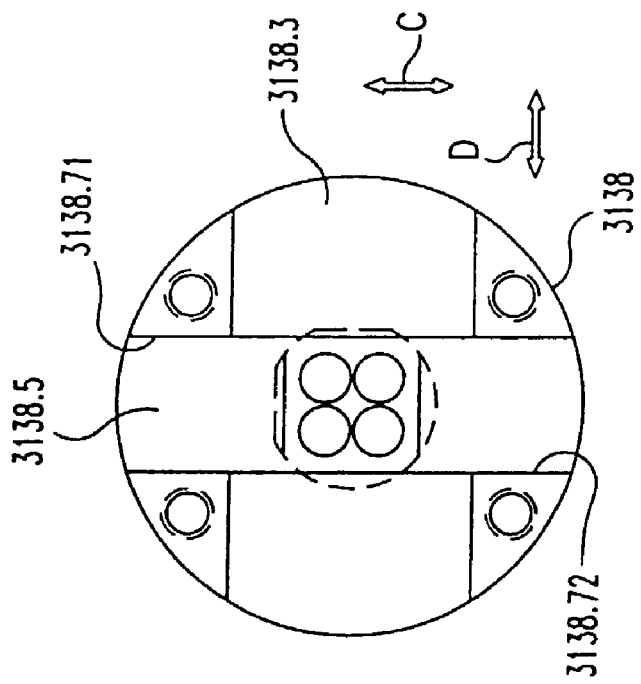
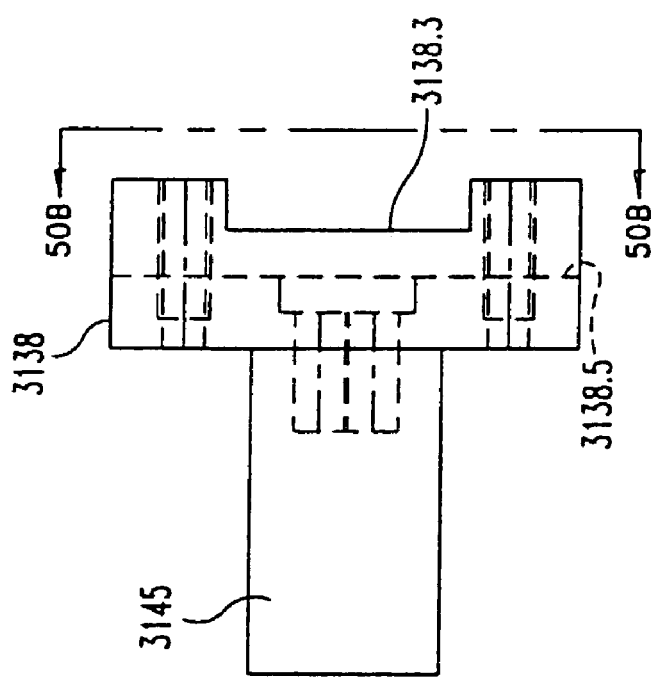
Fig. 50B
Fig. 50A

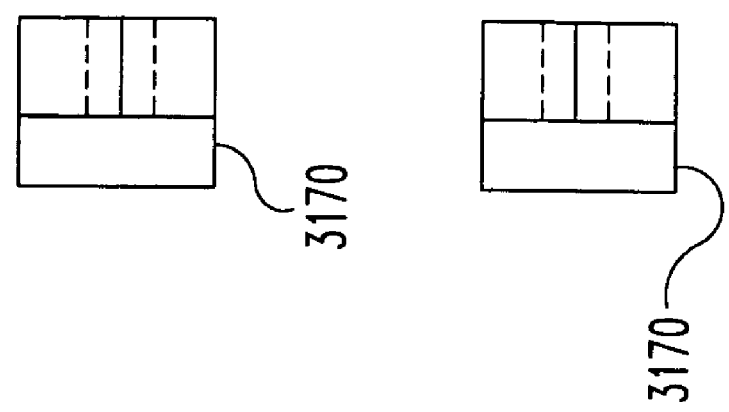
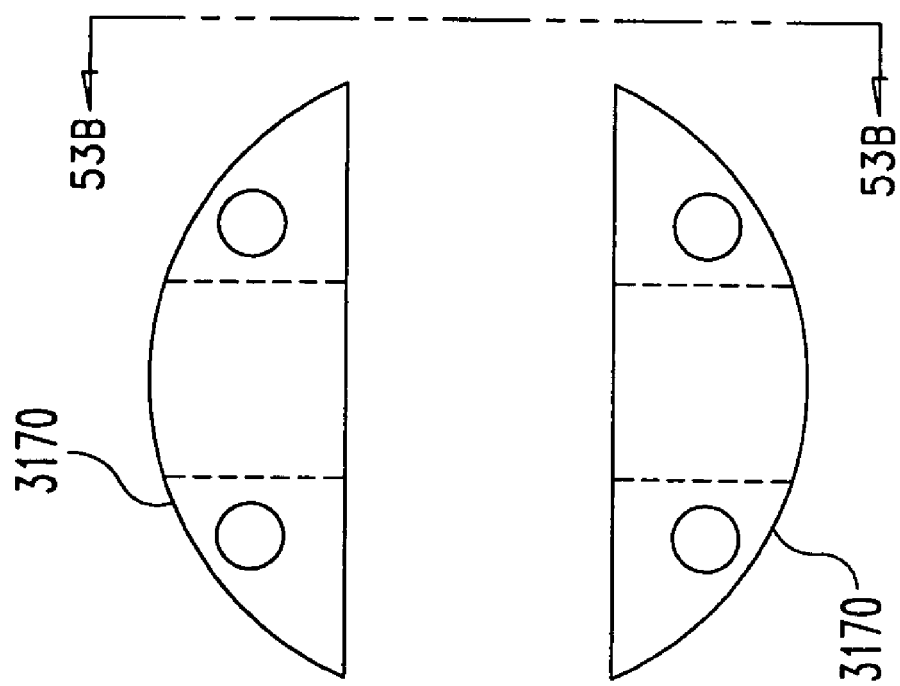

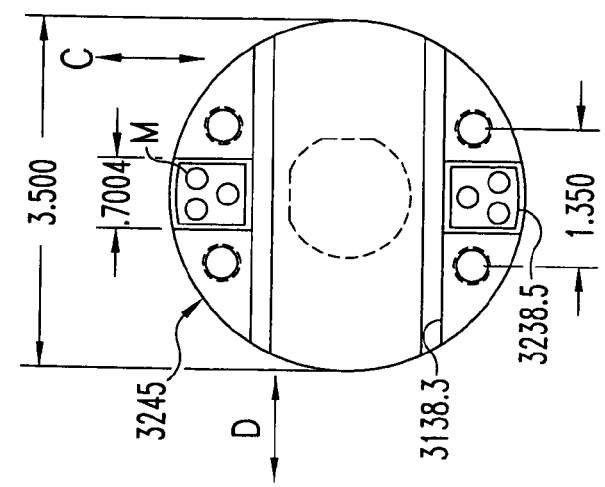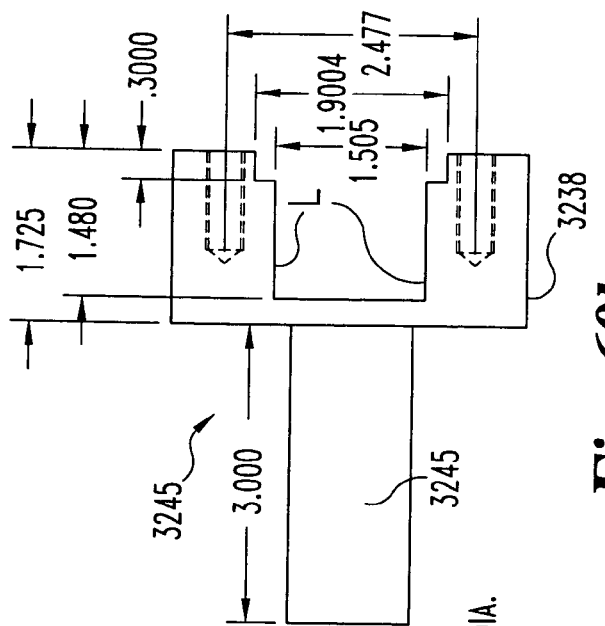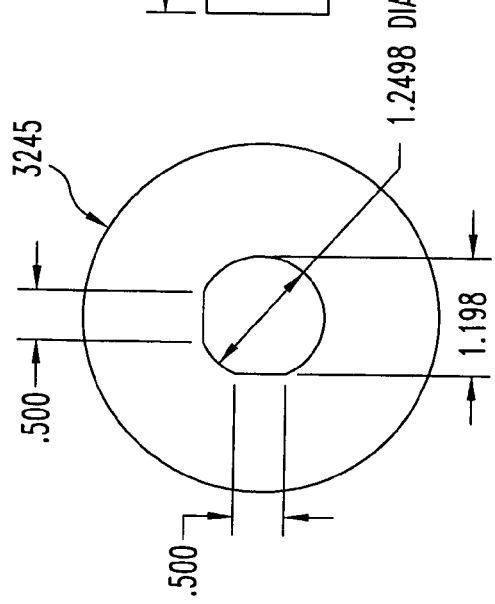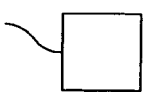

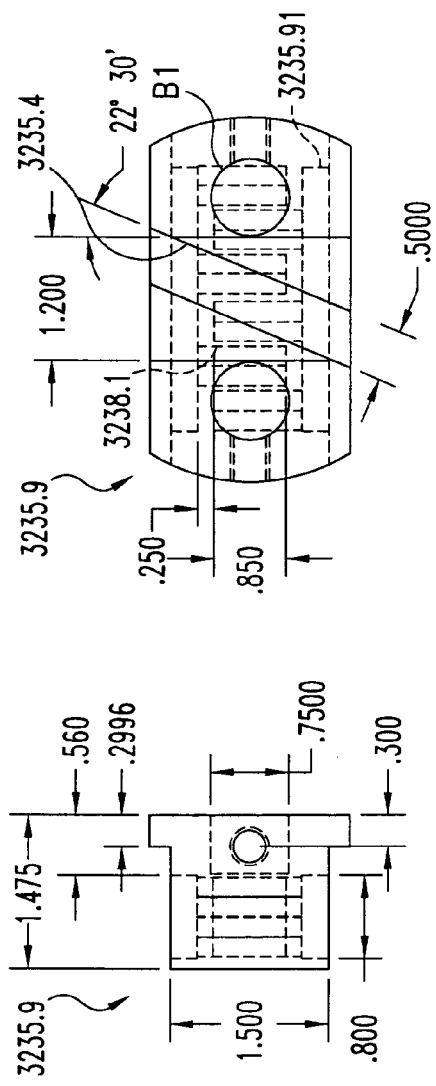
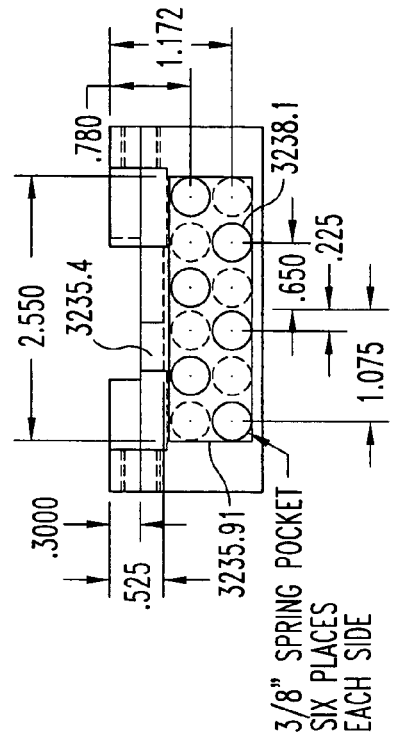
Fig. 62c
Fig. 62d
Fig. 62b
Fig. 62a

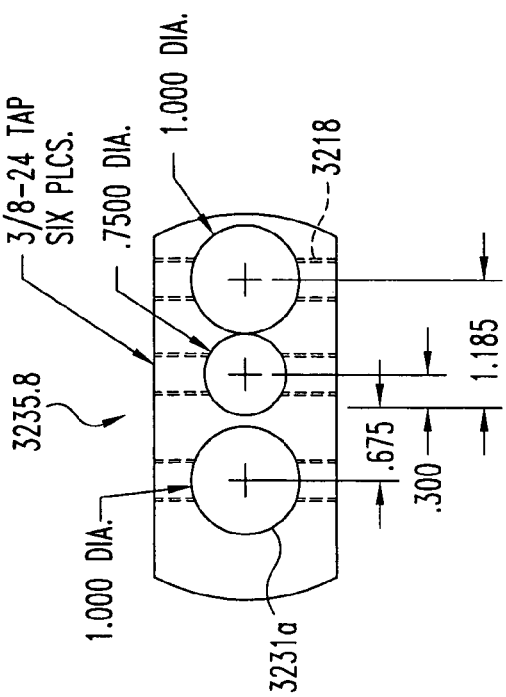
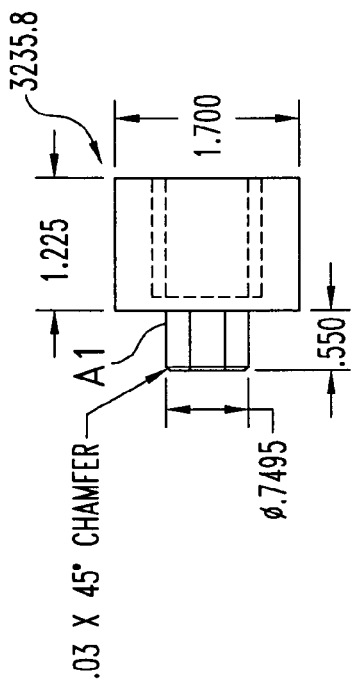
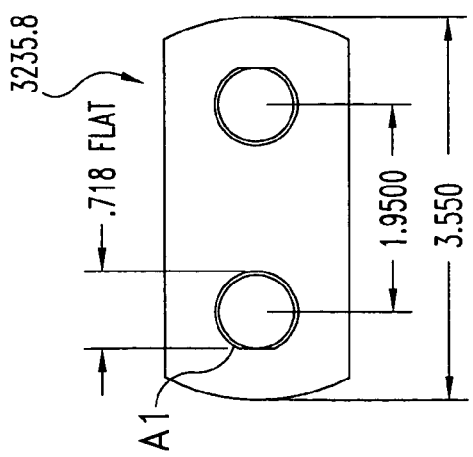
Fig. 65c
Fig. 65b
Fig. 65a

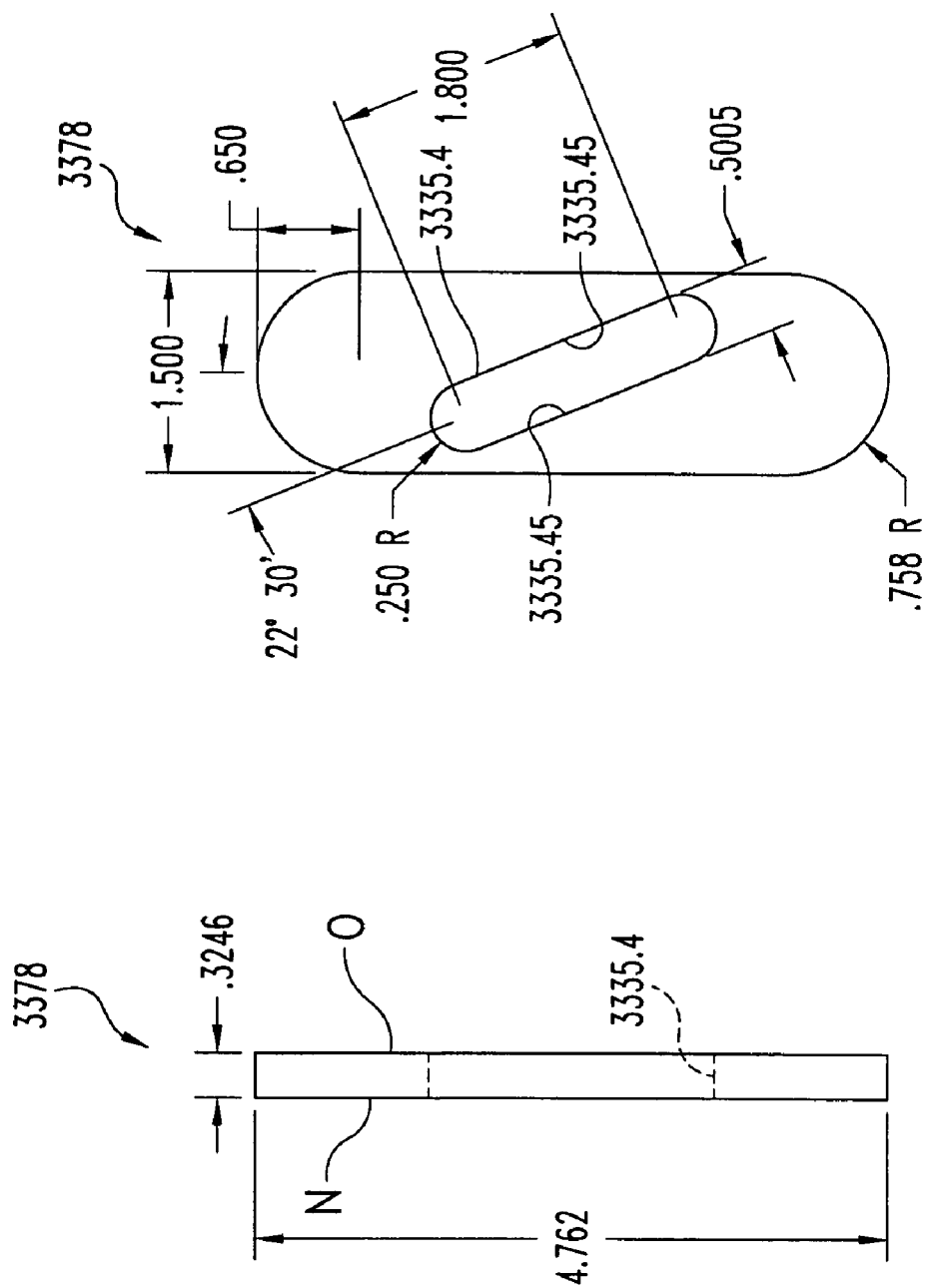

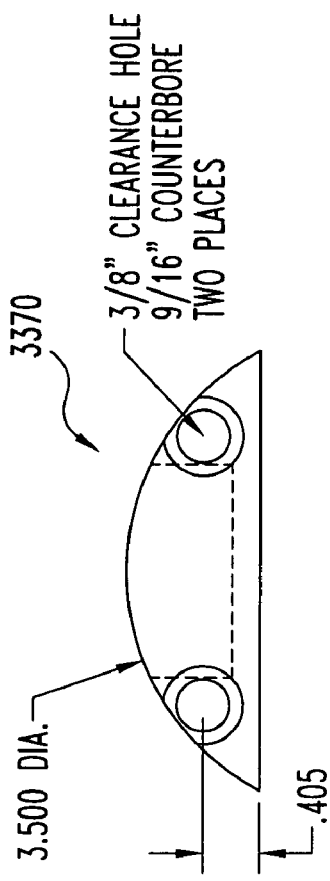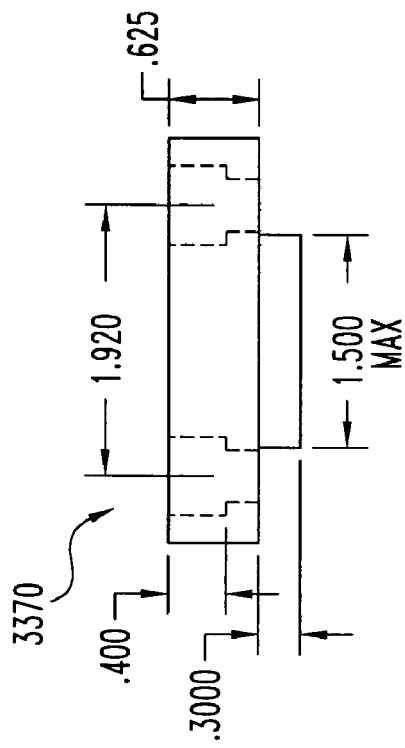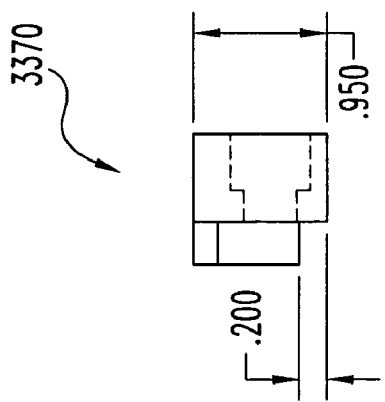

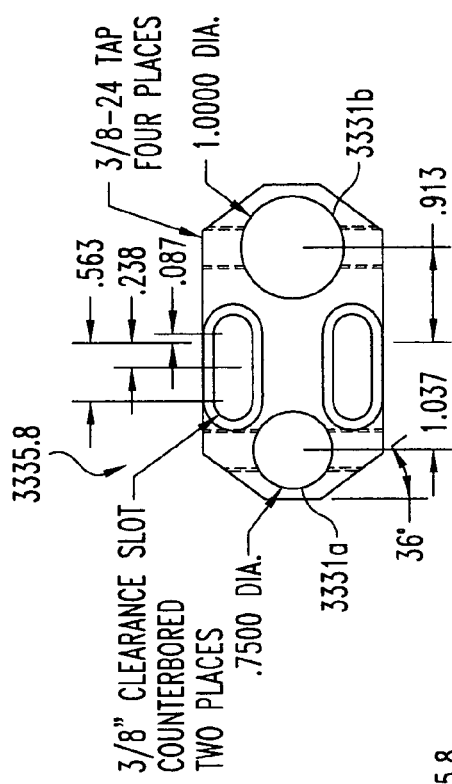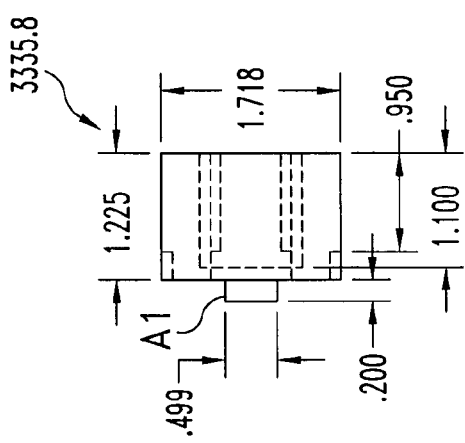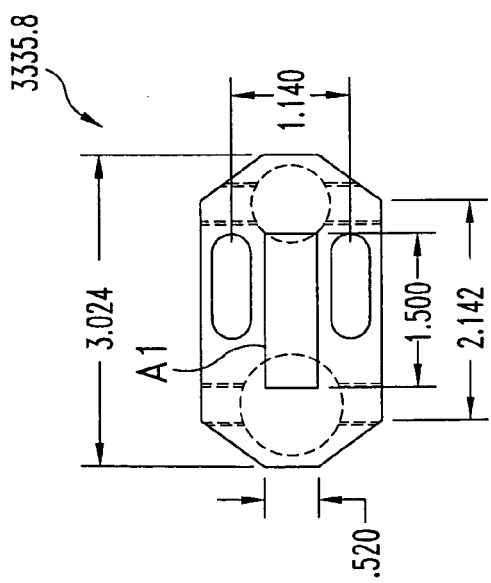
Fig. 71c
Fig. 71b
Fig. 71a

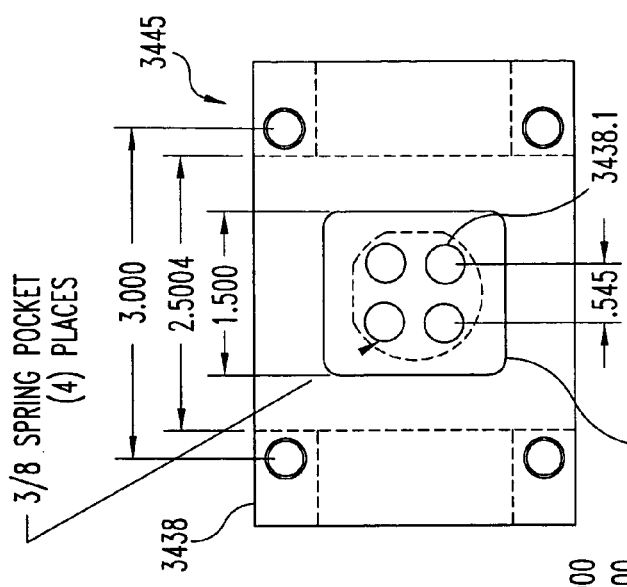
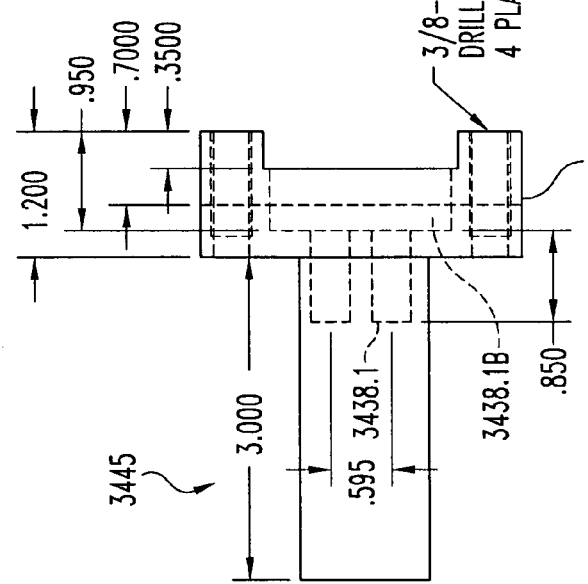
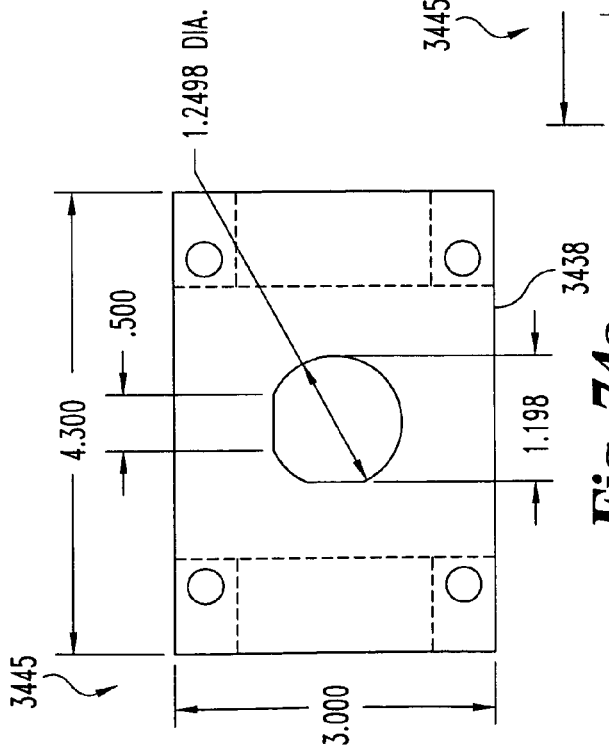
Fig. 74c
Fig. 74b
Fig. 74a

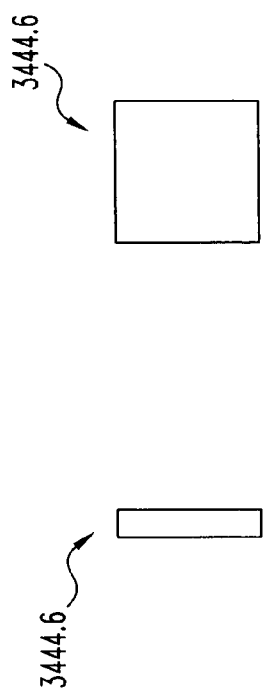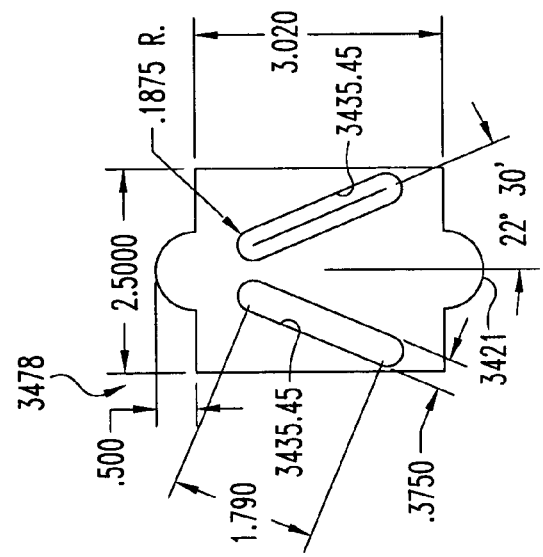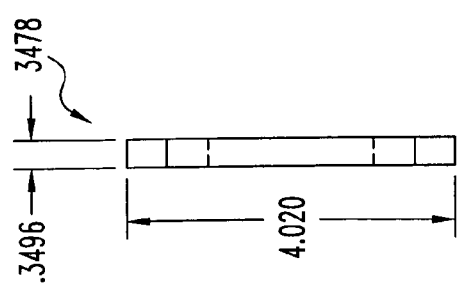

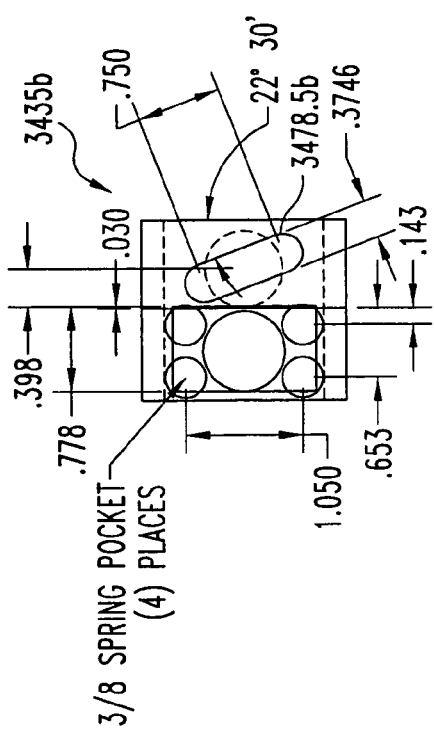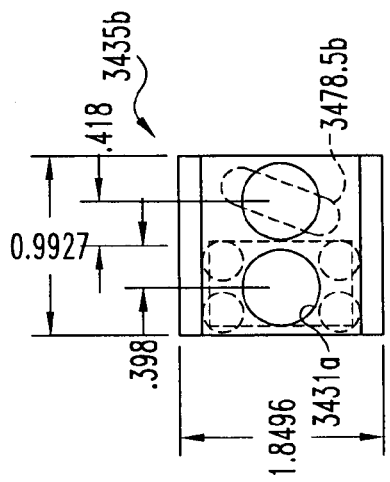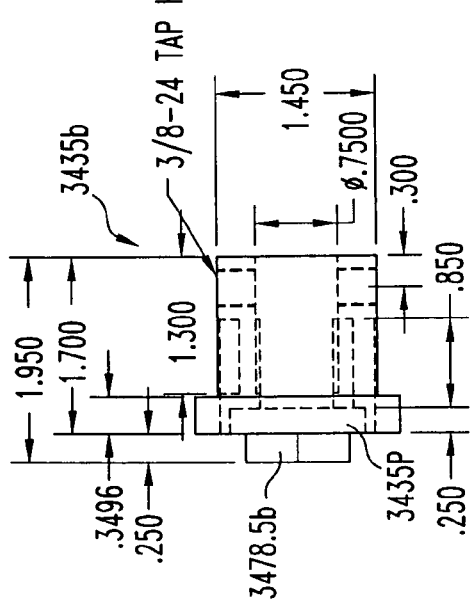
Fig. 77c
Fig. 77b
Fig. 77a

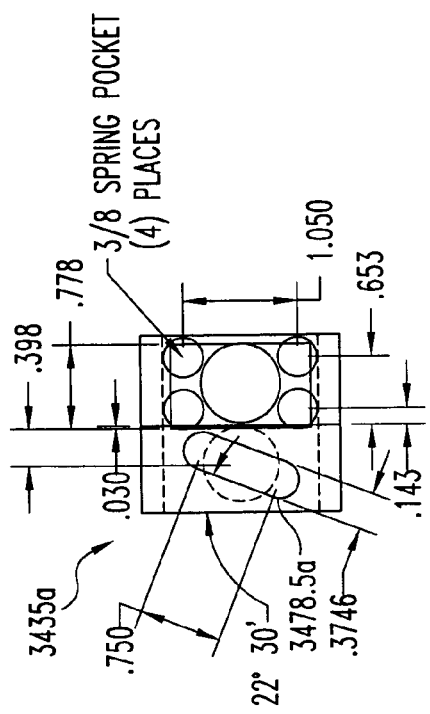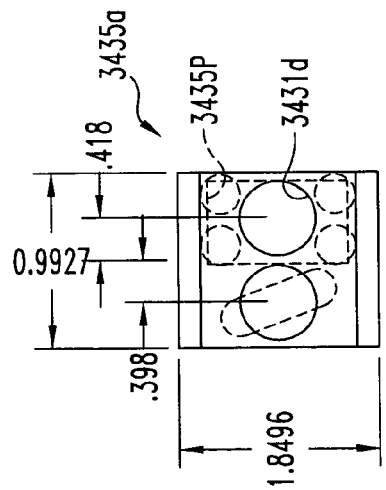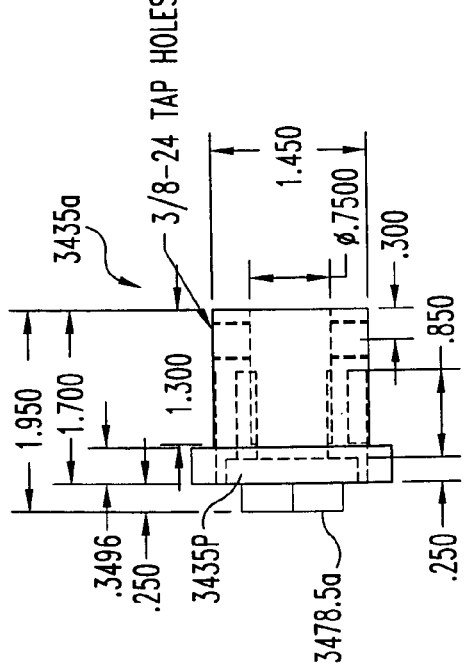

SLIDABLE BORING TOOL WITH FINE ADJUSTMENT

This application claims the benefit of priority to U.S. Provisional patent application No. 60/375,320, filed Apr. 25, 2002. This application is a continuation-in-part of and claims priority to U.S. patent application Ser. No. 10/023,243 filed Dec. 18, 2001 now U.S. Pat. No. 6,705,184. That application claims the benefit of priority to U.S. Provisional Applications Ser. No. 60/256,371, filed Dec. 18, 2000; and Ser. No. 60/270,723, filed Feb. 22, 2001. All of these patent applications are incorporated herein by reference.

FIELD OF THE INVENTION

This invention concerns an apparatus for a tool used when performing a machining operation, and more specifically to a boring tool used with a Computer Numerically Controlled (CNC) boring machine.

BACKGROUND OF THE INVENTION

Many products, such as automotive transmission housing and engine blocks, include precision bored holes. These holes are bored by cutting tools supported by a boring tool which is driven by a boring machine. In many situations, the boring machine is computer numerically controlled (CNC) for reasons of flexibility, economics, and precision. Many CNC boring machines are capable of performing a wide range of operations on a product, including the boring of many different sizes of holes, by the automatic selection of a previously adjusted boring tool from a tool bank.

However, many boring tools require manual adjustment by the machine operator. Some currently used boring tools, such as the 3F-HBD Boring and Facing Head by Criterion Machine Works of Costa Mesa, Calif.; and the tools of the Starflex Boring Tool Program of the Johne+ Company of Germany require manual adjustment of the position of the cutting tool corresponding to the desired bore diameter. Some tools include an internal worm gear adjustable by the operator with an Allen wrench to slide a tool holder within a groove of a machine coupling member. After the operator has manually positioned the cutting tool to bore the correct size diameter, the operator then tightens one or more fasteners to lock the position of the tool holder relative to the machine coupling element. Thus, the clamping force holding the cutting tool on the boring tool is not maintained during adjustment and the tool is reclamped after adjustment. This slow, inflexible, labor-intensive adjustment method detracts from the speed and economy of the CNC machine by requiring the operator to stop the operation of the CNC machine during the period of adjustment.

What is needed is a boring tool which permits adjustment of the position of the cutting tool by operation of the machine, and not by manual readjustment. Further, what is needed is a method of adjusting a boring tool on a CNC machine by software commands. The present invention overcomes the drawbacks of the related art in novel and unobvious? ways.

SUMMARY OF THE INVENTION

One embodiment of the present invention is a unique method to adjust the position of a cutting tool. Other embodiments include unique apparatus, methods, systems, and devices for adjusting the position of a cutting tool.

A further embodiment of the present invention pertains adjusting the position of a cutting tool used in a boring operation. The cutting tool is slidably coupled to a boring tool, and slidable in a first direction. The position of the cutting tool is adjusted by sliding an adjustment member in a second, different direction.

Yet another embodiment of the present invention pertains to a system for boring a hole with a computer numerically controlled machining apparatus. The machining apparatus includes an electronic controller which performs an algorithm to adjust the sliding position of a cutting tool. The electronic controller places a surface of an adjustment member in contact with a surface of a member that is not part of the boring tool, and applies a force thereacross.

Still another embodiment of the present invention pertains to a method for machining with a boring tool which includes a slidable cutting tool and a slidable adjusting member. The position of the cutting tool is adjusted with the aid of the boring machine by sliding the adjustment member in a direction different than the sliding direction of the cutting tool.

A further embodiment of the present invention pertains to a method for adjusting the position of a cutting tool by a first predetermined amount. The cutting tool is moved this first predetermined amount by changing the position of an adjusting member by a second amount which is greater than the first amount.

Yet another embodiment of the present invention pertains to a boring tool having a cutting tool slidable on a first direction, and an adjustment member slidable in a second direction. The second direction is at least partly orthogonal to the rotational axis of the boring tool. The movement of the adjustment member is coupled to a movement of the cutting tool.

Further objects, embodiments, forms, benefits, aspects, features, and advantages of the present invention can be obtained from the description, drawings, and claims provided herein.

DESCRIPTION OF THE DRAWINGS

FIG. 1A is an end view of an apparatus according to one embodiment of the present invention.

FIG. 1B is a side elevational view of the apparatus of FIG. 1A, and including a partial internal view.

FIG. 1C is an external side elevational view of the apparatus of FIG. 1B.

FIG. 14A is a side elevational view of a portion of the apparatus of FIG. 12A.

FIG. 14B is a view of the apparatus of FIG. 14A as taken along line 14B—14B of FIG. 14A.

FIG. 14C is a cross sectional view of the apparatus of FIG. 14B as taken along line 14C—14C of FIG. 14B.

FIG. 15A is a side elevational view of a portion of the apparatus of FIG. 12A.

FIG. 15B is a cross sectional view of the apparatus of FIG. 15A as taken along line 15B—15B of FIG. 15A.

FIG. 16A is a side elevational view of an apparatus according to another embodiment of the present invention.

FIG. 16B is a view of the apparatus of FIG. 16A as taken along line 16B—16B of FIG. 16A.

FIG. 18A is a side elevational view of a portion of the apparatus of FIG. 16A.

FIG. 18B is a view of the apparatus of FIG. 18A as taken along line 18B—18B of FIG. 18A.

FIG. 18C is a cross sectional view of the apparatus of FIG. 18B as taken along line 18C—18C of FIG. 18B.

FIG. 24 is a side elevational view of a boring tool according to another embodiment of the present invention.

FIG. 25 is an end view of the apparatus of FIG. 24 as taken along line 25—25 of FIG. 24.

FIG. 30A is a side elevational and partial cutaway view of an apparatus according to another embodiment of the present invention.

FIG. 30B is a view of the apparatus of FIG. 30A as taken along line 30B—30B of FIG. 30A.

FIG. 31A is a side elevational view of a portion of the apparatus of FIG. 30A.

FIG. 31B is a view of the apparatus of FIG. 31A as taken along line 31B—31B of FIG. 31A.

FIG. 44A is a side elevational view of an apparatus according to another embodiment of the present invention.

FIG. 44B is an end elevational view of the apparatus of FIG. 44A.

FIG. 45A is a side elevational view of a portion of the apparatus of FIG. 44A.

FIG. 45B is an end elevational view of the apparatus of FIG. 45A.

FIG. 47A is a top plan view of a portion of the apparatus of FIG. 44B.

FIG. 47B is a side elevational view of the apparatus of FIG. 47A as taken along the line 47B—47B of FIG. 47A.

FIG. 49A is a side view of an apparatus according to another embodiment of the present invention.

FIG. 49B is an end elevational view of the apparatus of FIG. 49A.

FIG. 50A is a side elevational view of a portion of the apparatus of FIG. 49A.

FIG. 50B is an end elevational view of the apparatus of FIG. 50A as taken along the line 50B—50B of FIG. 50A.

FIG. 53A is a top plan view of a portion of the apparatus of FIG. 49B.

FIG. 53B is a view of the apparatus of FIG. 53A as taken along the line 53B—53B of FIG. 53A.

FIG. 60a is a bottom elevational view of a portion of the apparatus of FIG. 56.

FIG. 60b is a side elevational view of the apparatus of FIG. 60a.

FIG. 60c is a top plan view of the apparatus of FIG. 60b.

FIGS. 60a, 60b, and 60c are mutually orthogonal projections.

FIG. 60d is a top plan view of a brake member, part of the apparatus of FIG. 56.

FIG. 60e is a side elevational view of the apparatus of FIG. 60d.

FIG. 61b is a top plan view of the apparatus of FIG. 61a.

FIG. 62a is a bottom plan view of a retained tool holder as used in the apparatus of FIG. 56.

FIG. 62b is a side elevational view of the apparatus of FIG. 62a.

FIG. 62c is a top plan view of the apparatus of FIG. 62b.

FIG. 62d is a side elevational view of the apparatus of FIG. 62c.

FIGS. 62a, 62b, 62c, and 62d are mutually orthogonal projections.

FIG. 63b is a side elevational view of the apparatus of FIG. 63a.

FIG. 64b is a top plan view of the apparatus of FIG. 64a.

FIG. 65a is a bottom plan view of a changeable tool holder as used in the apparatus of FIG. 56.

FIG. 65b is a side elevational view of the apparatus of FIG. 65a.

FIG. 65c is a top plan view of the apparatus of FIG. 65b.

FIGS. 65a, 65b, and 65c are mutually orthogonal projections.

FIG. 67a is a bottom plan view of a coupling element and coupling element body used with the apparatus of FIG. 66a.

FIG. 67b is a side elevational view of the apparatus of FIG. 67a.

FIG. 67c is a top plan view of the apparatus of FIG. 67b.

Figure 67C:
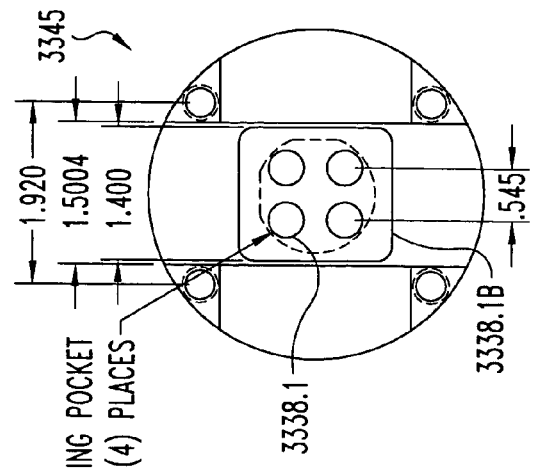
Figure 67B:
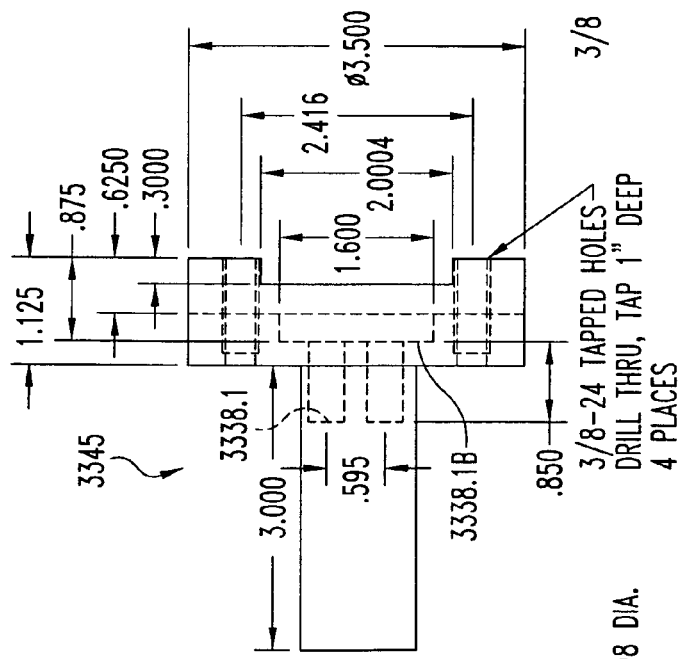
Figure 67A:
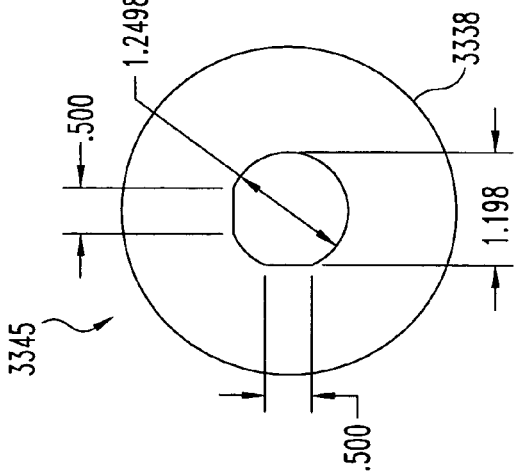

FIGS. 67a, 67b, and 67c are mutually orthogonal projections.

Figure 66B:
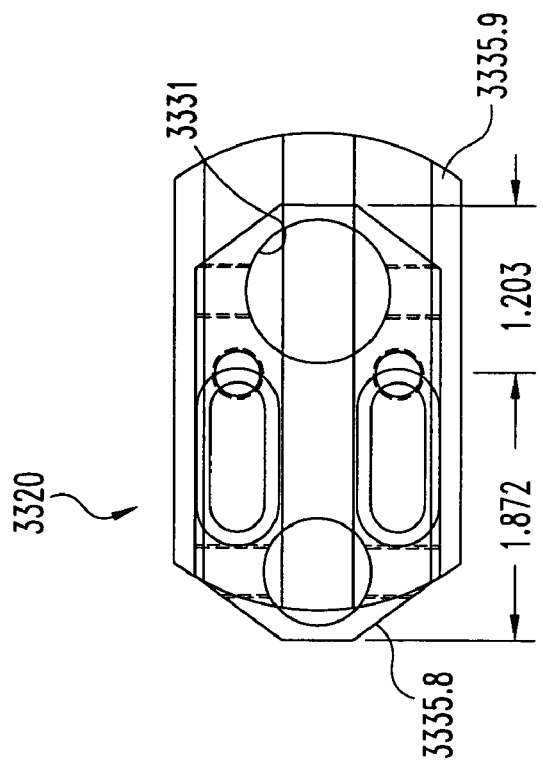
FIG. 66b is a top plan view of the apparatus of FIG. 66a with the changeable tool holder slid to a different position.
Figure 66A:
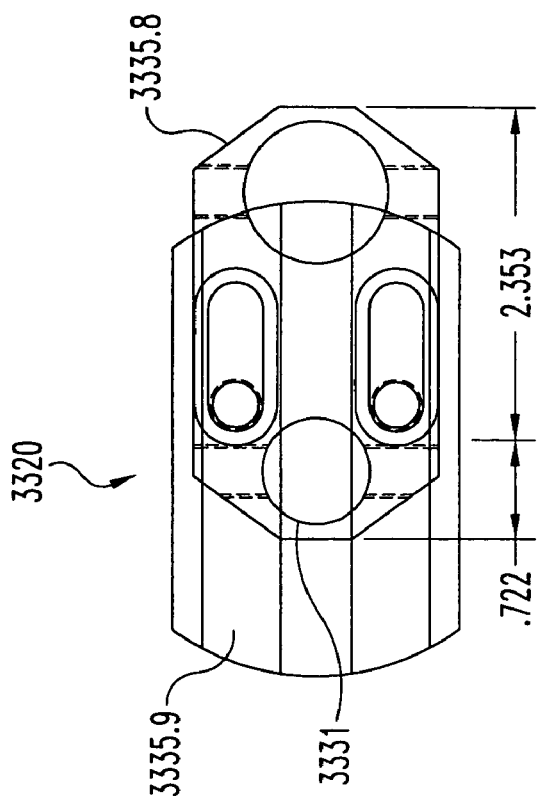
FIG. 66a is a top elevational view of a portion of an apparatus according to another embodiment of the present invention.

FIG. 68a is a side elevational view of an adjustment member used with the apparatus of FIG. 66a.

FIG. 68b is a side elevational view of the apparatus of FIG. 68a.

Figure 69C:
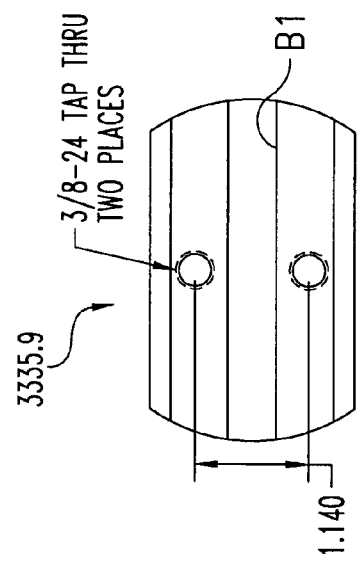
Figure 69B:
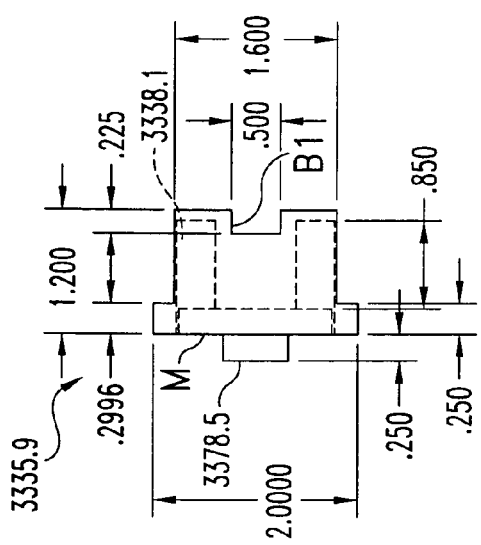
Figure 69A:
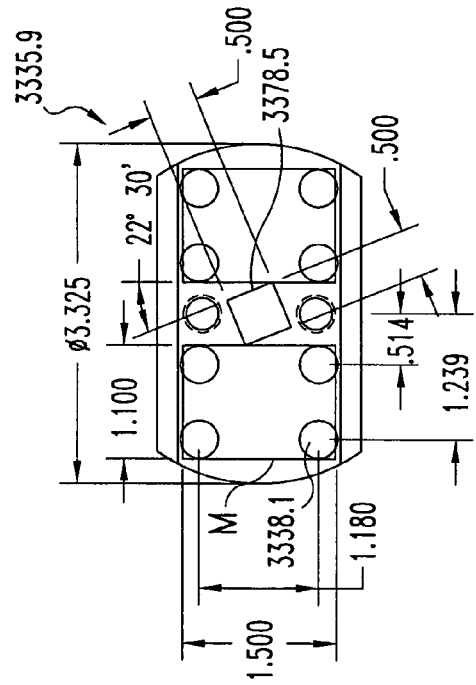

FIG. 69a is a bottom plan view of a retained tool holder used with the apparatus of FIG. 66a.

FIG. 69b is a side elevational view of the apparatus of FIG. 69a.

FIG. 69c is a top plan view of the apparatus of FIG. 69b.

FIGS. 69a, 69b, and 69c are mutually orthogonal projections.

FIG. 70a is a retention member used with the apparatus of FIG. 66a.

FIG. 70b is a top plan view of the apparatus of FIG. 70a.

FIG. 70c is a side elevational view of the apparatus of FIG. 70b.

FIGS. 70a, 70b, and 70c are mutually orthogonal projections.

FIG. 71a is a bottom plan view of a changeable tool holder used with the apparatus of FIG. 66a.

FIG. 71b is a side elevational view of the tool holder of FIG. 71a.

FIG. 71c is a top plan view of the apparatus of FIG. 71b.

FIGS. 71a, 71b, and 71c are mutually orthogonal projections.

Figure 72A:
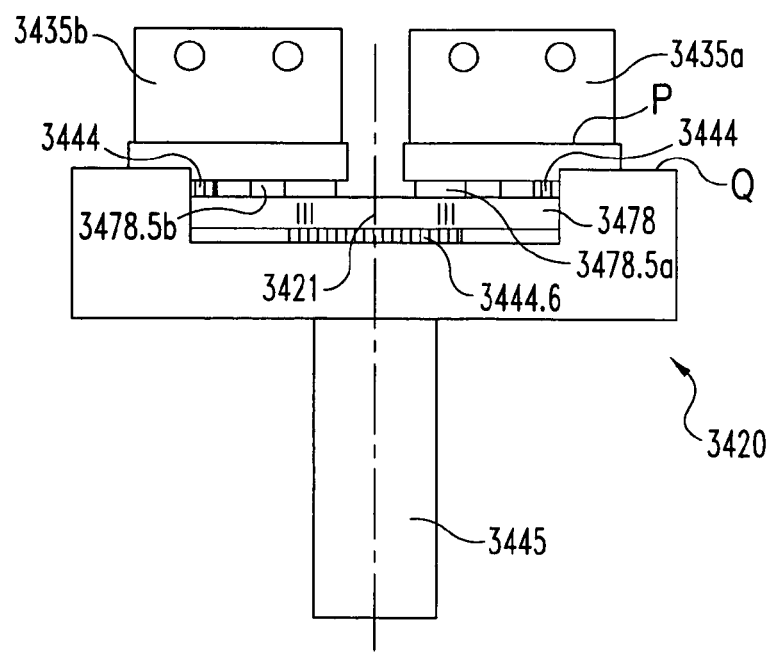

FIG. 72a is a front elevational view of an apparatus according to one embodiment of the present invention, with the retention members removed.

Figure 72B:
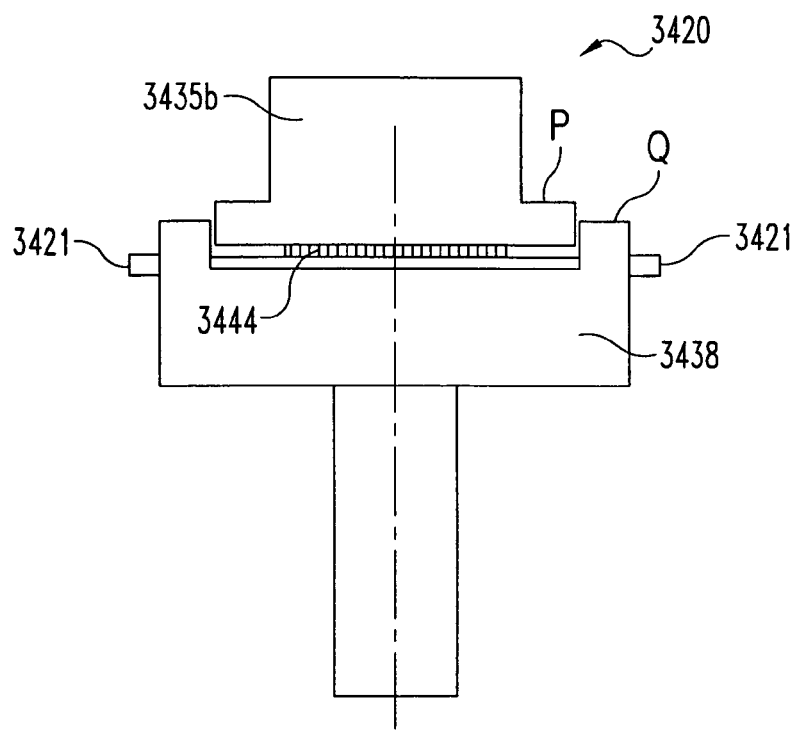

FIG. 72b is a side elevational view of the apparatus of FIG. 72a, with the retention members removed.

Figure 73A:
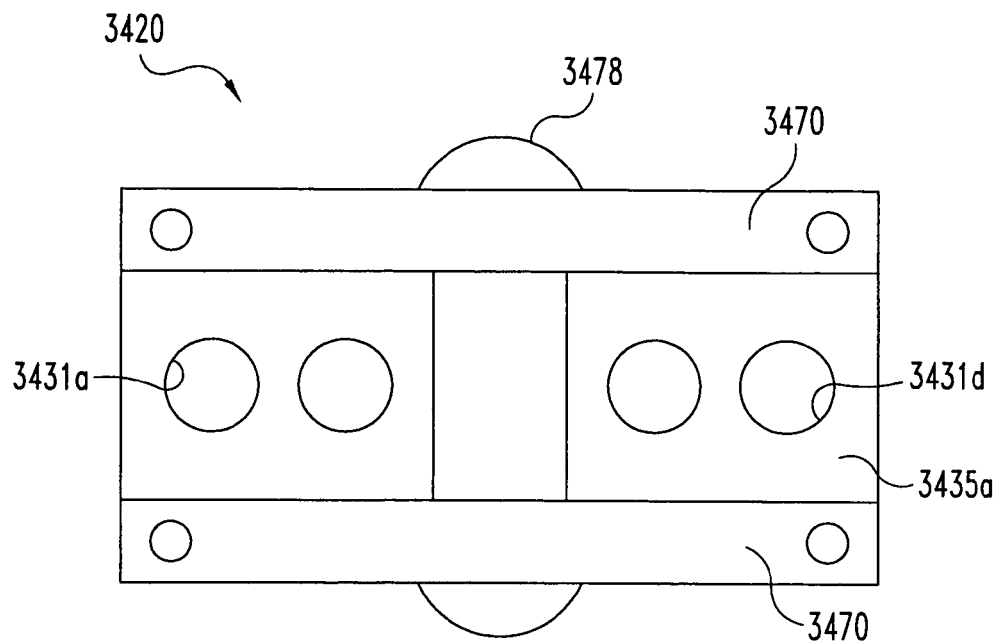

FIG. 73a is a top view of the apparatus of FIG. 72a.

Figure 73B:
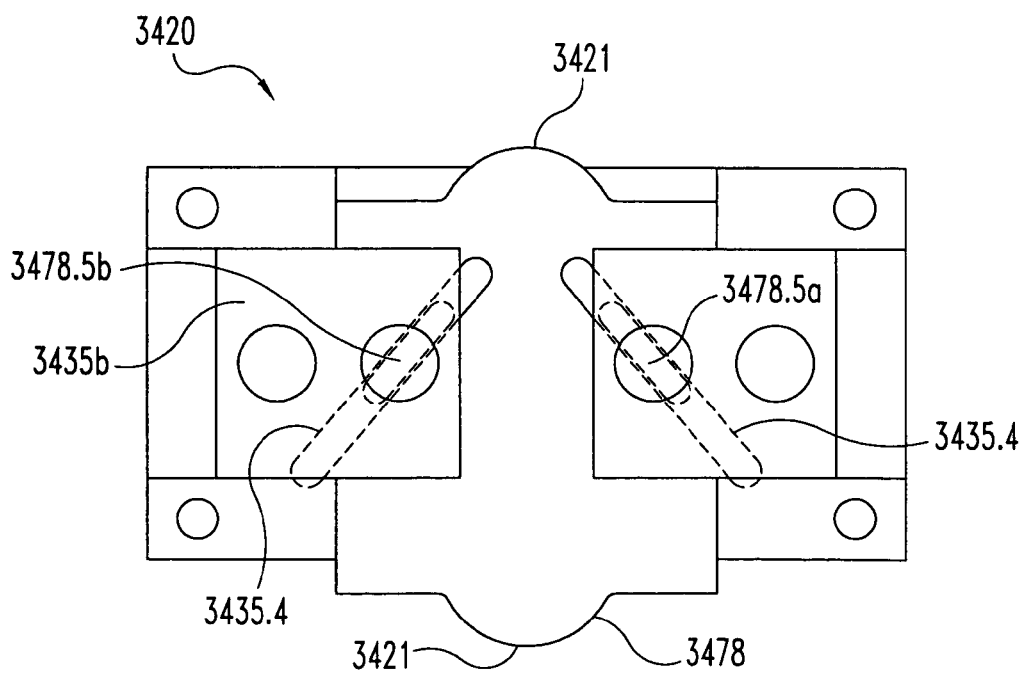

FIG. 73b is a top view of the apparatus of FIG. 73a with the retention members removed, and in partial cut-away.

FIG. 74a is a bottom plan view of a portion of the apparatus of FIG. 72a.

FIG. 74b is a side elevational view of the apparatus of FIG. 74a.

FIG. 74c is a top plan view of the apparatus of FIG. 74b.

FIGS. 74a, 74b, and 74c are mutually orthogonal projections.

FIG. 75a is a side elevational view of an adjustment member used in the apparatus of FIG. 72a.

FIG. 75b is a top plan view of the apparatus of FIG. 75a.

FIG. 75c is a side elevational view of a brake member used in the apparatus of FIG. 72a.

FIG. 75d is a top plan view of the apparatus of FIG. 75c.

FIG. 75e is a side elevational view of another brake member used in the apparatus of FIG. 72a.

FIG. 75f is a top plan view of the apparatus of FIG. 75e.

Figure 76A:
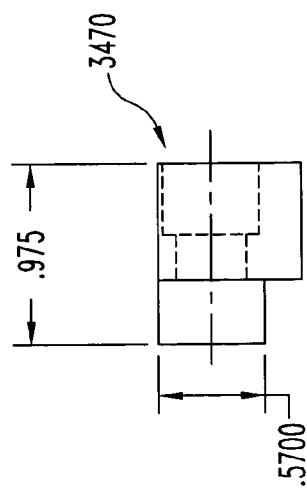

FIG. 76a is an end elevational view of the retention member used in the apparatus of FIG. 73a.

Figure 76B:
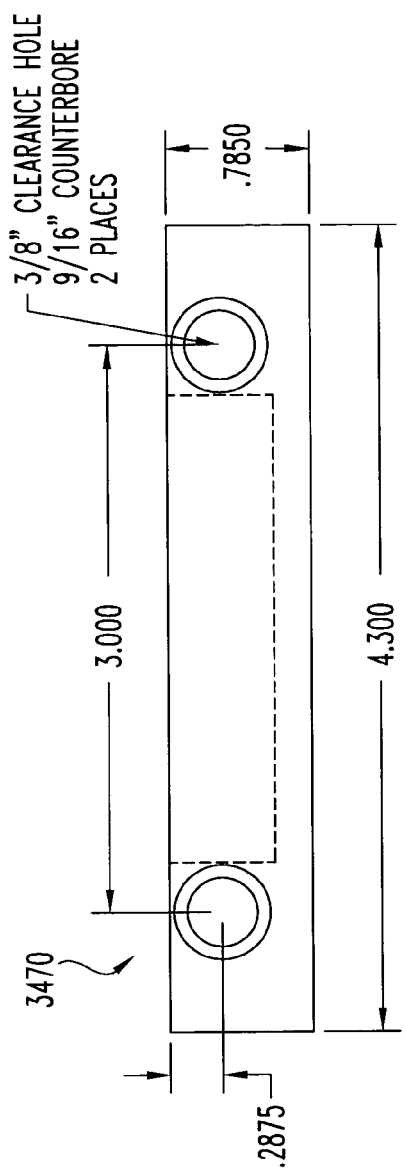

FIG. 76b is a top plan view of the apparatus of FIG. 76a.

Figure 76C:
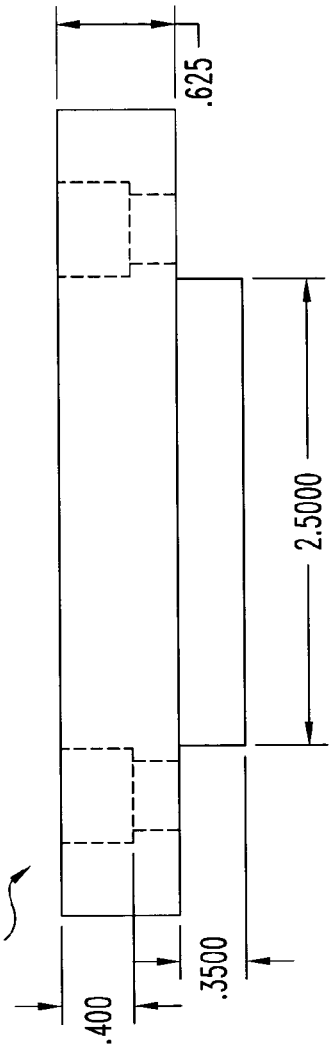

FIG. 76c is a front elevational view of the apparatus of FIG. 76b.

FIG. 77a is a side elevational view of a changeable tool holder used in the apparatus of FIG. 72a.

FIG. 77b is a top plan view of the apparatus of FIG. 77a.

FIG. 77c is a bottom plan view of the apparatus of FIG. 77b.

FIGS. 77a and 77b are mutually orthogonal projections.

FIG. 78a is a side elevational view of a changeable tool holder used in the apparatus of FIG. 72a.

FIG. 78b is a top plan view of the apparatus of FIG. 78a.

FIG. 78c is a bottom plan view of the apparatus of FIG. 78b.

FIGS. 78a and 78b are mutually orthogonal projections.

Figure 79:
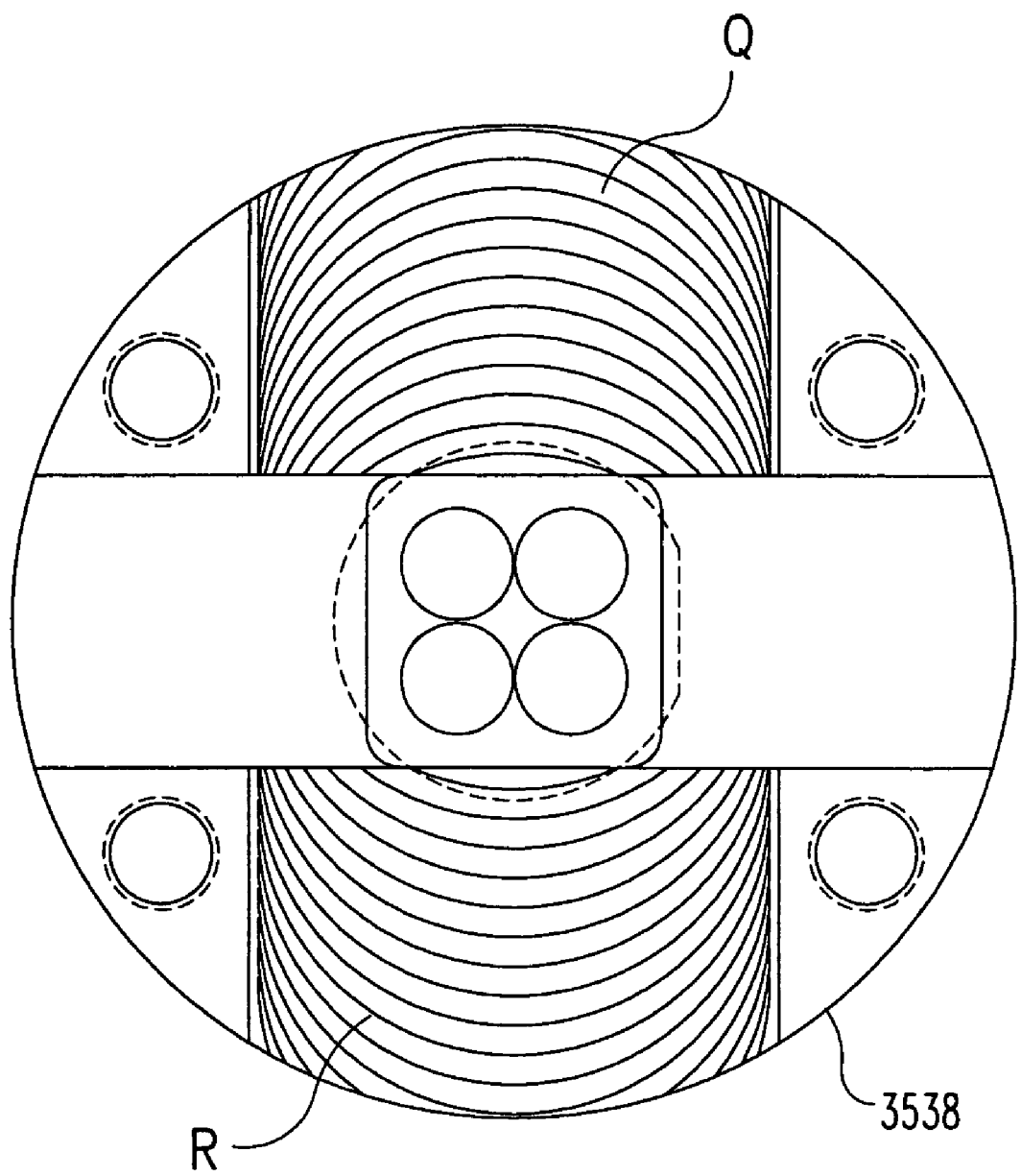

FIG. 79 is a top plan view of a coupling element body according to another embodiment of the present invention.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention relates both to apparatus and method by which the operator can adjust the sideways location of a cutting tool used in a machining operation; for example, a cutting tool used for boring holes with a CNC boring machine. According to one embodiment of this invention, the cutting tool or cutting tool holder is coupled to the machine coupling element, and can be moved relative to the coupling element. In one embodiment, the relative movement of the cutting tool or cutting tool holder is sliding movement, although the present invention is not limited to sliding movement. The sliding movement of the tool holder relative to the coupling element is controlled at a frictional interface. The tool holder is held firmly within the coupling element by a predetermined amount of friction. This amount of friction is sufficient to hold the tool in place during machining operations. However, this friction can be overcome in order to adjust the position of the cutting tool by applying a sufficiently high sideways load.

In another embodiment, the cutting tool holder and coupling member include a contact or frictional force actuating mechanism. The mechanism can vary the contact or frictional force between the tool holder and the coupling member, thus varying the frictional force which holds the tool holder in place. The actuating mechanism can be actuated to a first position or state which applies a first contact force between the tool holder and the coupling mechanism, resulting in a first frictional force restraining movement of the sliding tool holder. The mechanism is also actuatable to a second position or state in which a second contact force is applied between the tool holder and the coupling member, resulting in a second frictional force restraining sliding motion of the tool holder. The second contact force is greater than the first contact force, and the second frictional force is greater than the first frictional force.

The mechanism is actuated to the first state when the lateral position of the tool holder is adjusted. The frictional load of the first state is preferably greater than the corresponding lateral loads associated with machining, but less than the lateral load that can be applied by a machining apparatus such as a boring machine to laterally adjust the position of the cutting tool. The actuating mechanism is actuated to the second state prior to machining of an object. Preferably, the frictional load of the second state is greater than the lateral loads encountered during machining, and also greater than the lateral loads applied during adjustment of the position of the cutting tool. However, the present invention also contemplates those embodiments in which the frictional loads from both the first state and the second state are greater than the loads applied during machining, but less than the loads applied during adjustment of the position of the cutting tool. Further, the present invention contemplates those embodiments in which the frictional load from the first state is less than the lateral load encountered during machining. As non-limiting examples, the contact force actuating mechanism can include an electromagnet, an electromagnetic solenoid, a hydraulic piston, a hydraulic bladder, and/or centrifugal weights.

One embodiment of the present invention relates to a method for machining a bore. In this method an electronically controlled boring machine is commanded by an operator or by software to place a surface of a boring tool in contact with a static surface. The operator or software then commands the boring machine to apply a force against the static surface, this pressing of the boring tool against the static surface resulting in sliding of the cutting tool on the boring tool relative to the body of the boring tool. The boring machine moves the boring tool a predetermined distance against the static surface, this distance having been calculated to set the cutting tool in a proper position for the next boring operation. The cutting tool is held in place by friction relative to the boring tool body, and this friction maintains the cutting tool in the proper position during machining. However, the frictional force is of a low enough value so as to be overcome by the lateral force exerted by the boring machine against the static surface.

In another embodiment, the present invention relates to an apparatus for boring a hole with a boring machine. The boring apparatus includes a tool holder which is slidably coupled to a boring machine coupling element. The sliding interface between the tool holder and the coupling element includes a first contact surface of the tool holder that is in contact with a second contact surface of the coupling element. A predetermined normal force can be applied between the contact surfaces to create a predetermined frictional force between the first and second contact surfaces. This predetermined frictional force resists sliding of the tool holder relative to the coupling element. The predetermined frictional force is sufficient to restrain the lateral position of the tool holder when the tool holder is boring a hole, but is of a magnitude insufficient to restrain the lateral position of the tool holder during lateral adjustment of the tool holder relative to the coupling element. Some embodiments of the present invention utilize a spring to urge the first contact surface against the second contact surface. Other embodiments include the spring and also an adjusting element such as a fastener which permits adjustment of the force exerted by the spring to urge the first and second contact surfaces together.

Other embodiments include adjusting the friction in a boring tool by lessening of the torque of the set screws that maintain the sliding cutting tool in place. Typically, these set screws are adjusted to a high level of torque to maintain the sliding tool holder in place at all times. For example, the torque applied to the set screws may be the recommended maximum torque for the screw. This high torque creates substantial holding friction which prevents any lateral movement of the tool holder without first loosening one or more of the set screws. Typically, the screw is loosened, the tool position is adjusted, the screw is retightened, and machining resumes.

According to one embodiment of the present invention, the set screws are adjusted to a level of torque that is less than the recommended torque for holding the tool in place. This lower level places sufficient friction on the sliding tool holder to maintain it in place during machining, but insufficient friction to maintain the sliding tool holder in place during on-machine adjustment as described herein. This adjustment can be performed with the boring tool coupled to the boring machine, and without the need to stop the operation of the machine to make manual adjustments to the tool position. In some embodiments of the present invention, the set screws include a locking device or locking method to insure that the set screw retains a particular angular position and therefore a particular amount of friction. As one example, the threads of the set screws can be coated with a locking compound. As another example, the threads of the set screw can have a shape that results in interference with the mating threads. Those of ordinary skill in the art will recognize other methods for retaining a screw in position.

The various FIGS. shown in this application include schematic representations of systems, methods, and apparatus.

FIGS. 1A, 1B, and 1C show an end view and two side views, respectively, of one embodiment of the present invention. A boring tool 20 according to the present invention includes a cutting tool 25 held at the end and side of a tool support 30 that rigidly extends from a tool holder 35. Cutting tool 25 is a conventional cutting tool of any shape and material suitable for a boring operation. FIG. 1A also includes a static member 50 which preferably includes a static surface 51. By way of non-limiting examples, static member 50 can be a portion of the boring machine, the object to be machined, or a fixture attached to the boring machine or to the object.

Cutting tool 25 is used to machine an object in a conventional manner. Cutting tool 25 is rotated about the central axis of the boring tool, and brought into contact with an object to be machined. The outermost corner of cutting tool 25 contacts the surface of the object to be machined, and removes material from the object as the cutting tool both rotates about axis 22 and translates relative to the object.

Machining of the object places a three dimensional load on the cutting tool. Referring to FIG. 1C, there is an axial force X which is parallel to axis 22. There is also a lateral load Y, which can also be thought of as a radially-directed load, which is a force on cutting tool 25 that is substantially parallel (or includes a parallel component) to the sliding direction of tool holder 35. Finally, there is a third load (not shown on FIG. 1C) acting in a tangential direction which is perpendicular to both forces X and Y, and is related to the frictional drag and cutting forces of the cutting tool on the object.

It is believed that the lateral load Y encountered during machining which is parallel to the sliding motion of the cutting tool holder has a relatively small value compared to the other forces acting on the cutting tool. Therefore, although the axial and tangential forces acting on the cutting tool in response to axial and rotary motion of the cutting tool, respectively, can be significant, it is believed that the lateral load Y is lesser in value. Further, it is believed that some machining apparatuses, including some CNC boring machines, are capable of applying a sideways load to a tool holder that is parallel to Y and larger than the Y-direction loads encountered during machining. Therefore, a sliding tool holder which is restrained from sliding motion by a frictional load which is greater than the load Y encountered during machining will be sufficient to maintain the tool holder in place during machining. Further, by providing a frictional force which is less than the amount of lateral load which can be applied by the machining apparatus through the tool holder against a static member, it is possible for the machining apparatus to laterally reposition the cutting tool, while maintaining the cutting tool clamped to the coupling member in a manner suitable for subsequent machining.

Tool holder 35 is slidable by a T-joint 37 within coupling element body 38 of machine coupling element 45. Although a T-joint 37 in a squared-off configuration is shown and described, the present invention also contemplates other types of sliding joints between tool holder 35 and machine coupling element 45, including a dovetail joint. Machine coupling element 45 locks apparatus 20 to the CNC machine at a coupling interface 46, and is powered by the CNC machine so as to rotate tool 25 within the bore to be machined. The present invention is not limited to the configuration of coupling interface shown, and can include any coupling interface which provides powering and location of the boring tool 20. Further, although machine coupling device 45 is shown and described as interfacing to both tool holder 35 and a boring machine, the present invention further contemplates the use of intermediate coupling members between coupling element 45 and the boring machine.

FIG. 1B includes a partial internal cutaway view of boring tool 20. Machine coupling element 45 includes an internal frictional adjustment apparatus 40. Apparatus 40 includes an adjusting member 41 that can be manually adjusted, such as a bolt threadably retained within an internal bore of coupling element 45. Adjusting member 41 places contact pressure on an adjustment plate 42. Adjustment of member 41 against plate 42 results in a change in the force exerted by springs 43 against movable member or brake plate 44. The present invention contemplates springs 43 which can be any kind of spring-biasing member, including coil springs, torsional springs, cantilever springs, leaf springs, and gas or hydraulic springs. Further, although what is shown and described are springs placed in compression and urging the sliding tool holder away from the body of the coupling member, the present invention also contemplates those embodiments in which the springs are adapted and configured to urge the sliding tool holder toward the body of the coupling member. As one example, referring to FIG. 1B, the present invention contemplates those embodiments in which adjusting member 41 is threadably coupled to plate 42, such that rotation of member 41 pulls plate 42 toward the conical driven end of apparatus 20. In this embodiment, springs 43 would be attached at one end to plate 42 and at the other end to tool holder 35. The springs are in tension and urge tool holder 35 toward the conical end of apparatus 20.

Movable member or brake plate 44 includes a contact surface 44a with a frictional coating 47 comprising a frictional material such as a brake pad material. In some embodiments, a similar frictional coating 47 is applied to a contact surface 37a of T-joint 37 that is in contact with surface 44a. Adjustment of member 41 results in adjustment of the normal force acting between contact surface 37a and 44a. This predetermined normal force establishes a predetermined frictional force between contact surfaces 37a and 44a, and thus controls the amount of sliding friction at the interface of surfaces 44a and 37a. This friction is adjusted so that tool holder 35 is prevented from sliding during boring or other machining operations, but can be adjusted sideways with a force sufficient to overcome the frictional force between internal surfaces 37a and 44a.

Although what has been shown and described depict a frictional interface between contact surfaces 37a and 44a, the present invention contemplates other locations for a frictional interface. For example, frictional contact can be utilized between contact surface 37b of T-joint 37 and surface 38b of coupling element body 38. In addition, the frictional interface can be established between mating contact surface 35c of holder 35 and contact surface 38c of element body 38. Preferably, the frictional interface is established against any surface of the sliding tool holder, such that the tool holder is restrained from sliding relative to the coupling member.

The present invention contemplates application of frictional coating 47 to either one or both of the contact mating surfaces. In addition to the use of a frictional material such as a brake pad material for frictional coating 47, the present invention further contemplates other types of materials applied to one or more contact surfaces, including surface coatings for increased resistance to abrasion, wear, galling, and the like. Such coatings may provide this increased resistance by a drop in the coefficient of friction. In such applications, the required frictional force can be achieved by increasing the normal or contact force between contacting surfaces. Non-limiting examples of various surface coatings providing increased resistance to abrasion, wear, galling, and the like include the use of a Babbitt bearing alloy, polyvinyl chloride polymer, polyethylene polymer, TFE fluorocarbon polymer, molybdenum-disulfide (with or without solid film lubricants such as graphite), and oil. Further, as non-limiting examples, the present invention contemplates the use of thermochemical coatings, hot-dipped coatings, plating, mechanical cladding, deposited coatings, and heat treating of the contact surfaces to achieve the appropriate wear and frictional characteristics.

Some embodiments of the present invention use one pair of contact surfaces to provide most of the frictional force holding the tool holder stationary relative to the coupling element during machining. Other contact surfaces between the tool holder and coupling element can include surface finishes or surface coatings which have a low coefficient of friction. By limiting the high coefficient of friction coatings, materials, and surfaces to a single pair of mating contact surfaces, the total amount and location of sliding friction between the tool holder and coupling element can be reliably and accurately maintained.

Figure 1D:
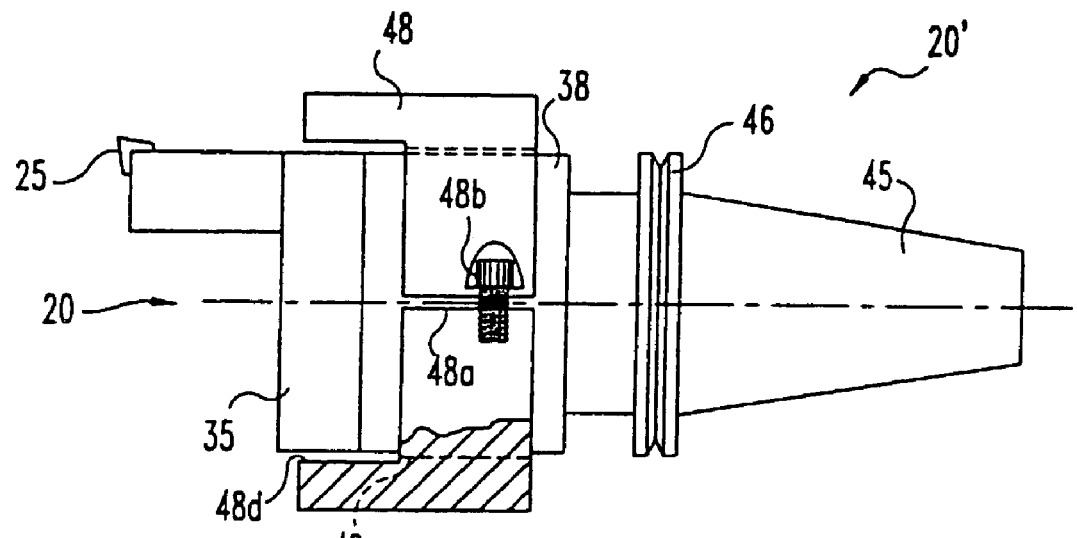
FIG. 1D is an external side elevation view and partial cutaway view of the apparatus of FIG. 1C which includes a retaining ring.

FIG. 1D depicts a side elevational view and partial cutaway view of another embodiment according to the present invention. The use of a single prime (XX.X') or double prime (XX.X") with an element number (XX.X) refers to an element that is the same as the non-prime element (XX.X) previously described or depicted except for the differences which are described or depicted hereafter. FIG. 1D shows apparatus 20', which is substantially the same as apparatus 20, but further includes a retaining ring assembly 48 which is a safety device to prevent sliding tool holder 35 from sliding out of contact with coupling member 45, such as can occur during rotation at high speed. Under conditions of high rotational speed, a rotational mass imbalance of cutting tool holder 35, such as that created by tool support 30, can result in creation of a centrifugal load larger than the frictional load which restrains movement of cutting tool holder 35. Under these conditions, cutting tool holder 35 can move laterally. Retaining ring 48 limits the sliding movement of tool holder 35 so that there is contact between tool holder 35 and body 38 of coupling member 45.

Retaining ring 48 has a split 48a along one side. Split 48a permits ring 48 to slide in close tolerance over the outer diameter of body 38. A fastener 48b can be tightened to retain compression of ring 48 along inner diameter 48c against the outer surface of body 38. A second, larger inner diameter 48d provides clearance to the outer surface of cutting tool 35, this clearance being sufficient for adjustment of the position of cutting tool 25. However, this clearance is insufficient for disengagement of cutting tool 35 from body 38.

Figure 11:
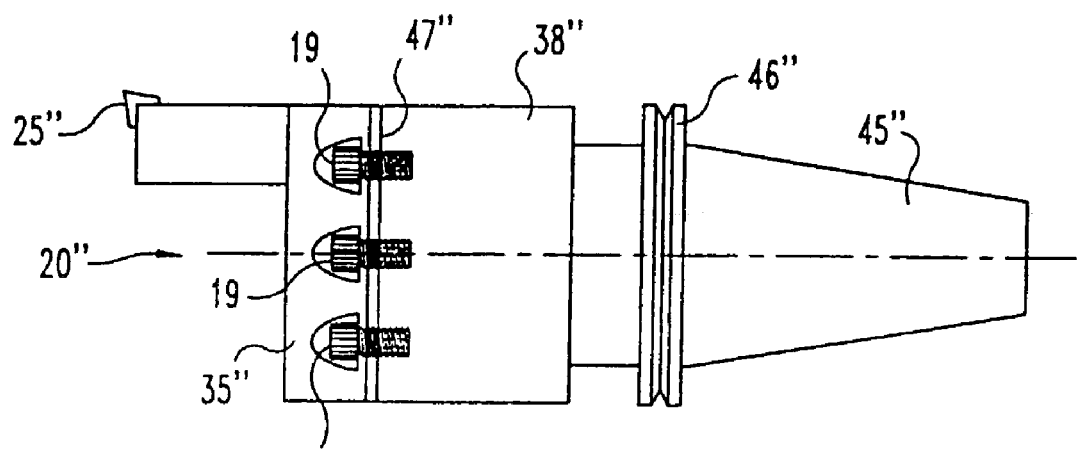
FIG. 11 is a side elevational view of an apparatus according to another embodiment of the present invention.

FIG. 11 depicts a side elevational view of a boring tool apparatus 20" according to another embodiment of the present invention. Apparatus 20" is substantially similar to apparatus 20, but includes a plurality of set screws 19 for clamping tool holder 35" to body 38". Apparatus 20" does not necessarily include the internal frictional adjustment apparatus 40 of boring tool 20. Set screws 19 are adjusted to a predetermined level of torque. This predetermined level of torque places sufficient friction on sliding tool holder 35" to maintain it in place during machining, but insufficient friction to maintain sliding tool holder 35" in place during on-machine adjustment as described herein. Set screws 19 can include various locking devices or locking methods known to those of ordinary skill in the art which insure that the set screws maintain a particular angular position and therefore a particular amount of friction.

One embodiment of the present invention similar to apparatus 20" includes a boring tool manufactured by Criterion Machine Works of Costa Mesa, Calif. A Criterion boring tool part no. DBL-204 head is coupled to a Criterion CB3-CV50 tapered adapter body. This boring tool includes an original equipment worm-gear mechanism to adjust the position of the cutting tool. This worm-gear is removed. The three set screws which restrain the cutting tool holder from sliding relative to the adapter body are torqued to approximately 40 inch pounds. The boring tool is installed on a SPN63 (serial no. 46600031) CNC boring machine manufactured by Niigata Machinery of Schaumburg, Ill. The boring tool is automatically adjusted by the boring machine by placing a surface of the boring tool against a static member, with the CNC machine applying a lateral load sufficient to adjust the lateral position of the cutting tool. The boring tool can machine a plurality of bores while maintaining the coupling of the boring tool to the boring machine, and maintaining the same clamping of the cutting tool to the boring tool. It is believed that the force required to slide the tool holder relative to the adapter body is about 370 pounds force.

Figure 4:
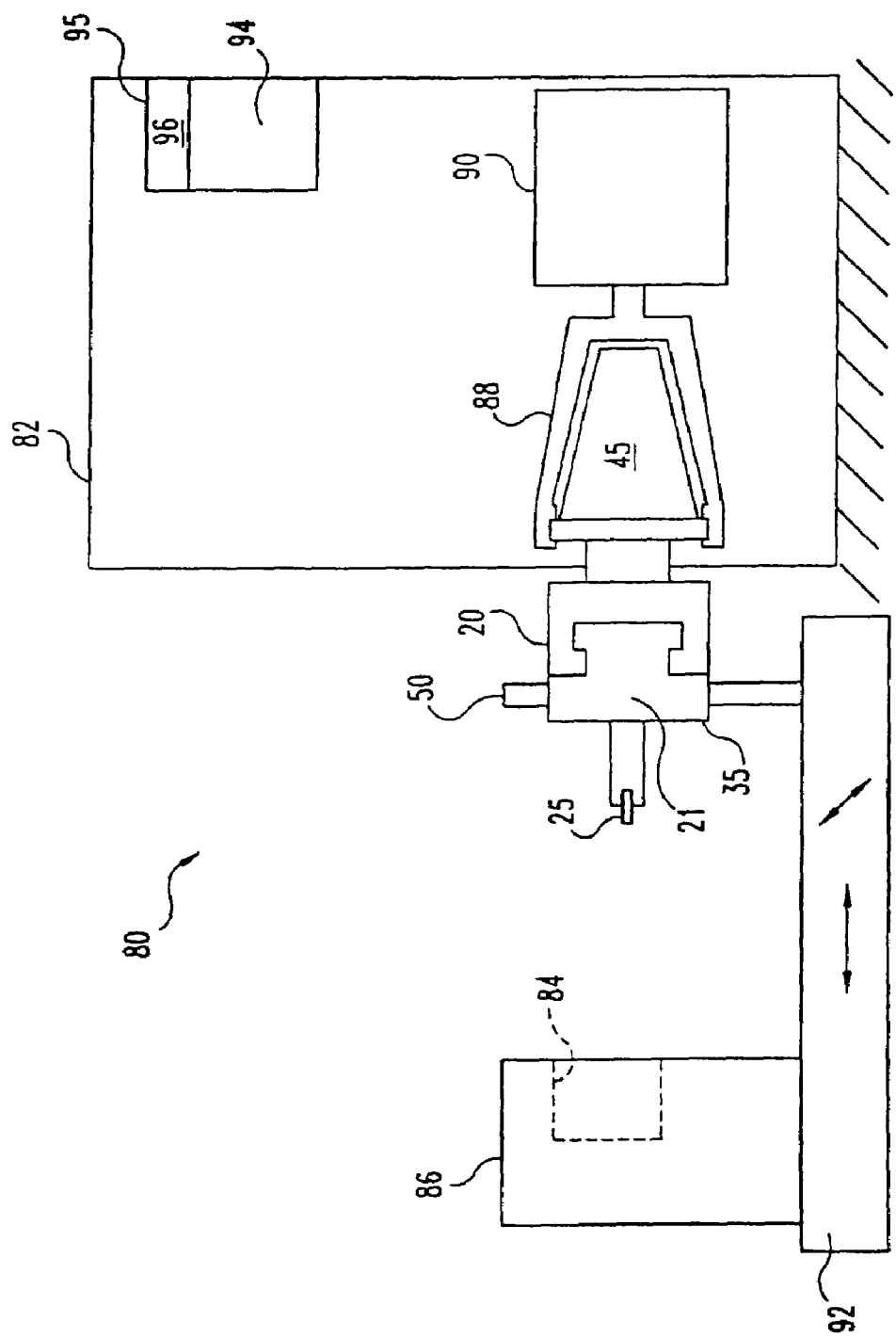
FIG. 4 is a schematic representation of a system for boring holes and adjusting a boring tool according to another embodiment of the present invention.

FIG. 4 schematically depicts a system 80 according to another embodiment of the present invention. An electronically controlled machine (such as a CNC boring machine) 82 uses a slidably adjustable boring tool 20 to bore a hole 84 in a workpiece or product 86, such as a transmission case. Boring machine 82 includes a drive unit 88 which releaseably couples to coupling element 45 in a conventional manner. Drive unit 88 provides power from a motor 90 to rotate boring tool 20 during the boring process. In one embodiment, motor 90 and drive unit 88 maintain boring tool 20 in a fixed location, and machining of bore 84 is accomplished by mounting product 86 to a table 92 which is capable of movement in multiple axes. However, the present invention also contemplates lateral and axial movement of boring tool 20 relative to table 92, or lateral and axial motions of both boring tool 20 and table 92. Preferably, machine 82 includes a computer 94 which includes memory 95 for storing a software algorithm 96. Machine 82 preferably includes a plurality of position sensors (not shown) which detect translational movement of table 92 and/or drive unit 88. Although a CNC boring machine has been shown and described, the present invention also contemplates boring machines which are electronically controlled without the use of a computer, as well as boring machines which are mechanically controlled.

One manner of adjusting the location of cutting tool 25 of boring tool 20 is as follows. The operator machines a feature on the object such as a bore, measures a characteristic of the feature such as the diameter of the bore, and determines the magnitude of error in the size of the feature. The operator then issues instructions to the CNC machine, or alternatively runs software on the CNC machine or electronically positions an electronically controlled boring machine or manually positions a manually controlled boring machine, to adjust the position of cutting tool 25 by a distance corresponding to the measured error. In the case of an electronically or mechanically controlled boring machine that is not computer controlled, the operator uses the appropriate electrical or manual controls for sideways movement of the boring tool. Further, the present invention contemplates those embodiments in which the measurement of the diameter of the bore is performed automatically by one or more position sensors of the electronically controlled machine 82. The present invention contemplates the use of any type of position sensor, including LVDTs, potentiometers, lasers, or any other devices known in the art.

Adjustment of the lateral position of cutting tool 25 relative to coupling element 45 is accomplished by placing an external surface 21 of tool holder 35 against a surface 51 of a static member 50. In one embodiment of the present invention, drive unit 88 and the coupled boring tool are moved laterally at a first, high travel rate until surface 21 is close to surface 51, at which time a slower travel rate is used. This placement of external surface 21 against rigid surface 51 is consistent with the direction in which tool holder 35 slides relative to coupling element 45. For example, for a boring tool 20 as shown in FIG. 1B, the rigid member 50 extends vertically as shown on FIG. 1B and touches the side external surface 21 of tool holder 35. Forces exerted between rigid member 50 and surface 21 are at least partly parallel to the direction of sliding motion of tool holder 35 relative to coupling element 45. However, the present invention is not limited to the use of a vertically oriented rigid member, and contemplates any orientation for a surface that permits contact between the surface and an external surface of the tool holder for exerting a force for sliding movement of the tool holder 35 relative to coupling element 45. In some embodiments of the present invention, the boring tool is moved relative to a static member. In other embodiments, a member, preferably a member under control of the CNC machine, is moved relative to a static boring tool.

After placement of surface 21 against surface 51, the machine presses the two surfaces together. This pressing together of the two surfaces does not result in sliding movement of tool holder 35 until the static friction force holding tool holder 35 relative to coupling element 45 is overcome. Once the lateral force exerted by the machine overcomes the static frictional force, tool holder 35 moves laterally as long as the force applied by the machine is greater than the dynamic (or moving) frictional force between tool holder 35 and coupling element 45. The machine continues to apply a lateral force until position sensors (not shown) of the electronic machine, or alternatively the human operator of a manually controlled machine, indicates that sufficient movement has occurred to place the cutting tool at the new, proper location.

The CNC boring machine moves tool 20 sideways with a force sufficient to overcome the friction between surfaces 37a and 44a, as well as any other sliding contact surfaces. In one embodiment of the present invention, the drive unit and boring tool are moved laterally at a slow rate. The present invention also contemplates those embodiments in which tool 20 is held stationary and table 92 moves laterally relative to boring tool 20, and also those embodiments in which both boring tool 20 and table 92 move relative to each other. The force required to move the cutting tool relative to the coupling member can be a first, higher value to overcome static or breakaway friction, followed by a second, lower value to overcome moving or dynamic friction. The machine applies this force until it has moved tool holder 35 sideways by the distance necessary to correctly size the bore. This distance corresponds to a dimensional error previously determined by the operator.

As seen in FIG. 1A, moving the tool holder 20 in the direction indicated by the "larger" arrow against static member 50 results in tool holder 35 and cutting tool 25 becoming offset from machine coupler 45 in a direction to bore a larger hole. Moving tool holder 20 in the direction indicated by the "smaller" arrow against rigid member 50 results in tool holder 35 and cutting tool 25 becoming offset from machine coupler 45 in a direction to bore a smaller hole. If it is desired to increase the size of the machined bore, then the lateral position of the cutting tool holder would be moved as indicated by the "larger" arrow against static member 50. Correspondingly, if it is desired to produce a smaller bore (such as on a new object), then the sliding tool holder will be moved relative to coupling member 45 in the direction indicated by the "smaller" arrow. Although what has been shown and described is a method including machining, measuring, calculating an error, and re-machining a feature such as a bore, the present invention contemplates the machining of any type of feature on an object which can be machined with a slidably adjustable tool holder. In some circumstances it is desirable to reset the position of the cutting tool holder, such as from a "unknown" position to a "known" position.

In these circumstances, one embodiment of the present invention contemplates a first sliding of the cutting tool relative to the coupling member in a first direction to a first position, especially a position for machining a small bore. This first sliding is accomplished after placing a first surface of the boring tool in contact with the static member. In one embodiment, this first sliding is designed to accept a boring tool having a cutting tool in an unknown position, and by the first sliding place the cutting tool in a first known position, such as a reference position.

After this first sliding, a second surface of the boring tool is placed in contact with a second surface of the static member. Preferably, the second surface of the boring tool is on a side of the boring tool opposite of the first surface. As a result of sliding motion of the machining apparatus table relative to the machining apparatus drive unit, a force is exerted on a surface slidable with the cutting tool holder of the boring tool to move the cutting tool holder in a second direction opposite of the first direction to a second, known position. The second sliding moves the cutting tool from the first known reference position to a position for ready for machining an object.

The present invention contemplates a static member 50 for reacting and resisting the lateral adjustment force exerted by the boring machine. Preferably, static member 50 reacts to the lateral adjustment force with little movement of the member itself. In this way, the lateral movement of the coupling member during adjustment as measured by one or more position sensors of machine 82 is primarily the sliding movement of the cutting tool holder relative to the coupling member, and not the flexibility or "give" of the static member. However, the present invention also contemplates those embodiments in which member 50 has flexibility, including embodiments in which there is compensation for this flexibility. Therefore, some embodiments include an algorithm in which the amount of sliding motion adjusting the position of the cutting tool as measured by the position sensors of the machining apparatus is different than the machining error calculated by the operator. For example, the algorithm can include adding or subtracting a fixed amount to the calculated error, and/or multiplying the error by a constant greater than or less than one. As another example, the present invention contemplates those embodiments in which static member 50 freely moves a small distance after being contacted by the boring tool, such as the case where the contact surface of the static member is coupled to a button or sensor which provides a signal to the operator or electronic controller that contact between the boring tool and the static member has been established. As another example, it may be known that a particular static member deflects a particular amount before the cutting tool holder slides relative to the coupling member.

The present invention contemplates a static member 50 comprising a separable fixture bolted or otherwise attached to the boring machine, a static surface of the product being bored, or any other static surface which is within the travel distance of the table relative to the boring machine. Although what has been shown and described is a system 80 which includes a slidably adjustable boring tool 20, the present invention contemplates the use of any slidably adjustable boring tools described herein with system 80. Further, although what has been shown and described is a slidably adjustable boring tool 20 in which the cutting tool holder 35 slides relative to coupling member 45, it is understood that repositioning of the cutting tool is contemplated, and the use of any tool holder which permits that repositioning is included in the present invention.

Yet another embodiment of the present invention contemplates a method for machining a characteristic of an object in which either the operator or electronically controlled machine 82 adjusts the position of cutting tool 25 while maintaining the boring tool coupled to the driving element and maintaining clamping of the tool holder relative to the coupling member to a first, initial position for rough cutting of the characteristic on the object. The operator or electronic controller then slidably adjusts the position of cutting tool 25 to a second position for a second, fine cut of the characteristic without making a measurement of the characteristic after the first, rough cut.

Figure 2A:
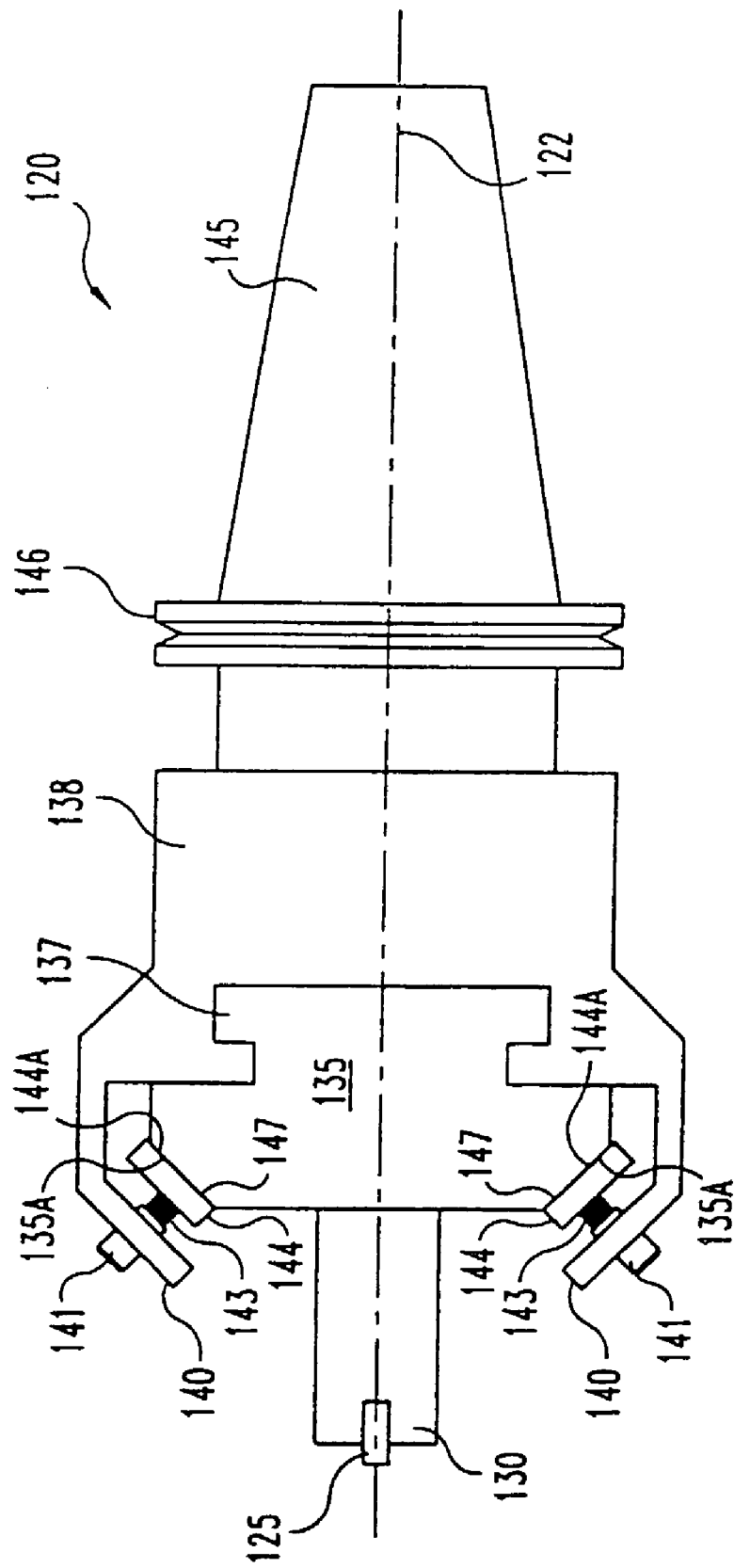
FIG. 2A is a side elevational view according to another embodiment of the present invention.

FIG. 2A shows a side view of slidably adjustable boring tool 120 according to another embodiment of the present invention. The use herein of an "N" hundred-series prefix (NXX) with an element number (XX.X) refers to an element that is the same as the non-prefixed element (XX.X) previously described or depicted, accept for the differences which are described or depicted hereafter.

Boring tool 120 includes a tool holder 135 that is slidably adjustably relative to coupling element 145 by overcoming the friction forces at a frictional interface between coupling element 145 and tool holder 135.

Body 138 of coupling 145 preferably includes a pair of frictional adjustment apparatus 140. Each adjustment apparatus 140 includes an adjusting member 141 such as a threaded fastener. One end of adjusting element 141 bears against a spring 143. Rotation of adjusting element 141 results in a change in the force exerted by spring 143 against a brakeplate 144. Brakeplate 144 includes a contact surface 144A which contacts surface 135A of tool holder 135. Preferably, one or both of contact surfaces 144A and 135A include a frictional coating 147 for increasing or modifying the coefficient of friction between the two contact surfaces.

Although the use of a friction coating 47 and 147 has been shown and described for increasing the coefficient of friction between the contact surfaces, the present invention also contemplates the use of materials and surface coatings on one or both of the contact surfaces which do not increase the coefficient of friction, but provide a known and consistent coefficient of friction. For example, some embodiments of the present invention include surface coatings between the contact surfaces that decrease the coefficient of friction, but in these cases the total frictional force which clamps holder 35 relative to coupling element 45 can be increased by increasing the normal force between the contact surfaces. Some embodiments of the present invention utilize a low coefficient of friction surface coating combined with a high normal force particularly where the surface coating provides resistance to galling, adequate wear resistance, and adequate durability. Regardless of the coefficient of friction between the contact surfaces, the frictional force clamping tool holder 35 relative to coupling element 45 is sufficient to maintain the location of cutting tool 25 during machining, and the frictional force is insufficient to withstand the lateral load imposed against the rigid surface during adjustment.

Preferably, the contact surfaces are parallel to each other. As can be seen in FIG. 2A, both contact surfaces 135A and 144A are displaced 45° relative to centerline 122 of boring tool 120. However, the present invention also contemplates those embodiments in which the contact surfaces are not parallel to each other, such that an edge of one contact surface makes line contact with the other contact surface. Further, the present invention contemplates those embodiments in which the contact between brakeplate 144 and tool holder 135 is not coated with frictional material 147. In these embodiments contact between contact surfaces 135A and 144A does not provide the primary frictional load for clamping tool holder 135 relative to coupling element 45. Instead, the contact surfaces are the primary means for imparting a normal force onto other surfaces of tool holder 135 that are in contact with surfaces of body 138 of coupling element 145. Therefore, the present invention also contemplates creating a normal force between a first pair of contact surfaces, and providing the primary frictional force between a different pair of contact surfaces.

Figure 3B:
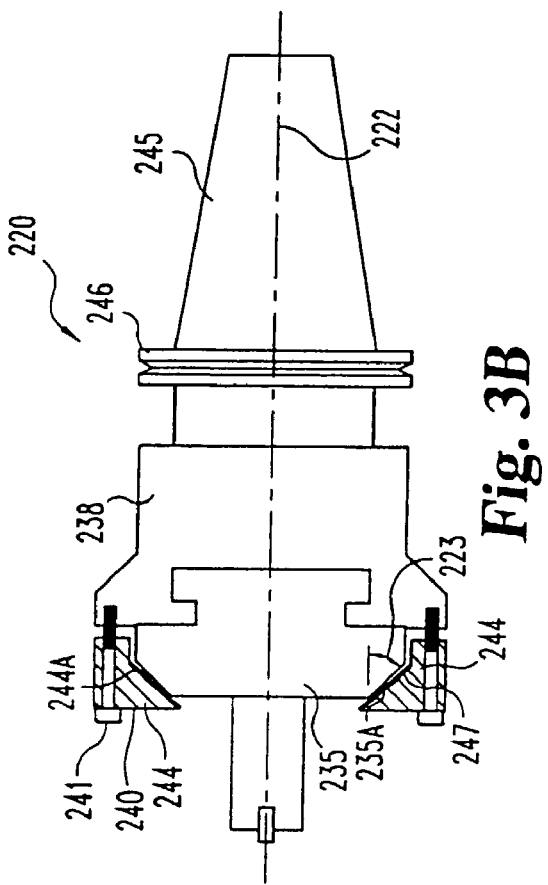
FIG. 3B is a side elevational view of the apparatus of FIG. 3A, with some portions shown in cross-section.
Figure 3C:
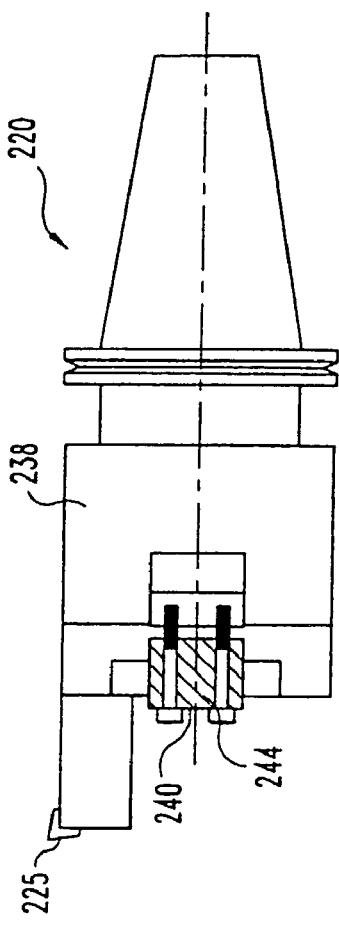
FIG. 3C is a side elevational view of the apparatus of FIG. 3A with some portions shown in cross-section.
Figure 3A:
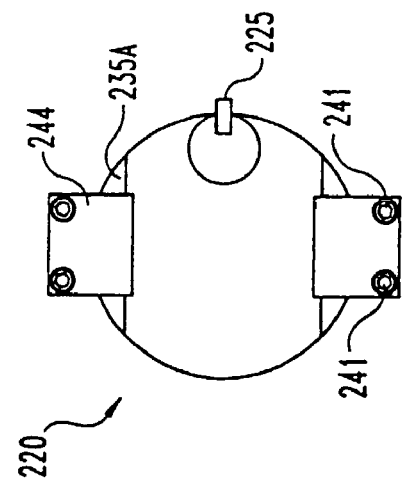
FIG. 3A is an end view of an apparatus according to another embodiment of the present invention.

FIGS. 3A, 3B, and 3C present one front and two side elevational views, respectively, of an apparatus according to another embodiment of the present invention. These figures depict various views of a boring tool 220 according to another embodiment of the present invention. Boring tool 220 includes preferably a pair of frictional adjustment apparatus 240 which provide clamping between tool holder 235 and body 238 of coupling element 245. Each adjustment apparatus 240 includes a static member 244 that is fastened by a fastener 241 to body 238. Member 244 includes a contact surface 244A that is in contact with a mating contact surface 235A of tool holder 235. Preferably, both contact surfaces 244A and 235A are generally parallel, and both are preferably displaced at an acute angle 223 relative to centerline 222. Tightening of fasteners 241 into body 238 provides a normal force between contact surfaces 235A and 244A. However, the normal force between the contact surfaces is a fraction of the axial load within the fasteners 241. This fraction depends upon the sine of angle 223. For example, for an angle 223 of 30°, the normal force exerted between the contact surfaces is only half of the axial load within the fasteners 244, since the fasteners 244 are oriented parallel to centerline 222. Therefore, the amount of normal force between the contact surfaces can be adjusted by selection of angle 223. As angle 223 approaches zero, the normal force between the contact surfaces decreases toward zero. In this way, the normal load between contact surfaces is controlled by selection of the angle 223 and the torque applied to fasteners 241. Thus, the present invention contemplates those embodiments such as boring tool 220 in which the frictional adjustment apparatus does not require a spring for adjusting the normal load.

It is to be understood that the present invention contemplates those embodiments in which the frictional force which restrains movement of sliding tool holder 35 results from forces applied parallel to axis 22, in either direction. For example, some of the springs, hydraulic pressure, solenoids, electromagnets, and centrifugal weights shown herein and related and equivalent devices can be used to urge the sliding tool holder apart from the coupling member. However, the present invention also contemplates those embodiments in which the springs, hydraulic pressure, solenoids, electromagnets, and centrifugal weights and related and equivalent devices are used to urge the sliding tool holder toward the coupling element. For those embodiments in which the tool holder and coupling element are urged apart, the axial load X imparted to the cutting tool during machining opposes this urging force on the boring tool, and thus reduces the net normal force acting between frictional surfaces. This net reduction in normal forces corresponds to a net reduction in the frictional force which restrains sliding movement of the tool holder.

For those embodiments in which the tool holder and coupling member are urged together, the axial load X applied on the cutting tool during machining increases the normal force applied between frictional surfaces. In this latter example the frictional forces which restrain lateral movement of the tool holder are increased during machining. For those embodiments in which boring tool 20 is arranged and configured such that the sliding tool holder is urged toward the coupling member, the X-direction machining forces act in what can be thought as a "self-energizing" manner, i.e., use of the cutting tool increases the frictional force which restrains the tool holder from sliding.

Figure 5:
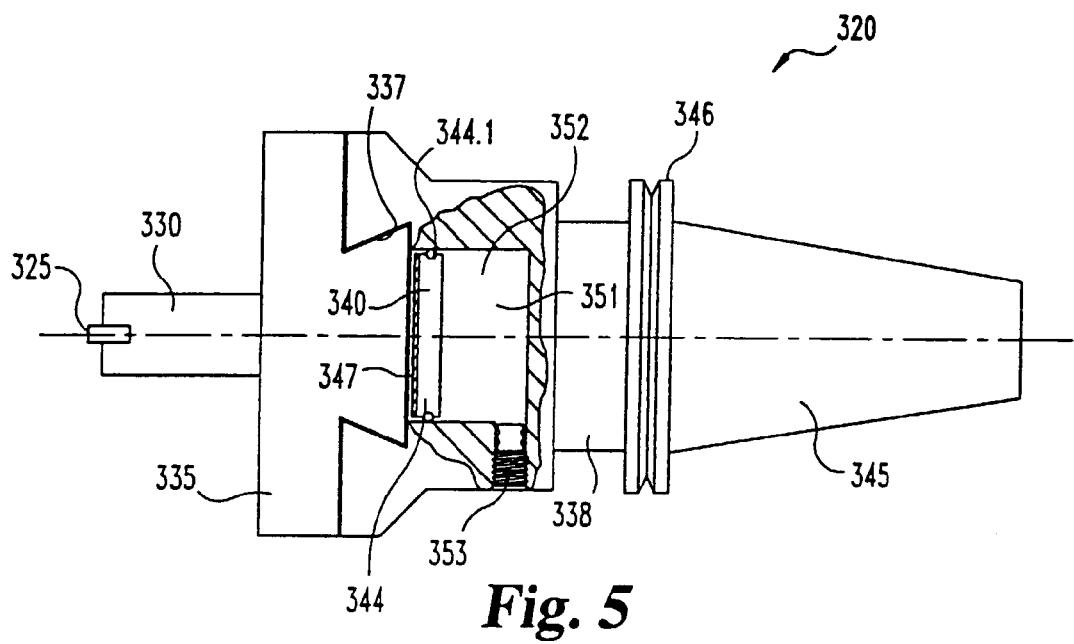
FIG. 5 is a side elevational view of an apparatus according to another embodiment of the present invention, and including a partial internal view.

FIG. 5 shows a side elevational view of an apparatus 320 according to another embodiment of the present invention. Apparatus 320 is a boring tool which includes a slidably adjustable cutting tool 325. Cutting tool 325 is fixedly supported, such as by a tool support 330, which extends from a slidably adjustable tool holder 335. Tool holder 335 preferably includes a joint 337 such as a dovetail joint or T-joint which slidingly couples to a complementary-shaped joint of a coupling element body 338. Coupling element body 338 is part of a coupling element 345. Coupling element 345 preferably includes a conically-shaped end and a coupling interface 346, both of which locate boring tool 320 in a drive unit such as drive unit 88 of electronically controlled machine 82 (referring to FIG. 4). Referring again to FIG. 5, apparatus 320 includes a friction adjustment apparatus 340 which applies a normal force between facing contact surfaces of apparatus 320.

Apparatus 320 includes means 340 for applying a friction force between contact surfaces for clamping the sliding cutting tool to the boring tool. Means 340 includes a chamber 351 within coupling element body 338. A piston 344 is slidable within chamber 351. A sealing member 344.1 provides a seal between piston 344 and the walls of chamber 351. A pressure adjusting screw 353 is threadably received within a bore of body 338. Chamber 351 includes hydraulic fluid 352. Rotation of adjusting screw 353 either inward or outward relative to body 338, either increases or decreases, respectively, the amount of fluid 352 displaced from the bore. This change in the amount of displaced fluid results in a corresponding change in the position of piston 344. For example, inward rotation of screw 353 results in movement of piston 344 toward cutting tool holder 335. After screw 353 has been moved sufficiently to bring piston 344 in contact with tool holder 355, any subsequent change in the position of screw 353 changes the pressure within chamber 351, with a corresponding change in the force applied between piston 344 and tool holder 335. In one embodiment, a surface treatment or surface coating 347 is applied to a surface of piston 344 (as shown in FIG. 5), or alternately to the corresponding contact surface of tool holder 335. In another embodiment, a surface treatment or surface coating is applied against one or both of the angled surfaces of dovetail joint 337. The present invention contemplates creation of a frictional force between any pair of surfaces contacting between body 338 and tool holder 335, and/or adjusting means 340 and tool holder 335.

Figure 6A:
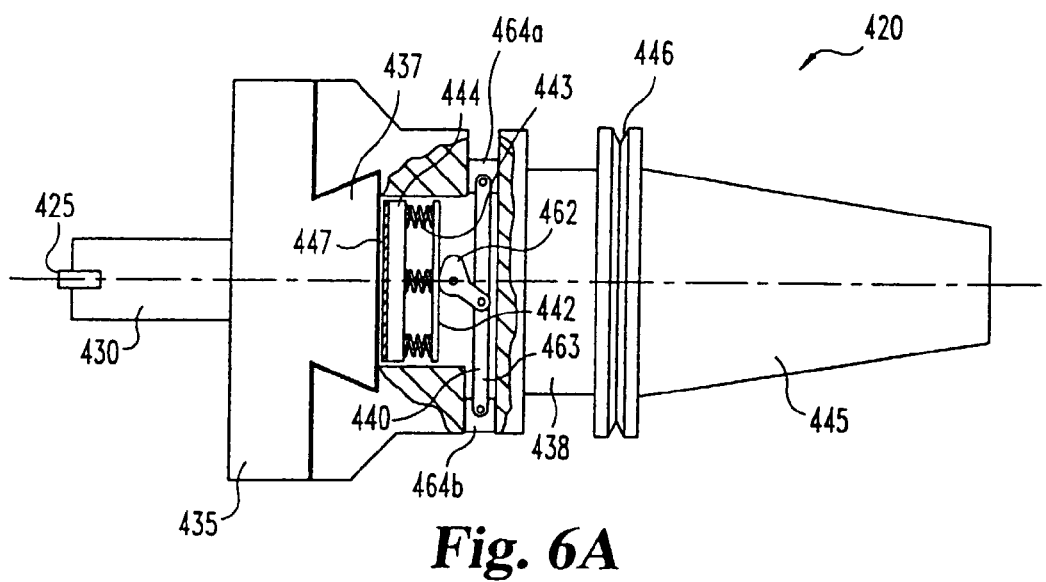
FIG. 6A is a side elevational view of an apparatus according to another embodiment of the present invention, and including a partial internal view.

FIG. 6A shows a side elevational view of an apparatus 420 according to another embodiment of the present invention. Apparatus 420 is a boring tool which includes a slidably adjustable cutting tool 425. Cutting tool 425 is fixedly supported, such as by a tool support 430, which extends from a slidably adjustable tool holder 435. Tool holder 435 preferably includes a joint 437 such as dovetail joint or T-joint which slidingly couples to a complementary-shaped joint of a coupling element body 438. Coupling element body 438 is part of a coupling element 445. Coupling element 445 preferably includes a conically-shaped end and a coupling interface 446, both of which locate boring tool 420 in a drive unit such as drive unit 88 of electronically controlled machine 82 (referring to FIG. 4).

Referring again to FIG. 6A, apparatus 420 includes a friction adjustment apparatus 440 for clamping the sliding cutting tool to the boring tool which applies a normal force between facing contact surfaces of apparatus 420, which can also be operated as means for actuating a variable friction force between a pair of contact surfaces, at least one of the contact surface being on sliding tool holder 435. Actuating means 440 includes a member 442 which displaces a plurality of springs 443 so as to urge member 444 toward tool holder 435. A surface treatment or surface coating 447 applied to member 444 (as shown), or alternately to the opposing face of tool holder 435, creates a frictional drag which opposes lateral sliding movement of tool holder 435. Further, the present invention contemplates application of a surface treatment or surface coating 447 to any pair of contact surfaces loaded in compression between tool holder 435 and body 438.

Actuating means 440 includes a cam 462 pivotally coupled to body 438, and also pivotally coupled to a linkage 463. Arranged on either end of linkage 463 are moveable buttons 464*a* and 464*b*. As shown in FIG. 6A, actuating means 440 is in a first state in which button 464*b* is in an outward location, and cam 462 pivoted to a first position. Cam 462 displaces member 442 by a first predetermined distance and thereby applies a first predetermined force through springs 443 which create a first contact force against sliding tool holder 435. This first contact force creates a corresponding first frictional force which resists sliding motion of tool holder 435.

Actuation means 440 can also be actuated to a second state which results in a second predetermined frictional force between contact surfaces of sliding tool holder 435 and either body 438 or actuating means 440. Actuating 440 can be placed in this second state by moving button 464*b* inward, which action causes linkage 463 to pivot cam 462 to a second position which further displaces member 442 and increases the compression of springs 443. This additional compression of springs results in a higher normal force of member 444 against tool holder 435. Actuation means 440 can be returned to the first state by inward movement of button 464*a*. Actuation means 440 can be actuated to either the first state or the second state by an operator using a tool to either push or pull buttons 464*b* or 464*a*. Further, the present invention also contemplates those embodiments in which actuation means 440 is actuated to either the first state or the second state automatically by a mechanism, such as a mechanism operably coupled to the CNC boring machine. For example, a tool such as a rod can be attached to the boring machine or the table, with the controller of the boring machine placing apparatus 420 such that one of buttons 464*a* or 464*b* are in contact with the rod. Subsequent lateral movement of apparatus 420 will result in movement of the contacting button.

Figure 6B:
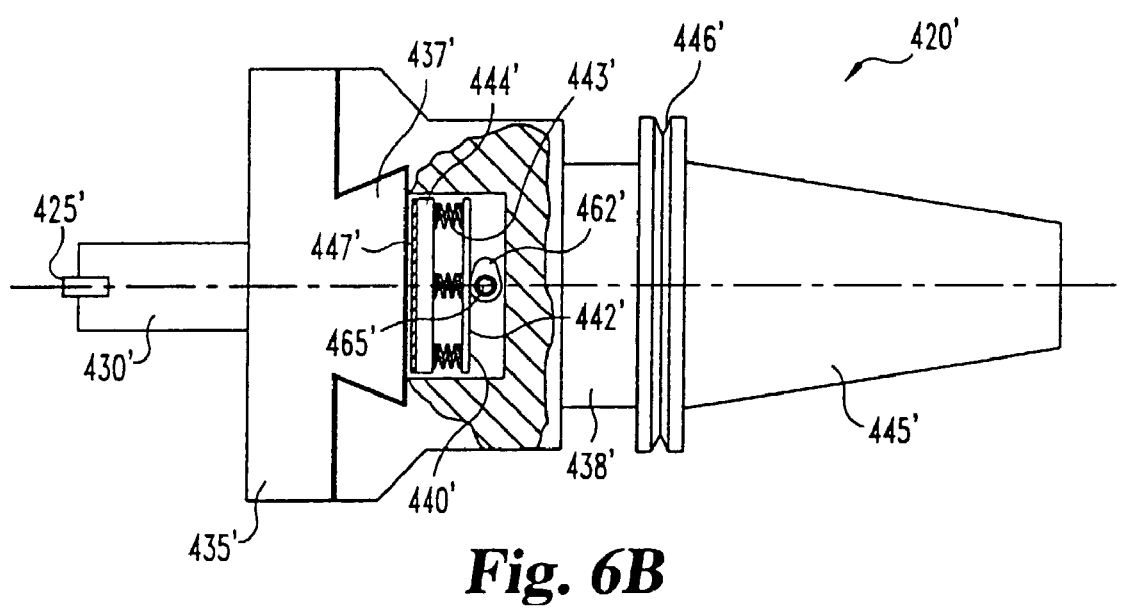
FIG. 6B is a side elevational view of an apparatus according to another embodiment of the present invention, and including a partial internal view.

FIG. 6B depicts an apparatus 420' substantially identical to apparatus 420, but including features for direct coupling of a tool to cam 462'. Apparatus 420*b* does not necessarily include the push buttons 464*a* or 464*b* and does not necessarily include link 463 for actuation of actuating means 440'. Apparatus 440' includes an Allen head or related torque-application feature coincident with pivot point 465 which permits the machine operator to directly pivot cam 462'. Access to the Allen head of cam 462' is provided through a bore (not shown) in body 438'. Thus, an operator can rotate cam 462' with a tool to a first position or state in which frictional forces restraining motion of tool holder 435 can be overcome by an adjusting force laterally applied to tool holder 435. After the position of cutting tool 425' has been laterally adjusted, the operator inserts the tool through the bore of body 435 to turn cam 462' to a second position or state in which a higher frictional force restrains sliding motion of 435, the second higher level of frictional force being sufficient to withstand any lateral loads applied during machining. In addition, the present invention contemplates those embodiments in which cam 462' is turned automatically by a mechanism such as a portion of the CNC machine, without the need for operator manual access.

Figure 7:
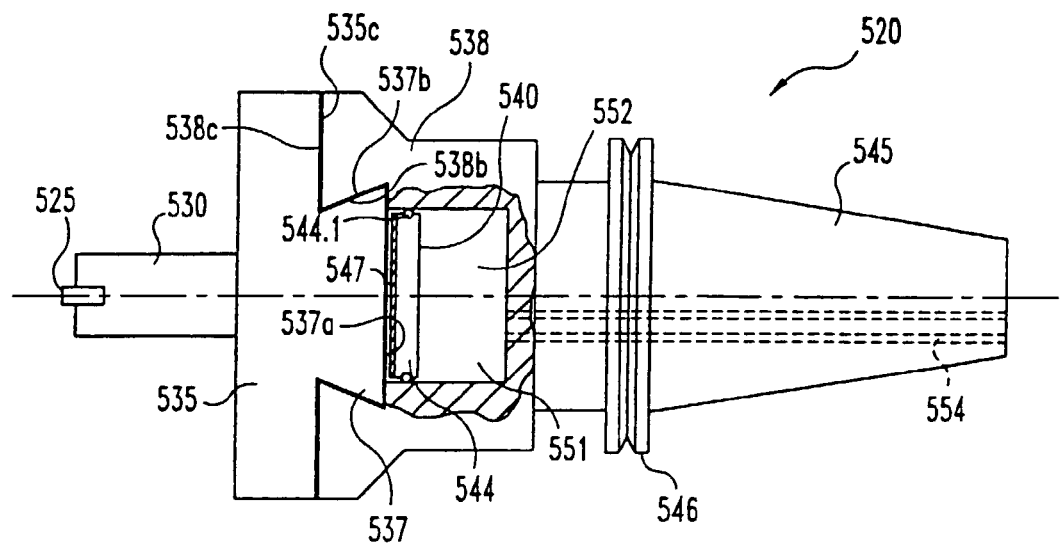
FIG. 7 is a side elevational view of an apparatus according to another embodiment of the present invention, and including a partial internal view.

FIG. 7 shows a side elevational view of an apparatus 520 according to another embodiment of the present invention. Apparatus 520 is a boring tool which includes a slidably adjustable cutting tool 525. Cutting tool 525 is fixedly supported, such as by a tool support 530, which extends from a slidably adjustable tool holder 535. Tool holder 535 preferably includes a joint 537 such as dovetail joint or T-joint which slidingly couples to a complementary-shaped joint of a coupling element body 538. Coupling element body 538 is part of a coupling element 545. Coupling element 545 preferably includes a conically-shaped end and a coupling interface 546, both of which locate boring tool 520 in a drive unit such as drive unit 88 of electronically controlled machine 82 (referring to FIG. 4).

Referring again to FIG. 7, apparatus 520 includes a friction adjustment apparatus 540 for clamping the sliding cutting tool to the boring tool which applies a normal force between facing contact surfaces of apparatus 520, which can also be operated as means 540 for actuating a variable frictional force. Actuating means 540 includes a piston 544 slidable within a chamber 551. Pressure from a source such as a hydraulic pump (not shown) through hydraulic pressure port 554 pressurizes the hydraulic fluid 552 within chamber 551. As one example, a hydraulic pump mounted to machine 82 provides hydraulic pressure through drive unit 88 into port 554 of coupling member 545.

Pressure of fluid 552 results in a corresponding force exerted by member 544 upon sliding tool holder 535. This force exerted by member 544 corresponds to a predetermined frictional force between opposing surfaces of tool holder 535 and either body 538 and/or actuating means 540. In one embodiment, actuating means 540 can be actuated to a first state corresponding to first predetermined frictional force by application of a first hydraulic pressure within chamber 551. In another embodiment, actuating means 540 can also be actuated to a second state in which a second, higher pressure within chamber 551 results in a correspondingly higher frictional force exerted against a contact surface of tool holder 535 to resist sliding movement of tool holder 535 relative to coupling member 545. In addition, the present invention contemplates those embodiments in which pressure is provided pneumatically by a gas such as compressed air.

Figure 8:
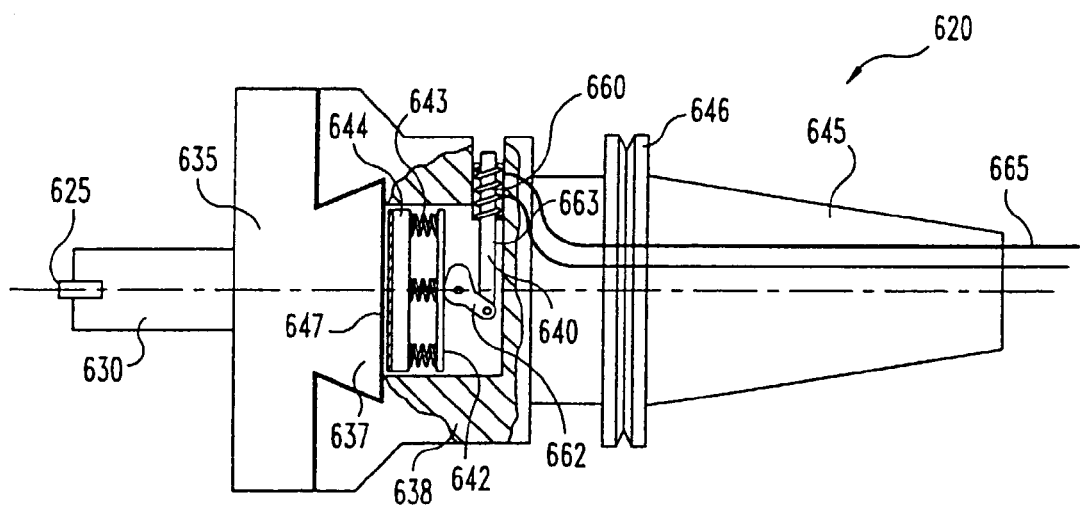
FIG. 8 is a side elevational view of an apparatus according to another embodiment of the present invention, and including a partial internal view.

FIG. 8 shows a side elevational view of an apparatus 620 according to another embodiment of the present invention. Apparatus 620 is a boring tool which includes a slidably adjustable cutting tool 625. Cutting tool 625 is fixedly supported, such as by a tool support 630, which extends from a slidably adjustable tool holder 635. Tool holder 635 preferably includes a joint 637 such as dovetail joint or T-joint which slidingly couples to a complementary-shaped joint of a coupling element body 638. Coupling element body 638 is part of a coupling element 645. Coupling element 645 preferably includes a conically-shaped end and a coupling interface 646, both of which locate boring tool 620 in a drive unit such as drive unit 88 of electronically controlled machine 82 (referring to FIG. 4).

Referring again to FIG. 8, apparatus 620 includes a friction adjustment apparatus 640 for clamping the sliding cutting tool to the boring tool which applies a normal force between facing contact surfaces of apparatus 620, which can also be operated as actuating means for applying a variable frictional force against sliding tool holder 635. Actuating means 640 includes a cam 662 pivotally coupled to body 638 and also pivotally coupled in a slot to linkage 663. Linkage 663 is linearly actuated by an electromagnetic solenoid 660 comprising a core and windings. A pair of electrical conductors 665 provide electrical power from a source (not shown) to actuate solenoid 660 between first and second states. As one example, electrical power is provided from machining apparatus 82 through slip rings (not shown) of drive unit 88 to conductors 665.

As shown in FIG. 8, solenoid 660 is in a first state, in which cam 662 is in a first position to urge springs 643 against a member 644 to create a contact force against tool holder 635. Solenoid 663 can be changed in state to transition link 663 upwards (as seen in FIG. 8) and thus pivot cam 662 to a second position in which springs 643 urge member 644 against tool holder 635 with a second, higher contact force. This second contact force results in a second, higher frictional force applied against tool holder 635 which restrains tool holder 635 from lateral movement during machining.

In one embodiment, solenoid 660 is an electromagnetic solenoid with two positions. As one example, solenoid 660 can be actuated by application of electrical voltage to a first state. Removal of the electrical voltage results in the core of solenoid 660 transitioning to a second state by an internal spring load. In other embodiments, solenoid 660 is a two position latching electromagnetic solenoid, in which application of a first voltage moves the core of solenoid 660 to a first direction to a first position, and application of a reverse voltage moves the core of solenoid 660 in an opposite direction to a second position. Further, the present application contemplates those embodiments in which the core of the electromagnetic solenoid does not directly act upon the cam and linkage of the actuating means, but instead acts upon a second stage, and the second stage provides the motive force necessary to pivot the cam. As one example, the second stage can be a hydraulically actuated stage, in which case the first stage of solenoid 660 operates to actuate an electrohydraulic valve.

Figure 9:
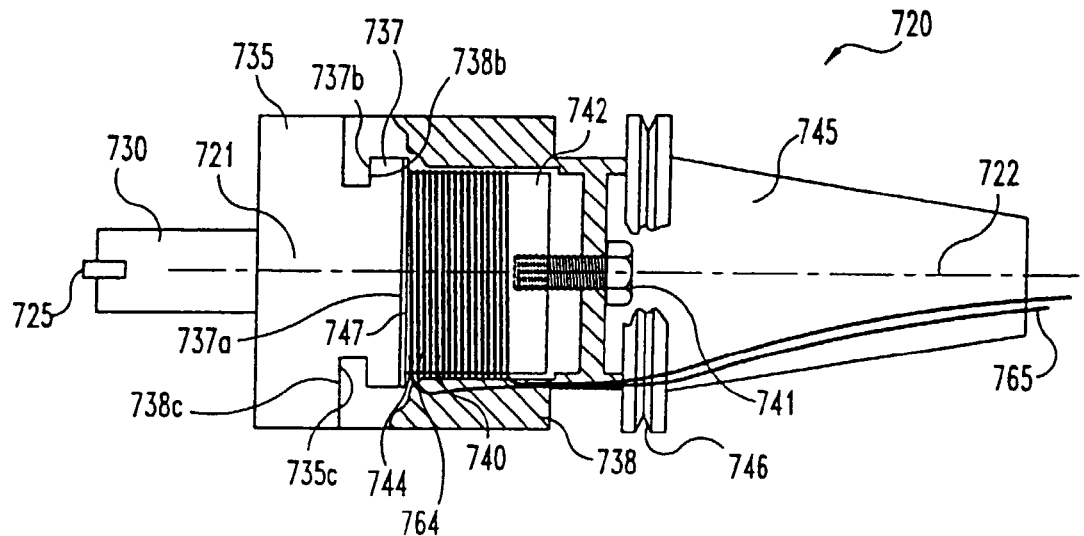
FIG. 9 is a side elevational view of an apparatus according to another embodiment of the present invention, and including a partial internal view.

FIG. 9 shows a side elevational view of an apparatus 720 according to another embodiment of the present invention. Apparatus 720 is a boring tool which includes a slidably adjustable cutting tool 725. Cutting tool 725 is fixedly supported, such as by a tool support 730, which extends from a slidably adjustable tool holder 735. Tool holder 735 preferably includes a joint 737 such as dovetail joint or T-joint which slidingly couples to a complementary-shaped joint of a coupling element body 738. Coupling element body 738 is part of a coupling element 745. Coupling element 745 preferably includes a conically-shaped end and a coupling interface 746, both of which locate boring tool 720 in a drive unit such as drive unit 88 of electronically controlled machine 82 (referring to FIG. 4).

Referring again to FIG. 9, apparatus 720 includes a friction adjustment apparatus 740 for clamping the sliding cutting tool to the boring tool which applies a normal force between facing contact surfaces of apparatus 720, which can also be operated as means for actuating a variable frictional force between contact surfaces of tool holder 735 and either actuating means 740 or coupling body 738. Actuating means 740 includes an electromagnet comprising a core member 744 and windings 764. Core member 744 is coupled at one end to an adjusting screw 741 which can adjust the distance between a face of core member 744 and an opposing face of sliding tool holder 735. As electrical power is applied to conductors 765 from an electrical power source (not shown), voltage and windings 764 create a magnetic field with core member 744 that attracts sliding tool holder 735. The force of attraction created by the electromagnet results in a contact force between opposing surfaces of tool member 735 and body 738. These contact forces result in a corresponding frictional force which restrains tool member 735 from sliding relative to body 738.

Actuating means 740 can be actuated to first and second states of magnetic attraction by corresponding application of first and second electrical currents through conductors 765. These first and second magnetic forces correspond to first and second levels of frictional force for restraining tool holder 735 from lateral movement. Further, some embodiments include application of a single amount of current through conductors 765 so as to apply a single force between opposing contact surfaces. Some embodiments of the present invention contemplate the use of slip rings on the coupling element to provide electrical power from an external source. Yet other embodiments contemplate the use of a battery placed within the boring tool to provide internal electrical power.

Although what has been shown and described is an electromagnet formed from a separable body within body 738 of coupling 745, the present invention further contemplates the use of an electromagnet that is integral to body 738, and which attracts at least a portion of tool holder 735 in a direction so as to create a frictional force on tool holder 735 that resists sliding motion. Further, the present invention also contemplates an electromagnet that is either separable or integral with tool holder 735, and which attracts tool holder 735 toward body 738 when energized. Those embodiments of the present invention using electromagnetic force to create the frictional force that resists sliding contemplate the use of magnetic materials in the construction of the boring tool, such as for the sliding tool holder or for the coupling member. Further, the present invention contemplates those embodiments in which there are two electromagnets, including as a non-limiting example, a first electromagnet coupled to the tool holder and a second electromagnet coupled to the coupling member.

Figure 10:
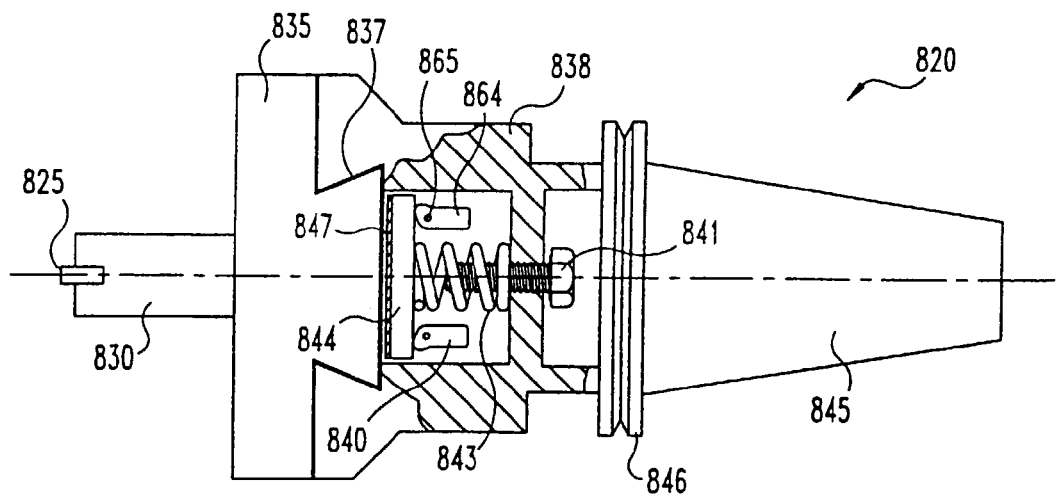
FIG. 10 is a side elevational view of an apparatus according to another embodiment of the present invention, and including a partial internal view.

FIG. 10 shows a side elevational view of an apparatus 820 according to another embodiment of the present invention. Apparatus 820 is a boring tool which includes a slidably adjustable cutting tool 825. Cutting tool 825 is fixedly supported, such as by a tool support 830, which extends from a slidably adjustable tool holder 835. Tool holder 835 preferably includes a joint 837 such as dovetail joint or T-joint which slidingly couples to a complementary-shaped joint of a coupling element body 838. Coupling element body 838 is part of a coupling element 845. Coupling element 845 preferably includes a conically-shaped end and a coupling interface 846, both of which locate boring tool 820 in a drive unit such as drive unit 88 of electronically controlled machine 82 (referring to FIG. 4).

Referring again to FIG. 10, apparatus 820 includes a friction adjustment apparatus 840 for clamping the sliding cutting tool to the boring tool which applies a normal force between facing contact surfaces of apparatus 820, and is also means 840 for actuating a variable force between opposing contact surfaces of sliding tool holder 835 and either coupling body 838 or actuating means 840. Actuating means 840 preferably includes a plurality of centrifugal weights 864 which are pivotally coupled by a pivot 865 to body 838. Actuating means 840 includes an adjusting screw 841 which applies a static load via spring 843 to member 844. This static load from spring 843 applies a first contact force against sliding tool holder 835 in a first, non-rotating state of apparatus 820. This first state creates a frictional force against tool holder 835 sufficient to restrain tool holder 835 from any loose lateral movement, but insufficient to restrain the lateral position of tool holder 835 when the lateral position of the tool holder is adjusted as described herein.

Rotation of apparatus 820 actuates means 840 to a second state which corresponds to a second, higher contact force applied by member 844 against sliding tool holder 835. As apparatus 820 rotates such as for machining an object, the more massive end of centrifugal weights 864 are thrown outwards, causing centrifugal weights 864 to pivot about pivot 865. Preferably, centrifugal weights 864 include a cam-type shape, and the pivoting actions of weights 864 cause the cam end to press against member 844 with a corresponding second, higher level of contact force against tool holder 835.

FIGS. 12–15 depict various views of an apparatus 920 according to another embodiment of the present invention. Apparatus 920 is a boring tool assembly which includes a slidably adjustable cutting tool 925. Cutting tool 925 is fixedly supported, such as by a tool support 930, which extends from a slidably adjustable tool holder 935. Tool holder 935 preferably includes a joint 937 such as a dovetail joint or a T-joint which slidably couples to a complementary-shaped joint of a coupling element body 938. Coupling element 945 includes a coupling element body 938, and locates boring tool 920 on a drive unit such as drive unit 88 of machine 82 (referring to FIG. 4).

Figure 12B:
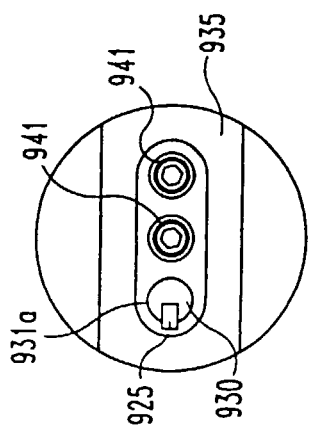
FIG. 12B is a view of the apparatus of FIG. 12A as taken along line 12B—12B of FIG. 12A.

Boring tool 920 preferably includes a multiple piece tool holder 935 which comprises a joint portion 937 coupled by a plurality of bolts 941 to tool holding portion 935.1. Referring to FIGS. 12B and 14B, tool holding portion 935.1 of tool holder 935 includes a plurality of bores 931$a$, 931$b$, and 931$c$ for receiving an inserted tool support 930. A set screw (not shown) received within the appropriate threaded hole 918 locks tool support 930 within the specific hole.

Figure 13B:
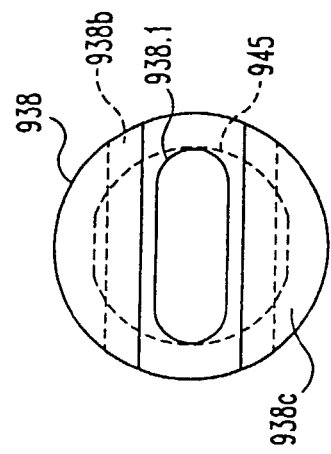
FIG. 13B is a view of the apparatus of FIG. 13A as taken along line 13B—13B of FIG. 13A.
Figure 12A:
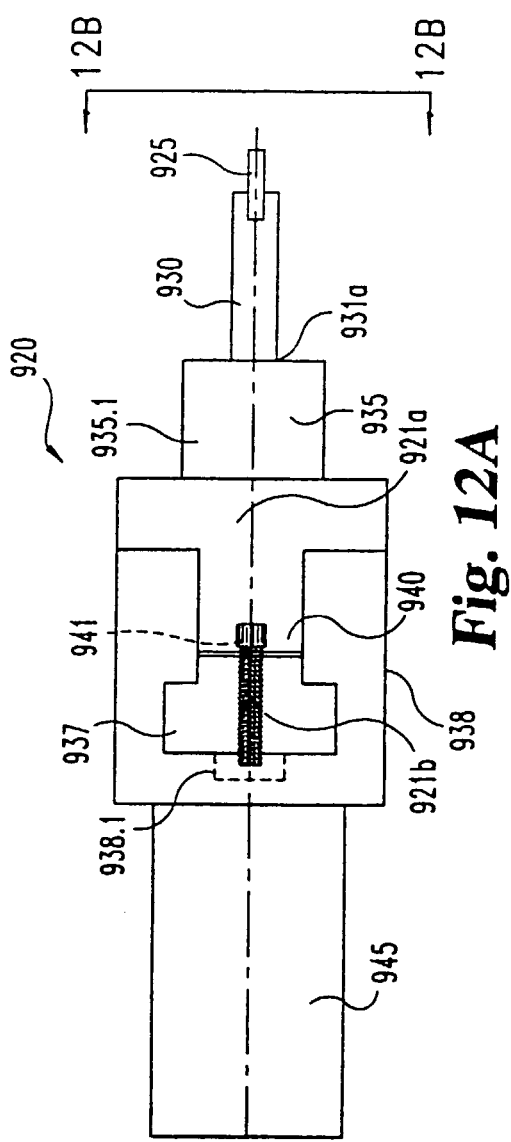
FIG. 12A is a side elevational view of an apparatus according to another embodiment of the present invention.
Figure 13A:
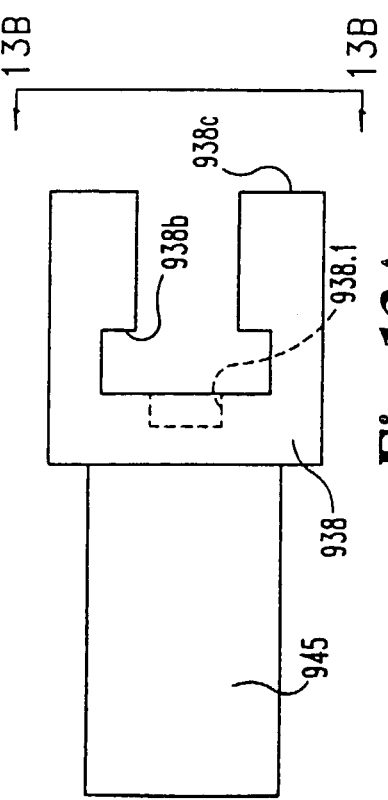
FIG. 13A is a side elevational view of a portion of the apparatus of FIG. 12A.

As best seen referring to FIGS. 12A, 13A, and 15A, joint portion 937 is slidingly received within a complementary-shaped portion of body 938. A second, tool-holding portion 935.1 is further slidingly received within a second complementary-shaped portion of body 938. Tool holder portions 937 and 935.1 are fastened together by one or more fasteners 941, which in one embodiment is an Allen head screw. Each fastener 941 is received within a counterbored hole 931$a$, 931$b$, and/or 931$c$ (as best seen in FIG. 12A and FIG. 14C). Referring to FIGS. 12A, 13A, and 13B, the threaded end of the fastener is received within a counterbored well 938.1 of body 938. As seen in FIG. 15B, joint portion 937 includes one or more threaded holes 931$a'$, 931$b'$, and 931$c'$ to accept the threaded portion of fasteners 941.

Referring to FIGS. 12A, 14A, and 15A, the sliding assembly of tool holder portions 935.1 and 937 within body 938 preferably leaves a small gap between opposing faces 935.2 and 937.2. In those embodiments having this gap, tightening of fasteners 941 results in compression and friction at two faces of body 938. Contact face 937$b$ of T-joint portion 937 is placed in compressive contact with opposing face 938$b$ of body 938 (see FIG. 13A). Further, contact surface 938$c$ is placed in compressive contact with contact face 935.1$c$ of tool holding portion 935.1. Because of the aforementioned gap between opposing faces of portions 937 and 935.1, these are two frictional interfaces for restraining the lateral motion of tool holder 935.

Boring tool 920 can include various combinations of layers of friction materials, surface coatings, and/or surface treatments so as to modify the frictional forces at either the first pair of contact surfaces, 937$b$ and 938$b$, and/or the second pair of contact surfaces, 935.1$c$ and 938$c$. As one non-limiting example, a first friction treatment to increase frictional forces can be applied at contact surfaces 938$c$ and/or 935.1$c$. A second type of frictional treatment to decrease the coefficient of friction can be applied at contact surfaces 937$b$ and/or 938$b$. In this embodiment, it is preferable to apply the lateral forces for adjusting the position of cutting tool 925 at a contact point 921$a$ along a surface of tool holding portion 935.1, since portion 935.1 is more tightly held by friction than joint portion 937. However, the present invention also contemplates those embodiments in which the lateral force for adjusting the position of the cutting too is applied at a contact point 921$b$ along a surface of T-joint portion 937. The present invention also contemplates those embodiments in which the lateral adjusting force is applied simultaneously along surfaces of portions 937 and 935.1.

FIGS. 16–19 depict various views of an apparatus 1020 according to another embodiment of the present invention. Apparatus 1020 is a boring tool assembly which includes a slidably adjustable cutting tool 1025. Cutting tool 1025 is fixedly supported, such as by a tool support 1030, which extends from a slidably adjustable tool holder 1035. Tool holder 1035 preferably includes a cylindrical joint 1037 which slidably couples to a complementary-shaped joint of a coupling element body 1038. Coupling element 1045 includes a coupling element body 1038 locates boring tool 1020 on a drive unit such as drive unit 88 of machine 82 (referring to FIG. 4).

Boring tool 1020 preferably includes a multiple piece tool holder 1035 which comprises a T-joint portion 1037 coupled by a plurality of bolts 1041 to tool holding portion 1035.1. Referring to FIGS. 16B and 18B, tool holding portion 1035.1 of tool holder 1035 includes a plurality of bores 1031$a$, 1031$b$, and 1031$c$ for receiving an inserted tool support 1030. A set screw (not shown) received within the appropriate threaded hole 1018 locks tool support 1030 within the specific hole.

Figure 17B:
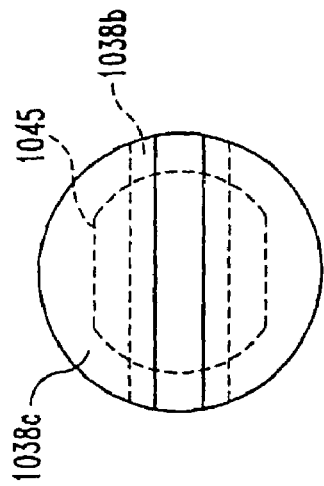
FIG. 17B is a view of the apparatus of FIG. 17A as taken along line 17B—17B of FIG. 17A.
Figure 19B:
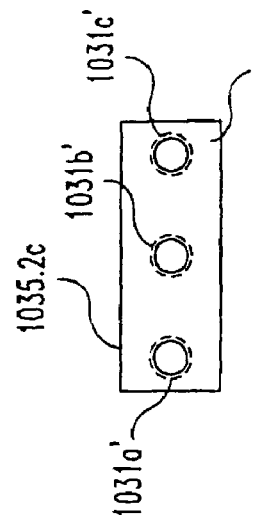
FIG. 19B is a view of the apparatus of FIG. 19A as taken along line 19B—19B of FIG. 19A.
Figure 17A:
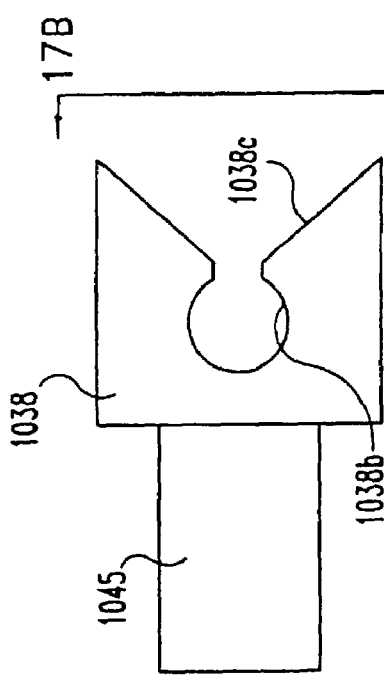
FIG. 17A is a side elevational view of a portion of the apparatus of FIG. 16A.
Figure 19A:
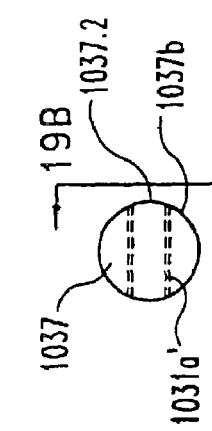
FIG. 19A is a side elevational view of portion of the apparatus of FIG. 16A.

As best seen referring to FIGS. 16A, 17A, and 19A, joint portion 1037 is slidingly received within a complementary cylindrically shaped portion of body 1038. A second, tool-holding portion 1035.1 is further slidingly received within a second complementary-shaped portion of body 1038. Tool holder portions 1037 and 1035.1 are fastened together by one or more fasteners 1041, which in one embodiment is an Allen head screw. Each fastener 1041 is received within a counterbored hole 1031$a$, 1031$b$, and/or 1031$c$ (as best seen in FIG. 16A and FIG. 18C). Referring to FIGS. 16A, 17A, and 17B, the threaded end of the fastener is received within a counterbored well 1038.1 of body 1038. As seen in FIG. 19B, joint portion 1037 includes one or more threaded holes 1031$a'$, 1031$b'$, and 1031$c'$ to accept the threaded portion of fasteners 1041.

Referring to FIGS. 16A, 18A, and 19A, the sliding assembly of tool holder portions 1035.1 and 1037 within body 1038 preferably leaves a small gap between opposing faces 1035.2 and 1037.2. In those embodiments having this gap, tightening of fasteners 1041 results in compression and friction at two faces of body 1038. Cylindrical contact face 1037$b$ of joint portion 1037 is placed in contact with opposing face 1038$b$ of body 1038 (see FIG. 17A). Further, contact surface 1038$c$ is placed in compressive contact with contact face 1035.1$c$ of tool holding portion 1035.1. Because of the aforementioned gap between opposing faces of portions 1037 and 1035.1, these are two frictional interfaces for restraining the lateral motion of tool holder 1035.

Boring tool 1020 can include various combinations of layers of friction materials, surface coatings, and/or surface treatments so as to modify the frictional forces at either the first pair of contact surfaces, 1037b and 1038b, and/or the second pair of contact surfaces, 1035.1c and 1038c. As one non-limiting example, a first friction treatment to increase frictional forces can be applied at contact surfaces 1038c and/or 1035.1c. A second type of frictional treatment to decrease the coefficient of friction can be applied at contact surfaces 1037b and/or 1038b. In this embodiment, it is preferable to apply the lateral forces for adjusting the position of cutting tool 1025 at a contact point 1021a along a surface of tool holding portion 1035.1, since portion 1035.1 is more tightly held by friction than joint portion 1037. However, the present invention also contemplates those embodiments in which the lateral force for adjusting the position of the cutting too is applied at a contact point 1021b along a surface of joint portion 1037. The present invention also contemplates those embodiments in which the lateral adjusting force is applied simultaneously along surfaces of portions 1037 and 1035.1.

The embodiments of the present invention described and shown herein include a single cutting tool. However, it is understood that the present invention is not limited to embodiments with a single cutting tool, and also contemplates those embodiments in which there are multiple cutting tools on a single coupling element, including those embodiments in which there are multiple slidingly adjustable cutting tools on a single coupling element.

Yet other embodiment of the present invention pertains to a slidably movable cutting tool holder that machines a workpiece during the sliding. In one embodiment, the cutting tool holder includes a contoured external surface, the contour of which corresponds to the desired shape of a hole or other feature to be machined into the workpiece. As the boring tool is advanced toward the object during machining, a static member in rolling or sliding contact with the cutting tool contoured surfaces pushes the cutting tool holder so that the cutting tool machines shape in the sidewall of the hole that corresponds to the shape of the contoured surface. The cutting tool contoured surface acts as a template for the final shape of the sidewalls, and the static member acts as a follower to the template.

Figure 20:
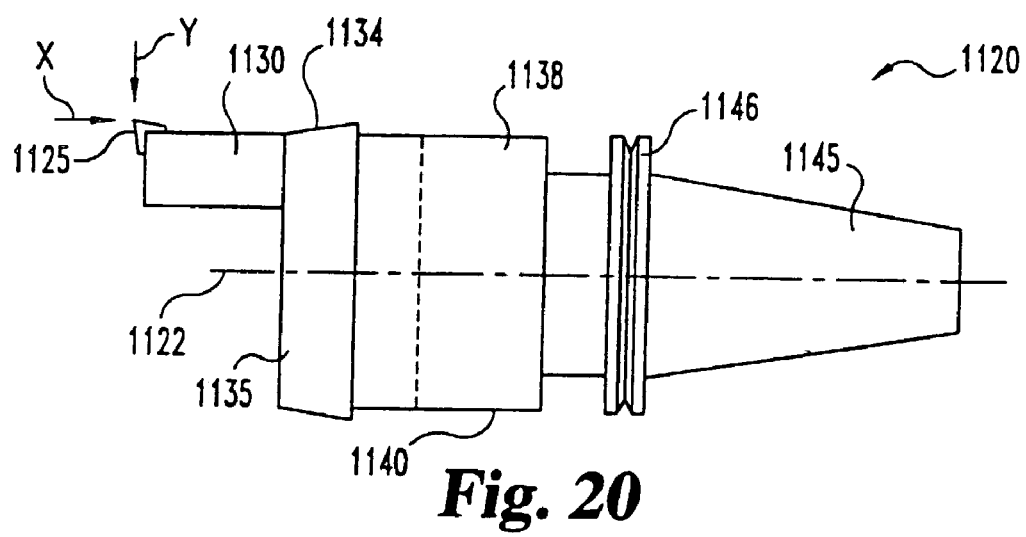
FIG. 20 is a side elevational view of a boring tool according to another embodiment of the present invention.
Figure 21:
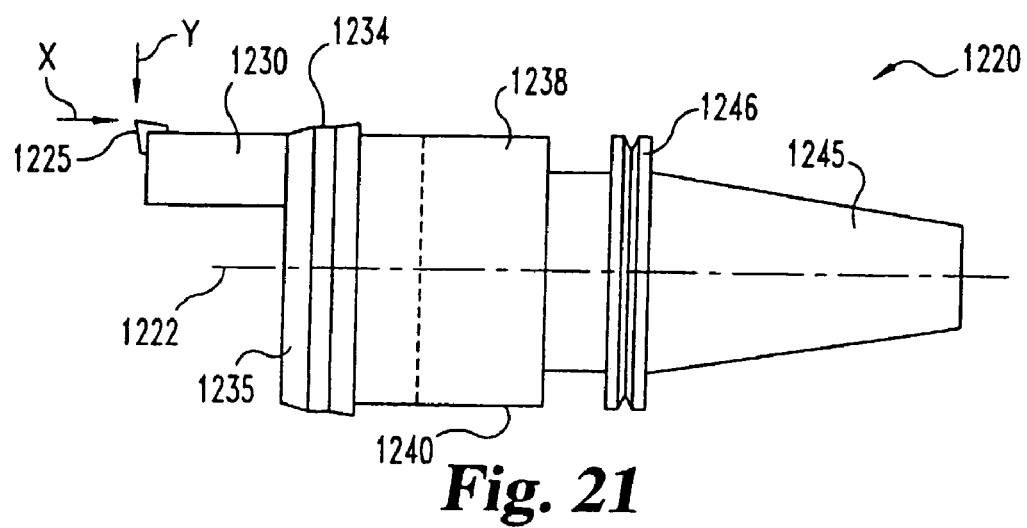
FIG. 21 is a side elevational view of a boring tool according to another embodiment of the present invention.

FIGS. 20 and 21 depict apparatuses 1120 and 1220 respectively, for boring a hole with a contoured sidewall. As used herein the term "contoured sidewall" refers to sidewalls of a hole in which at least a portion of the sidewall has a surface which is not parallel to the centerline of the hole. As non-limiting examples, contoured sidewalls can be conical, radiused, and/or S-shaped.

Boring tools 1120 and 1220 each include a cutting tool held within a cutting tool holder that is slidably coupled to a body of a coupling element. These boring tools include friction adjustment apparatus 1140 and 1240, respectively, for clamping sliding cutting tool to the boring tool by applying a normal surface between facing contact surfaces, and which can also be operated as means for actuating a variable friction force, in the manner generally as previously shown and described herein. However, the friction adjustment apparatus is adjusted to provide a frictional force which is sufficient to withstand any lateral force applied on the cutting tool holder by the machining forces applied to the cutting tool, but insufficient to withstand the lateral forces applied by the static member against the cutting tool holder.

Apparatus 1120 and 1220 differ from the other boring tools described herein by having an external contoured surface on the slidable cutting tool holder. As seen best in FIG. 20, boring tool 1120 includes an angled external surface 1134 which corresponds to a desired bevel angle to be machined into a hole of a workpiece. Referring to FIG. 21, boring tool 1220 includes a cutting tool holder 1235 with a contoured surface 1234 which includes a plurality of external angled surfaces, and also a central straight portion there between. Preferably, template surfaces 1134 and 1234 are hardened such as by heat treating and/or coating. Further, these contoured surfaces can be coated with a material that reduces sliding or rolling friction.

Figure 22:
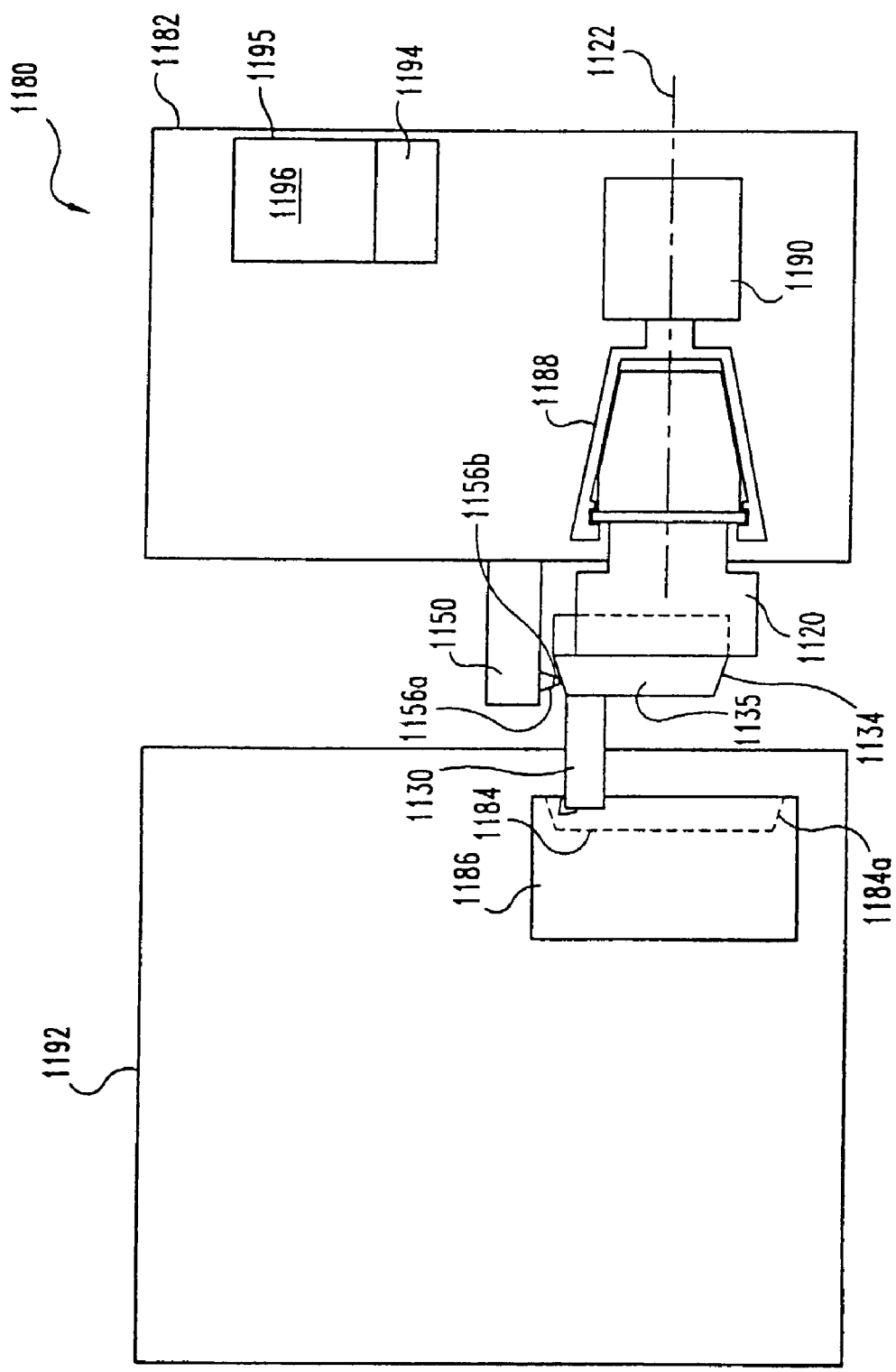
FIG. 22 is a schematic representation of a system for boring a contoured hole according to another embodiment of the present invention.

FIG. 22 schematically depicts a system 1180 according to another embodiment of the present invention. System 1180 preferably includes an electronically controlled machine (such as a CNC boring machine 1182) as previously described. As is well known in the art, boring machine 1182 advances boring tool 1120 along axis 1122 so as to machine workpiece 1186. However, the present invention also includes those embodiments in which table 1192 is moved axially toward the boring tool, which rotates but does not move axially.

System 1180 includes a static member 1150 which is preferably ridged and fixedly mounted to machine 1182. Thus, static member 1150 preferably does not move either axially or laterally as boring tool 1120 rotates and moves axially. However, in those embodiments in which table 1192 move axially toward the boring tool, static member 1150 is rigidly and fixedly mounted to 25 either table 1192 or workpiece 1186.

Static member 1150 includes a projecting follower 1156a which preferably includes at its end in antifriction bearing 1156b, such as a ball bearing. Antifriction bearing 1156b is captured within a socket of follower 1156a, and is free to rotate within that socket.

Static member 1150 is located proximate boring tool 1120, such that bearing 1156b of follower 1156a is in contact with contoured surface 1134 of boring tool 1120. Bearing 1156b presses against contoured surface 1134. As boring tool 1120 is advanced forward along axis 1122 toward workpiece 1186, bearing 1156b presses against contoured surface 1134, and slides cutting tool 1135 relative to boring tool 1120 by this pressing. Since boring tool 1120 is being rotated by drive unit 1188 during this axial advancement, the resulting hole machined into workpiece 1186 includes a sidewall 1184a which includes a contour that corresponds to the contour of surface 1134.

As best seen in FIG. 22, bearing 1156b presses against that portion of surface 1144 which is furthest away from rotational centerline 1122. Thus, the pressing of bearing 1156b against surface 1134 occurs once per revolution of boring tool 1120. Since cutting tool 1125 is located on that part of cutting tool holder 1135 which is also furthest away from centerline 1122, the sidewall 1184a of hole 1184 corresponds directly to the shape of contoured surface 1134.

Figure 23:
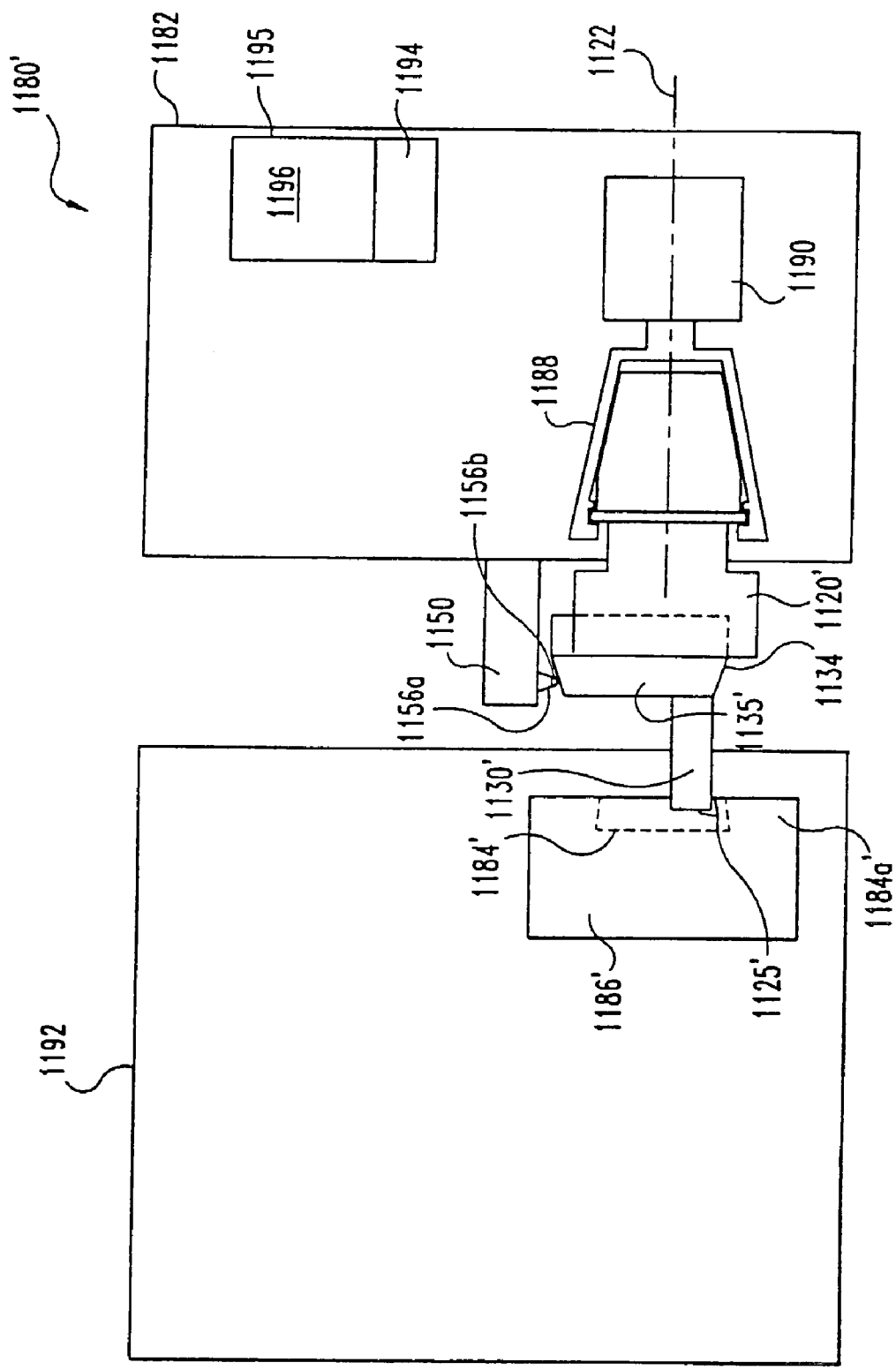
FIG. 23 is a schematic representation of a system for boring a contoured hole according to another embodiment of the present invention.

In contrast, FIG. 23 depicts a system 1180' for boring a hole such that the shape of the sidewalls corresponds to the inverse of the contoured surface of the cutting tool holder. In this embodiment, tool support 1130' is placed on the side of centerline 1122 that is opposite to the side of cutting tool holder 1135' which extends furthest from centerline 1122. As shown in FIG. 23, advancement of boring tool 1120' toward workpiece 1186' results in cutting tool 1125' machining a larger hole diameter as the advancement occurs because of the lateral movement of tool holder 1135. Therefore, contour 1184a' of hole 1184' corresponds to an inverted shape of contact surface 1134'.

In yet another embodiment of the present invention, the contoured surface corresponding to the desired shape of the hole contoured sidewall is placed on the static member, and the surface follower is located on the rotating boring tool. FIGS. 24 and 25 depict an apparatus 1420 for boring a hole with a contoured sidewall.

Boring apparatus 1420 includes the cutting tool, tool support, slidable cutting tool holder, coupling element, and coupling element body as previously described. Further, boring apparatus 1420 includes a friction adjustment apparatus 1440 for clamping the sliding cutting tool to the boring tool which applies a normal force between facing contact surfaces, and which can also be operated as actuating means for applying a variable friction force. However, the friction adjustment apparatus is adjusted to provide a frictional force which is sufficient to withstand any lateral force applied on the cutting tool holder by the machining forces applied to the cutting tool, but insufficient to withstand the lateral forces applied by the static member against the cutting tool holder.

Slidable cutting tool holder 1435 also includes on its outer surface a follower assembly comprising a projecting follower 1457a which preferably includes an antifriction bearing 1457b. Preferably antifriction bearing 1457b is a ball bearing retained in a socket of follower 1457a, and is free to rotate within the socket. As best seen in FIG. 25, follower 1457a and antifriction bearing 1457b are preferably located 180° opposite of cutting tool 1425. Any force applied against bearing 1457b thus tends to radially oppose a component of the machining forces applied to cutting tool 1425.

Figure 26:
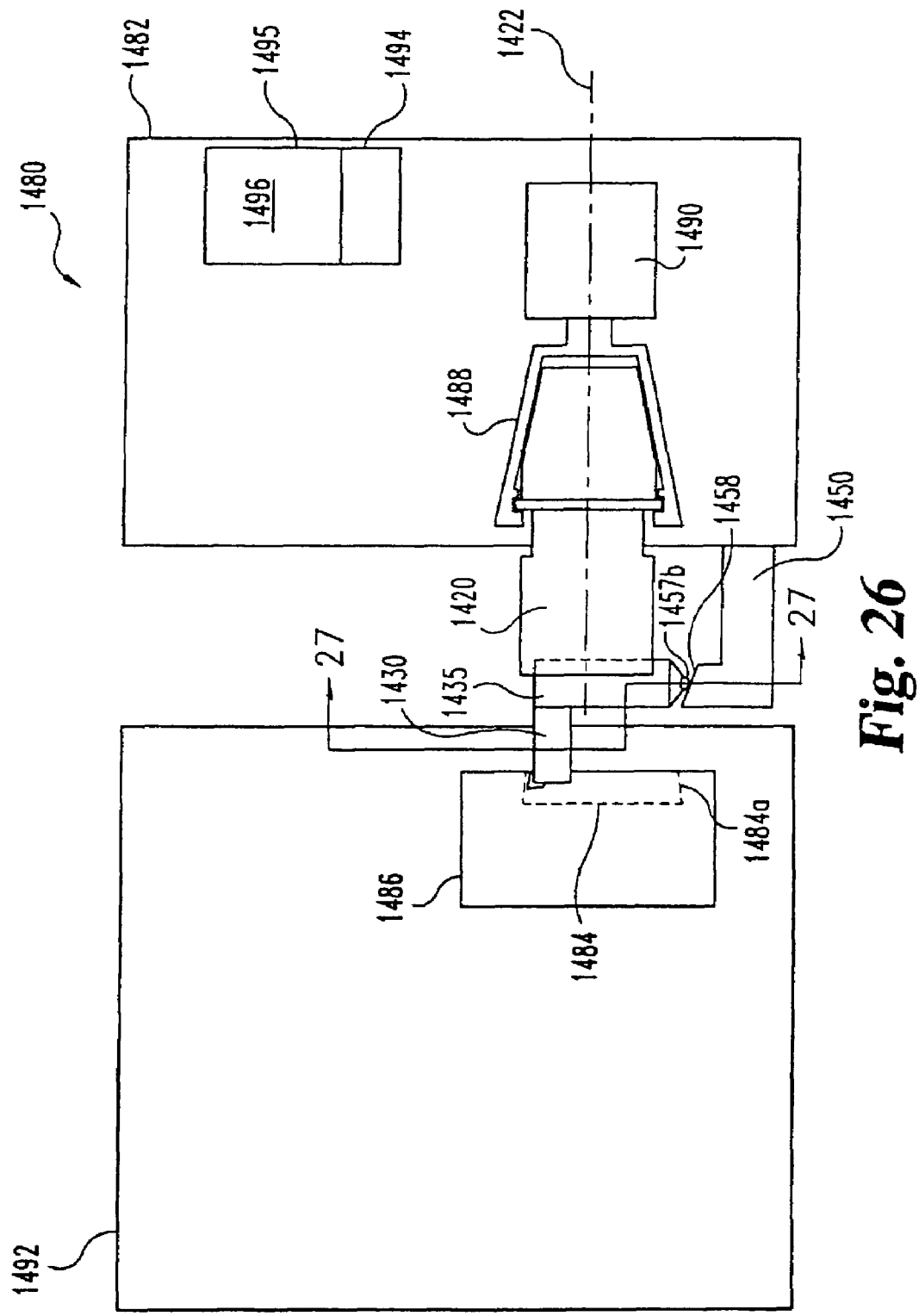
FIG. 26 is a schematic representation of a system for boring a contoured hole according to another embodiment of the present invention.

FIG. 26 schematically depicts a system 1280 according to another embodiment of the present invention. System 1280 preferably includes an electronically controlled machine (such as a CNC boring machine 1282) as previously described. As is well known in the art, boring machine 1282 advances boring tool 1220 along axis 1222 so as to machine workpiece 1286. However, the present invention also includes those embodiments in which table 1292 is moved axially toward the boring tool, which rotates but does not move axially.

System 1480 preferably includes a static member 1450 which is rigidly mounted to either table 1492, workpiece 1486, or for those embodiments in which the cutting tool is advanced along its central axis, to machining apparatus 1482. As shown in FIG. 26, static member 1450 includes a contoured surface 1458 which corresponds to a desired shape in the sidewalls 1484a of hole 1484. Bearing 1457b of boring tool 1420 is in rolling contact with contoured surface 1458. As boring tool 1420 is advanced along axis 1422 toward workpiece 1480, static member 1450 exerts a lateral force on cutting tool holder 1435 which slides tool holder 1435. As depicted in FIG. 26, tool support 1430 is located on the side of centerline 1422 that is opposite to the most radially outward portion of cutting tool holder 1435, and therefore the machined sidewall 1484a corresponds to the inverse of contoured surface 1458. It is understood that the present invention contemplates location of tool support 1430 anywhere on tool holder 1435.

Figure 27:
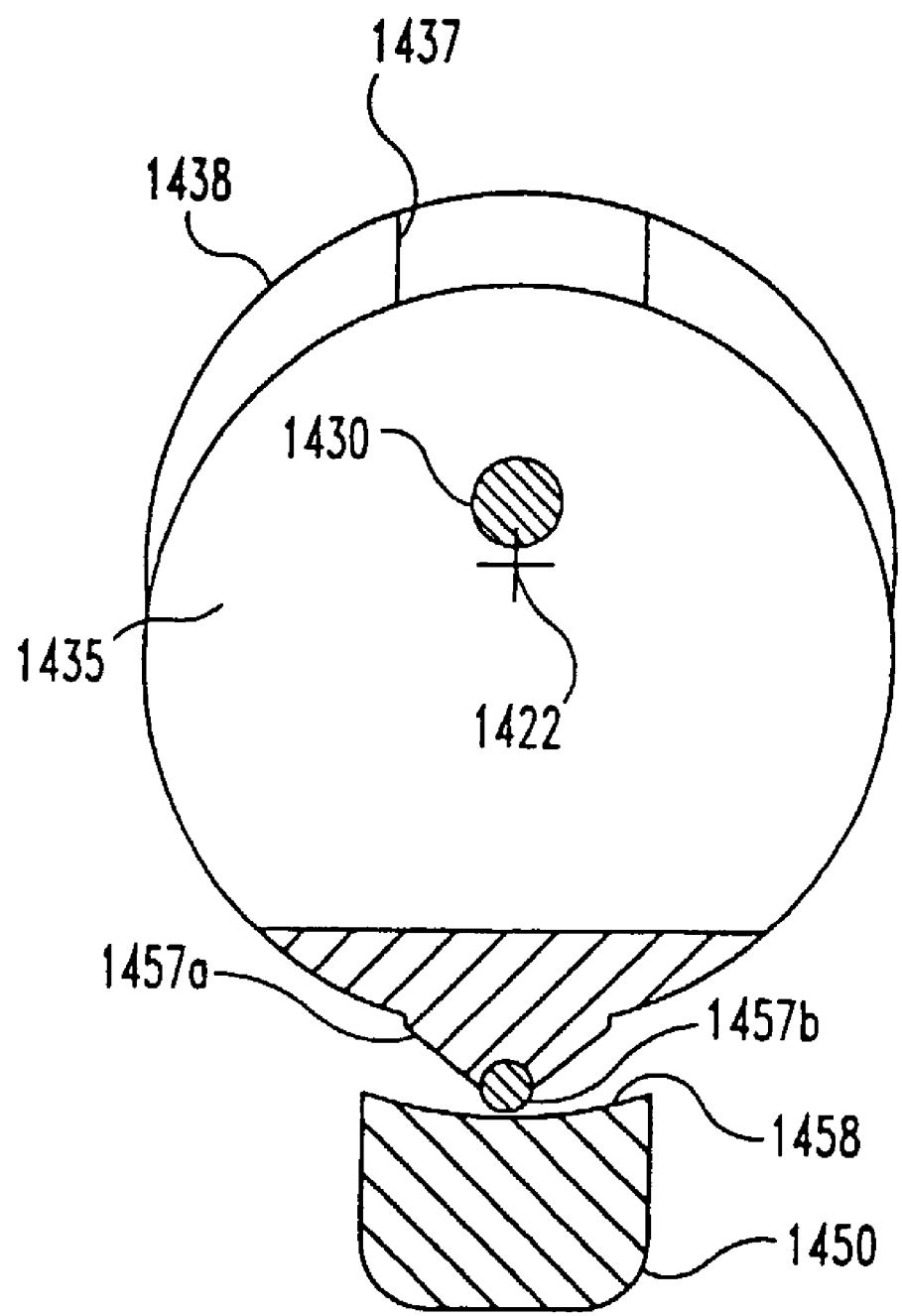
FIG. 27 is a cross sectional view of the apparatus of FIG. 26 as taken along line 27—27 of FIG. 26.

FIG. 27 illustrates a cross sectional view of FIG. 26. It can be seen that contoured surface 1488 preferably has a circular shape in a plane perpendicular to axis 1422.

Figure 28:
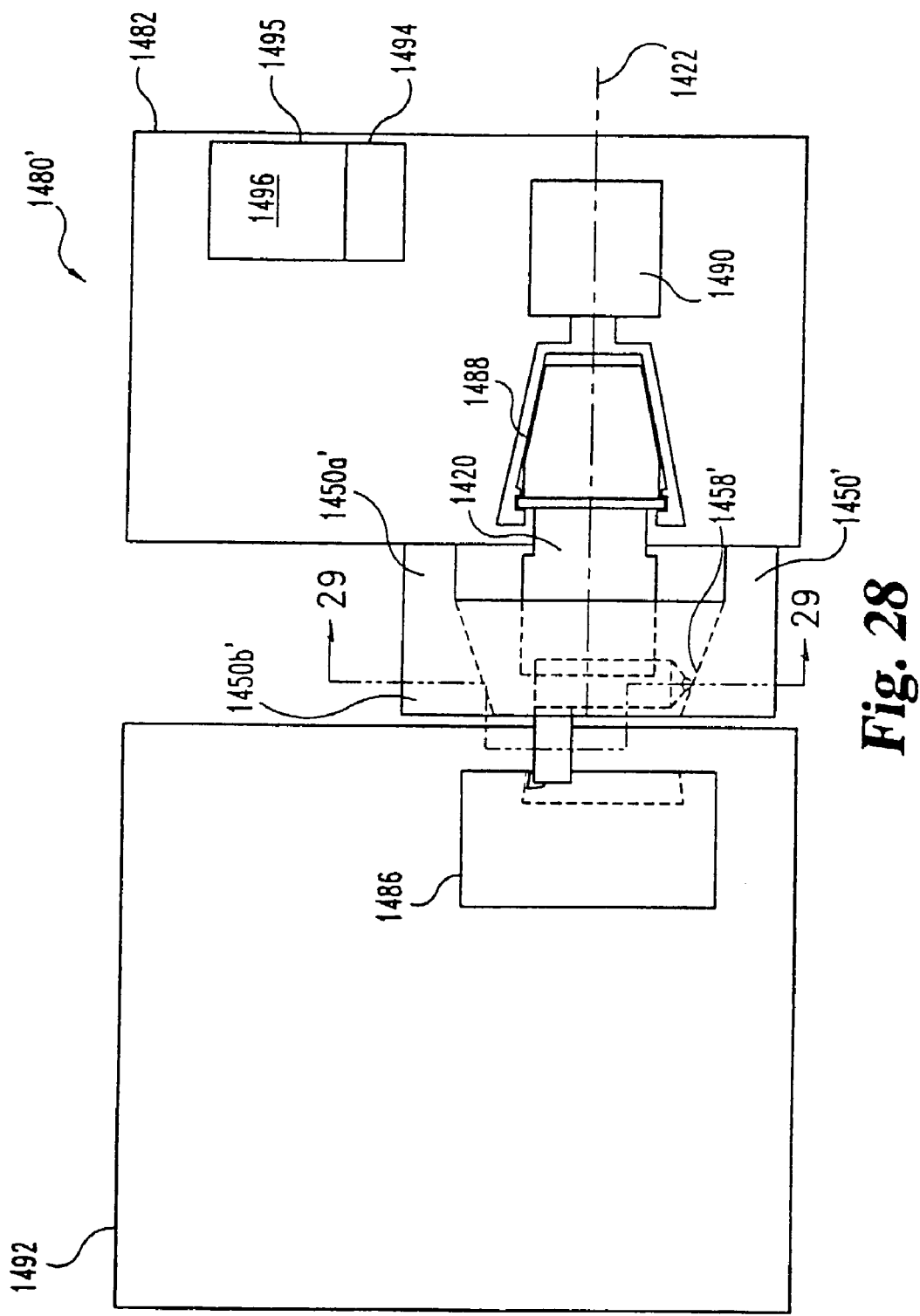
FIG. 28 is a schematic representation of a system for boring a contoured hole according to another embodiment of the present invention.

FIG. 28 illustrates a schematic representation of a system 1480' for boring a hole with a contoured sidewall. System 1480' is the same as system 1480 previously described, except for differences in the static member and contoured surface which will now be described.

System 1480' includes a static member 1450' which generally surrounds a portion of boring tool 1420. Static member 1450' includes support members 1450a' which couple a ring 1450b' to machining apparatus 1482. In other embodiments of the present invention, static member 1450' can be fixedly attached to either table 1492 or workpiece 1486.

Ring 1450b' includes a contoured inner surface 1458' which generally surrounds a portion of boring tool 1420. As boring tool 1420 is advanced along axis 1422 toward workpiece 1486, static member 1450' applies a lateral load to bearing 1457b which slides cutting tool holder 1435 during machining. This combined action of axial relative movement and lateral shifting results in a hole whose sidewalls correspond to the shape of contoured surface 1458'.

Figure 29:
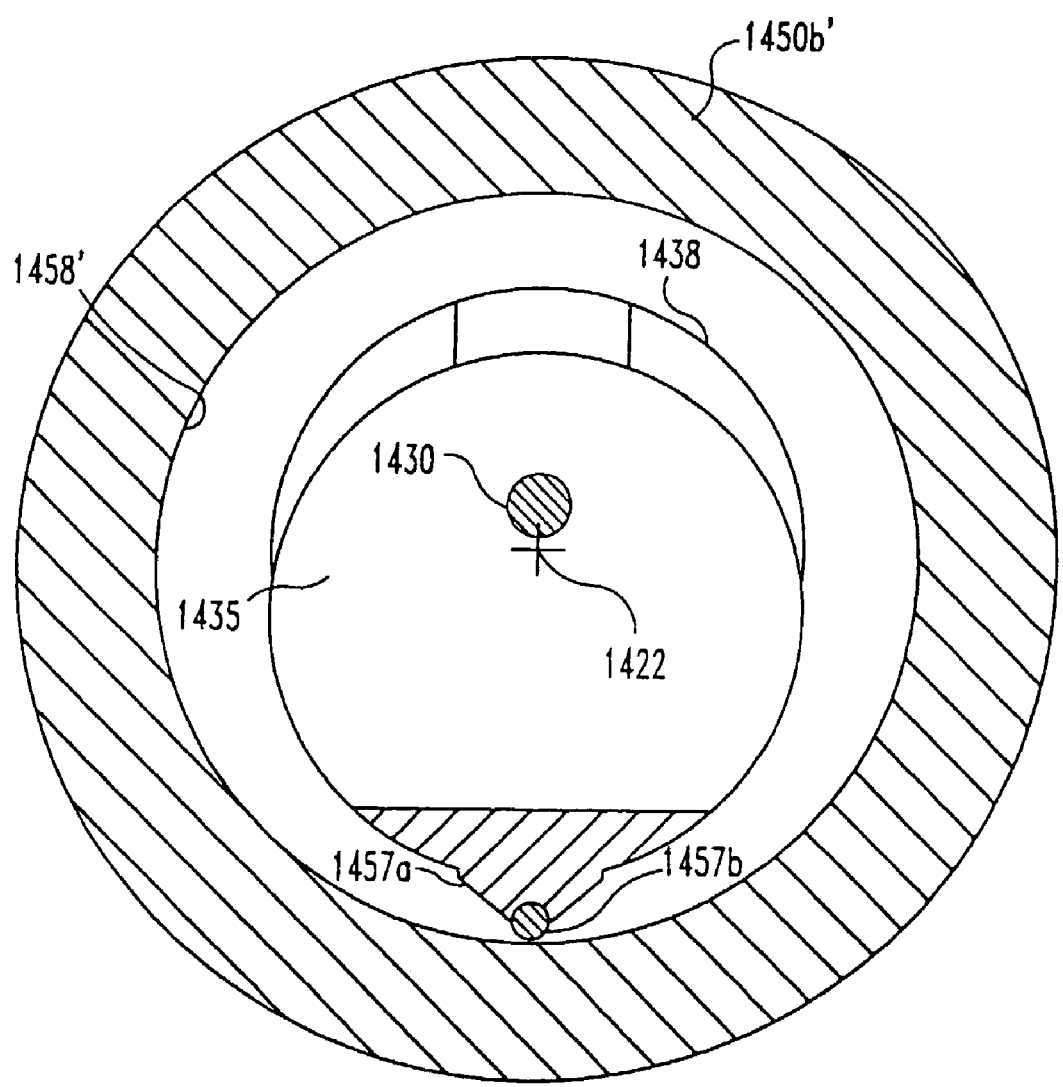
FIG. 29 is a cross sectional view of the apparatus of FIG. 28 as taken along line 29—29 of FIG. 28.

FIG. 29 is a cross sectional view of some of the apparatuses of FIG. 28. As previously discussed, ring 1450b' generally surrounds a portion of cutting tool 1420. As cutting tool 1420 rotates about axis 1422, bearing 1457b is in continuous contact with inner surface 1458'. Therefore, as cutting tool 1420 advances toward the workpiece, the radially inward load applied to bearing 1457b is applied throughout each revolution, in contrast to member 1450 (as seen in FIG. 27) where the radially inward force applied to cutting tool 1435 is applied over a portion of each revolution.

FIGS. 30–34 depict various views of an apparatus 1520 according to another embodiment of the present invention. Apparatus 1520 is a boring tool assembly which includes a slidably adjustable cutting tool 1525. Cutting tool 1525 is fixedly supported, such as by a tool support 1530, which extends from a slidably adjustable tool holder 1535. Tool holder 1535 preferably includes a joint 1537 such as a dovetail joint or a T-joint which slidably couples within a complementary-shaped joint formed by pocket 1538.3 and underside surface 1570b of retention member 1570. Coupling element 1545 includes a coupling element body 1538, and locates boring tool assembly 1520 on a drive unit such as drive unit 88 of machine 82 (referring to FIG. 4). Coupling element 1545 couples tool holder 1535 to the boring machine. Coupling element 1545 is slidable in a direction relative to tool holder 1535. Tool holder 1535 is adjustable over a range of positions in the direction for machining a hole within a range of dimensions that correspond to the range of positions.

Figure 32B:
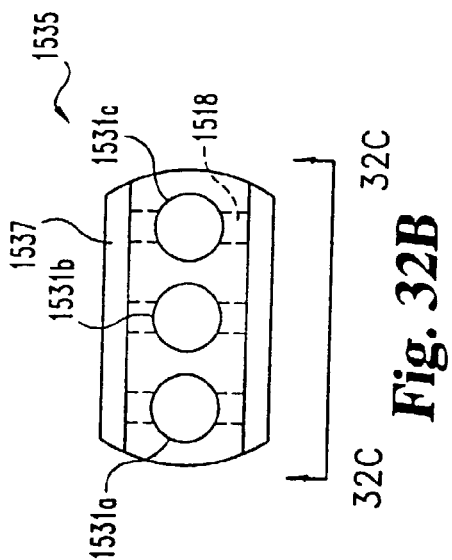
FIG. 32B is a view of the apparatus of FIG. 32A as taken along line 32B—32B of FIG. 32A.
Figure 32C:
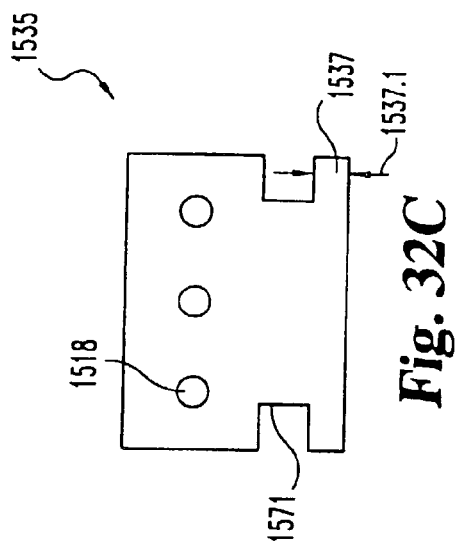
FIG. 32C is a view of the apparatus of FIG. 32B as taken along line 32C—32C of FIG. 32B.
Figure 32A:
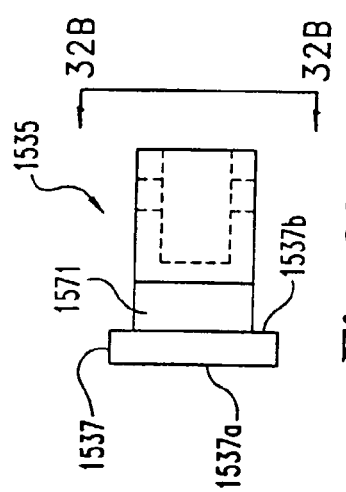
FIG. 32A is a side elevational view of a portion of the apparatus of FIG. 30A.

Boring tool 1520 preferably includes a multiple piece tool holder 1535 which comprises a joint portion 1537. Referring to FIG. 32B, tool holding portion 1535.1 of tool holder 1535 includes a plurality of bores 1531a, 1531b, and 1531c for receiving an inserted tool support 1530. A set screw (not shown) received within the appropriate threaded hole 1518 locks tool support 1530 within the specific hole.

Referring to FIGS. 30A and 30B, tool holder 1535 is slidably captured within the assembly of coupling element 1545, as will be described. Coupling element 1545 includes a body 1538 which includes at least one spring pocket 1538.1, and preferably includes a plurality of spring pockets. In one embodiment, spring pocket 1538.1 accepts therein a biasing member 1543. As shown in FIG. 30A, in one embodiment, biasing member 1543 is a coil spring. However, the present invention contemplates other types of biasing members, including, for example, pneumatically or hydraulically actuated expandable pressure vessels, coil springs, and leaf springs.

Preferably, each spring 1543 has a height that is greater than the depth of the corresponding pocket 1538.1. With this arrangement, each spring will "stand proud" when placed within the corresponding pocket. Located on top of the top end of springs 1543 is a movable plate member 1544. Spring forces bias movable member 1544 away from pockets

Figure 34B:
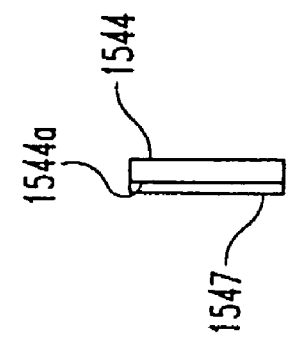
FIG. 34B is a view of the apparatus of FIG. 34A as taken along line 34B—34B of FIG. 34A.
Figure 34A:
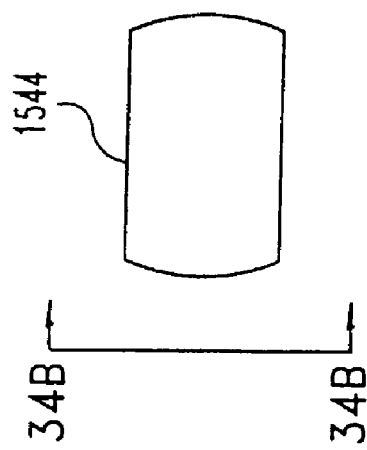
FIG. 34A is an end elevational view of a portion of the apparatus of FIG. 30A.
Figure 33:
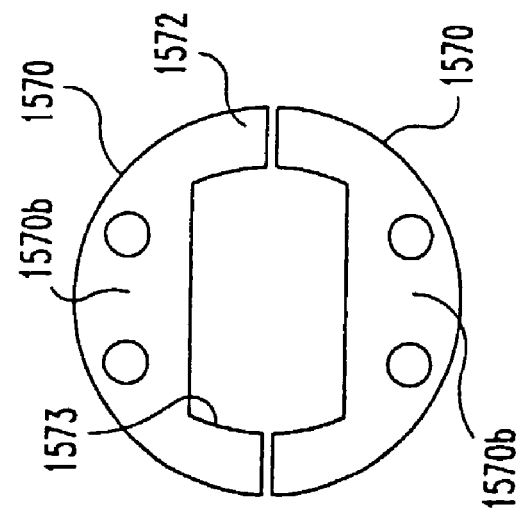
FIG. 33 is an end elevational view of a portion of the apparatus of FIG. 30A.

1538.1. Movable member 1544 preferably resides within a complementary-shaped pocket 1538.2. This pocket accepts the external shape of movable member 1544 (as best seen in FIG. 34A), and is preferably close fitting. However, the present invention also contemplates those embodiments in which movable member 1544 is located within a non-complementary shaped pocket that is not close fitting. Movable member 1544 preferably has a height that is less than the depth of pocket 1538.2.

Although what has been shown and described is an arrangement in which the springs have an end that extends beyond the top of the corresponding pocket, the present invention also contemplates those embodiments in which the springs are equal in height to the pocket, or lesser in height. In some of these embodiments, movable member 1544 includes a corresponding spacer portion that fits within the spring pocket and contacts the top of the spring.

Tool holder 1535 includes a sliding joint portion 1537 that fits within a pocket 1538.3 of body 1538. Joint 1537 has a height 1537.1 that is preferably less than the depth of pocket 1538.3. Tool holder 1535 includes a contact surface 1537a which is in contact with surface 1544a of movable member 1544. Preferably, surface 1544a includes a surface treatment or coating that provides a controlled coefficient of friction with surface 1537a. However, the present invention also contemplates those embodiments in which both surfaces 1544a and 1537a include a surface coating or surface treatment, and also those embodiments in which only surface 1537a includes a surface coating or surface treatment. Boring tool assembly 1520 includes means for applying a frictional force between contact surfaces including springs 1543 and movable member 1544.

Tool holder 1535 preferably includes a scalloped recess 1571 which slidably receives the retention ears 1572 of members 1570. A pair of retention members 1570 are received within recess 1571 and fastened to body 1538. Members 1570 compress the assembly of springs 1543, movable member 1544, and joint portion 1537 of holder 1535. Fasteners 1541 are preferably tightened until the underside surface 1570b of retention 1570 is in contact with body 1538. Since the height of joint portion 1537 is less than the depth of pocket 1538 and further that the thickness of movable member 1544 is less than the depth of pocket 1538.2, the tightening of fasteners 1541 results in a compression of movable member 1544 against springs 1543. In one embodiment, there are six springs 1543, and each is compressed about 0.1 inches in this assembled condition. These six springs preferably provide from about 10 to 100 pounds of force per spring against movable member 1544. Biasing members 1543 apply a compression force between contact surfaces 1544a and 1537a to increase the frictional force between those same two contact surfaces, such that sliding movement of tool holder 1535 relative to coupling member 1545 is restrained.

As will be appreciated from FIG. 30A, there is also a frictional interface between surface 1537b of tool holder 1535 and surface 1570b of retention members 1570. These facing surfaces are maintained in compression by springs 1543. The present invention contemplates those embodiments in which one or both of surfaces 1537b and 1570b also include coatings or treatments for control of the coefficient of friction therebetween.

Further, although what has been shown and described is a movable member urged by a biasing member against the bottom of the tool holder, the present invention also contemplates those embodiments in which the biasing members act directly against a surface of the sliding tool holder. In such embodiments, the biasing members act directly on the sliding tool holder, and the friction between the sliding tool holder and a retention member restrains lateral sliding of the tool holder.

Some embodiments of the present invention can include a small amount of "positional hysteresis" which affects the manner in which a slidably adjustable tool holder is moved to a position for boring a hole. For example, with regards to certain embodiments of the present invention, when the slidably adjustable tool holder is moved to a position for boring a hole, some components of the boring tool assembly retain a small stress or "memory" which can attempt to move the slidable tool holder back towards the position from which it came. For example, referring to FIG. 12A, boring tool 920 includes two slidable tool holder portions 935.1 and 937. As a lateral force is applied against tool holder portion 935.1, portion 937 within body 938 also slides in the same direction. The lateral force is present until portion 935.1 has moved to a new location. Once the lateral force is removed, portion 935.1 remains at the new position, held in place by frictional forces.

However, in some embodiments, tool holder portion 937 does not move laterally as much as portion 935.1, and therefore exerts a small lateral restoring force through fastener 941 which urges portion 935.1 away from its new position and back towards its original position. Although the frictional force maintaining portion 935.1 in its new location is sufficient to retain it in the desired position under many conditions, it is possible that a vibratory load or other load imposed during machining can cause portion 935 to move slightly as result of the "returning" force or "memory" force exerted by portion 937 and fastener 941. In some embodiments of the present invention, it is believed that this "returning" force is negligible. In other embodiments, the amount of returning lateral movement caused by this returning force can be accounted for in the control algorithm of the CNC boring machine. However, in other embodiments of the present invention, the boring tool assembly includes certain features that minimize and/or eliminate this mechanical hysteresis. FIGS. 35–41 depict various embodiments incorporating a variety of features which relate to the positional "hysteresis" or accuracy of methods, systems, and apparatus pertaining to slidably adjustable tool holders for a boring machine. It is understood that the various features described in these figures are applicable to many of the various embodiments described herein.

Figure 35:
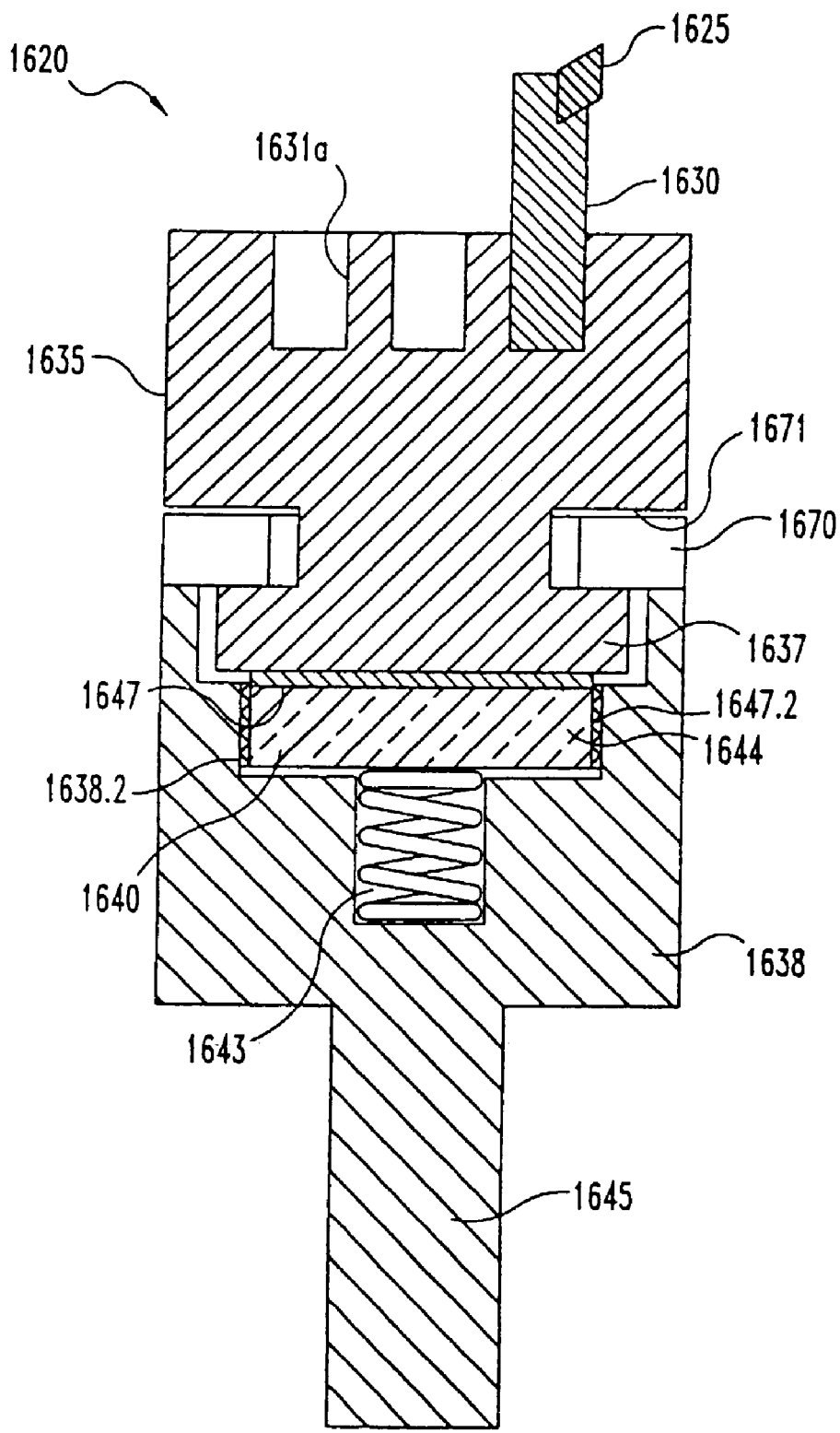
FIG. 35 is a schematic, cross-sectional view of an apparatus according to another embodiment of the present invention.

FIG. 35 is a schematic representation of another embodiment according to the present invention, shown in sectional view through the centerline of the apparatus. Apparatus 1620 is a boring tool assembly which includes a slidably adjustable cutting tool 1625. Cutting tool 1625 is fixedly supported by a tool support 1630, which extends from a slidably adjustable tool holder 1635. Preferably, apparatus 1625 further includes a coupling element 1645 which includes a coupling element body 1638, as well as various internal components which will be described. Tool holder 1635 is slidably retained on coupling member 1645, preferably by a retention member 1670. Retention member 1670 permits sliding of tool holder 1635 in a direction permitting cutting tool 1625 to bore a variety of hole diameters or other features. As one example, referring to FIG. 35, the direction is sideways.

Boring tool assembly 1620 includes an internal frictional adjustment apparatus 1640 which includes a movable member 1644 preferably including a surface treatment or surface coating 1647 for controlling sliding friction and one or more biasing members 1643 which preferably provide an elastic biasing force. As used herein the term elastic refers to the ability of the biasing member to provide a resisting force when the biasing member is placed in compression, tension, torsion and/or shear, such that the member returns to a shape without permanent deformation when the compressing tension, torsion, or shear is removed. For sake of clarity, FIG. 35 includes a single biasing member 1643, but it is appreciated that various embodiments of the present invention contemplate multiple biasing members. Further, although the various figures herein depict a particular type of biasing member, such as a coil spring, it is further appreciated that other embodiments of the present invention include any of the biasing members noted herein, including by way of example centrifugal apparatus, hydraulic or pneumatic pressure mechanisms, magnets, as well as others. And further with the biasing members adapted and configured either to urge apart the tool holder from the coupling member, or to urge together the tool holder and a coupling member. Further, biasing members depicted or described as coil springs can be any type of spring, including torsional, leaf, belleville, and others.

Movable member 1644 is preferably closely fitting within a pocket or bore 1638.2 of body 1638. Because of the close-fitting nature of member 1644 within bore 1638.2, any side to side motion of member 1644 is greatly reduced. However, to further minimize any lateral motion of member 1644, a surface coating 1647.2 is applied to the sides of member 1644. Surface coating or treatment 1647.2 can be any of the coatings or treatment previously described, although preferably the selected coating or treatment minimizes the sliding friction between member 1644 and the contacting walls of pocket 1638.2. As one example, the surface coating could be an organic material such as Teflon ®, nylon, or other organic material with low friction and good wear properties. Further, the surface coating or treatment 1647.2 can be a build up of abradable material, a portion of which is worn-off during initial insertion of member 1644 within bore 1638.2. Further, the idea of "surface coating or treatment" as described herein includes the attachment of material to the sides of member 1644, such as by riveting, welding, brazing, use of adhesives, or other methods.

Figure 36:
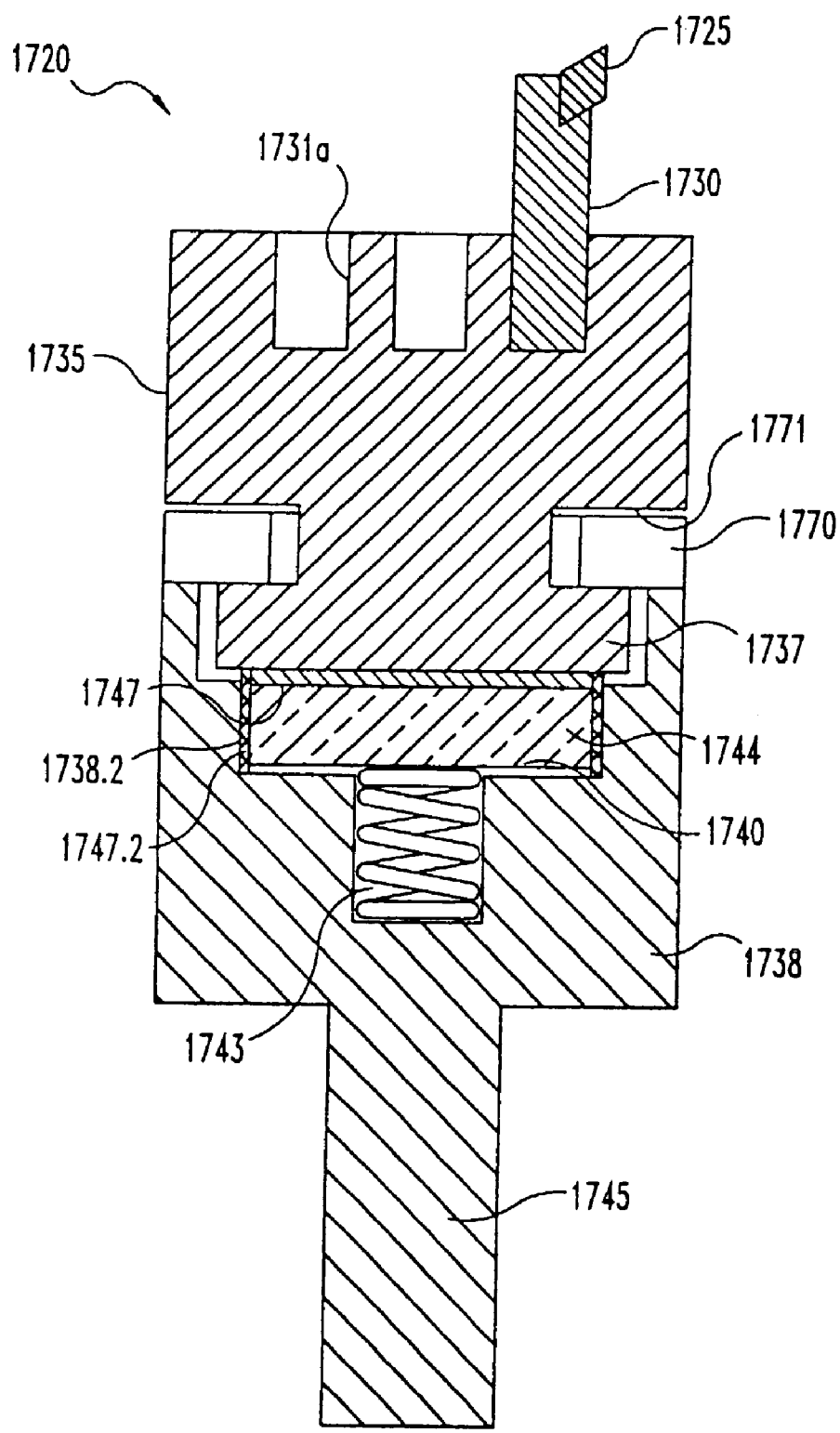
FIG. 36 is a schematic, cross-sectional view of an apparatus according to another embodiment of the present invention.

FIG. 36 is a schematic representation of another embodiment according to the present invention, shown in sectional view through the centerline of the apparatus. Apparatus 1720 is a boring tool assembly which includes a slidably adjustable cutting tool 1725. Cutting tool 1725 is fixedly supported by a tool support 1730, which extends from a slidably adjustable tool holder 1735. Preferably, apparatus 1725 further includes a coupling element 1745 which includes a coupling element body 1738, as well as various internal components which will be described. Tool holder 1735 is slidably retained on coupling member 1745, preferably by a retention member 1770. Retention member 1770 permits sliding of tool holder 1735 in a direction permitting cutting tool 1725 to bore a variety of hole diameters or other features. As one example, referring to FIG. 36, the direction is sideways.

Boring tool assembly 1720 includes an internal frictional adjustment apparatus 1740 which includes a movable member 1744 preferably including a surface treatment or surface coating 1747 for controlling sliding friction and one or more biasing members 1743 which preferably provide an elastic biasing force. As used herein the term elastic refers to the ability of the biasing member to provide a resisting force when the biasing member is placed in compression, tension, torsion and/or shear, such that the member returns to a shape without permanent deformation when the compressing tension, torsion, or shear is removed. For sake of clarity, FIG. 36 includes a single biasing member 1743, but it is appreciated that various embodiments of the present invention contemplate multiple biasing members.

Movable member 1744 is guided within body 1738 of coupling element 1745 in a second direction that is at least partly orthogonal to the direction of sliding. Further, biasing member 1743 applies a force between body 1738 and movable member 1744 that urges movable member 1744 at least partly in the second direction. As will now be discussed, movable member 1744 is substantially restrained from motion in the direction of sliding.

Movable member 1744 is preferably closely fitting within a pocket or bore 1738.2 of body 1738. Because of the close-fitting nature of member 1744 within bore 1738.2, any side to side motion of member 1744 is greatly reduced. However, to further minimize any lateral motion of member 1744, a surface coating 1747.2 is applied to the sides of bore 1738.2. Surface coating or treatment 1747.2 can be any of the coatings or treatment previously described, although preferably the selected coating or treatment minimizes the sliding friction between member 1744 and walls of pocket 1738.2. As one example, the surface coating could be an organic material such as Teflon ®, nylon, or other organic material with low friction and good wear properties. Further, the surface coating or treatment 1747.2 can be a build up of abradable material, a portion of which is worn-off during initial insertion of member 1744 within bore 1738.2. Further, the idea of "surface coating or treatment" as described herein includes the attachment of material to the sides of member 1744, such as by riveting, welding, brazing, use of adhesives, or other methods.

Figure 37:
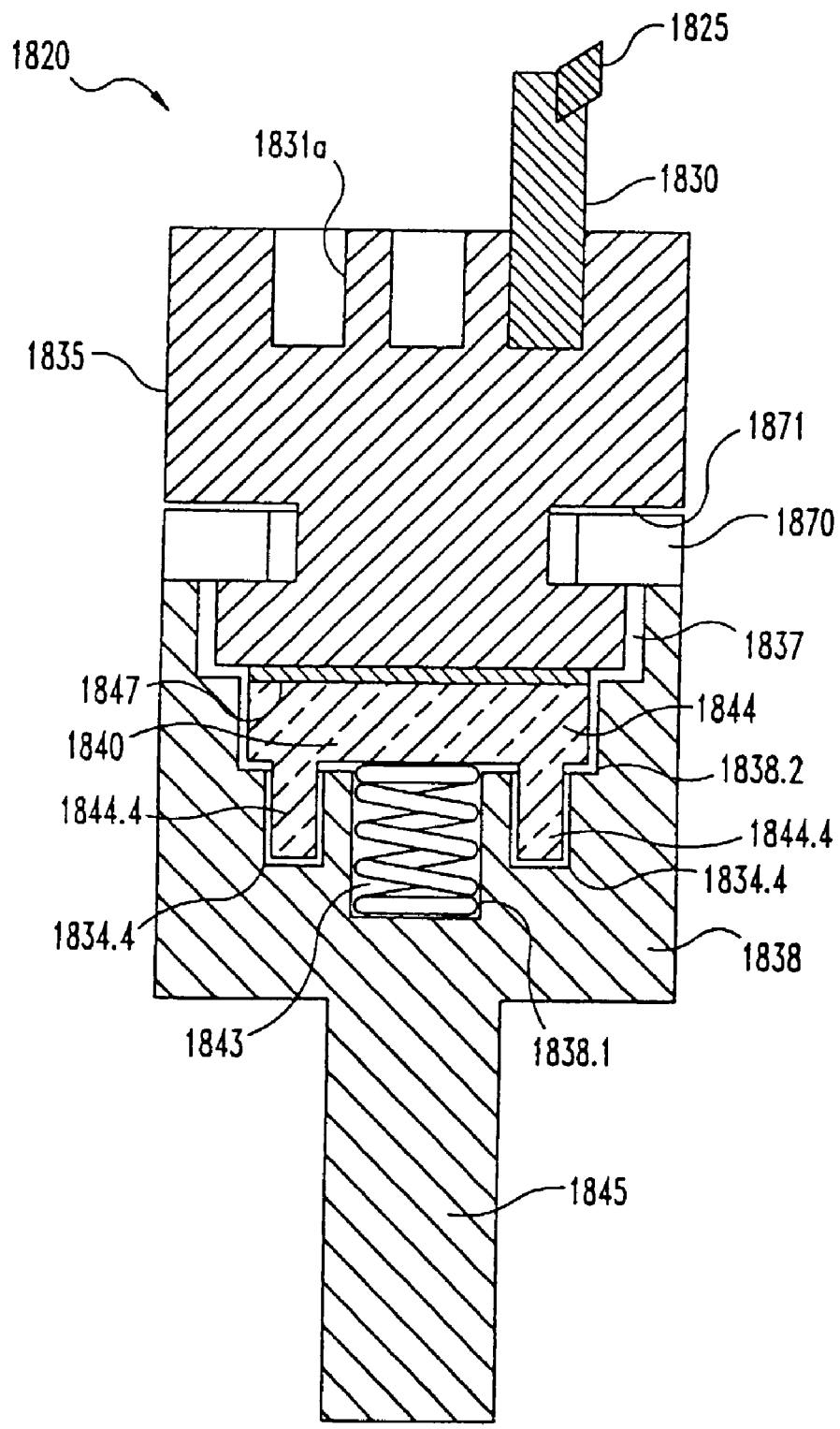
FIG. 37 is a schematic, cross-sectional view of an apparatus according to another embodiment of the present invention.

FIG. 37 is a schematic representation of another embodiment according to the present invention, shown in sectional view through the centerline of the apparatus. Apparatus 1820 is a boring tool assembly which includes a slidably adjustable cutting tool 1825. Cutting tool 1825 is fixedly supported by a tool support 1830, which extends from a slidably adjustable tool holder 1835. Preferably, apparatus 1825 further includes a coupling element 1845 which includes a coupling element body 1838, as well as various internal components which will be described. Tool holder 1835 is slidably retained on coupling member 1845, preferably by a retention member 1870. Retention member 1870 permits sliding of tool holder 1835 in a direction permitting cutting tool 1825 to bore a variety of hole diameters or other features. As one example, referring to FIG. 37, the direction is sideways.

Boring tool assembly 1820 includes an internal frictional adjustment apparatus 1840 which includes a movable member 1844 preferably including a surface treatment or surface coating 1847 for controlling sliding friction and one or more biasing members 1843 which preferably provide an elastic biasing force. For sake of clarity, FIG. 37 includes a single biasing member 1843, but it is appreciated that various embodiments of the present invention contemplate multiple biasing members.

Movable member 1844 is guided within body 1838 of coupling element 1845 in a second direction that is at least partly orthogonal to the direction of sliding. Further, biasing member 1843 applies a force between body 1838 and movable member 1844 that urges movable member 1844 at least partly in the second direction. As will now be discussed, movable member 1844 is substantially restrained from motion in the direction of sliding.

Movable member 1844 is received preferably loosely received within a pocket 1838.2 of body 1838. However, in order to minimize the side to side motion of movable member 1844, member 1844 includes one or more guiding features 1844.4 which are received within one or more corresponding close-fitting complementary-shaped features or bores 1838.4. The acceptance of a guiding feature 1844.4 within a complementary-shaped feature 1838.4 restrains movable member 1844 from side to side motion. In some embodiments of the present invention, one or both of the guiding features 1844.4 and 1838.4 include surface coating or treating as previously described, preferably for minimizing sliding friction. In one embodiment, guiding features 1844.4 are a pair of dowel rods coupled to movable member 1844, and the complementary-shaped guiding feature 1838.4 is a hole or bore having the same external shape as the dowel rod.

Figure 38:
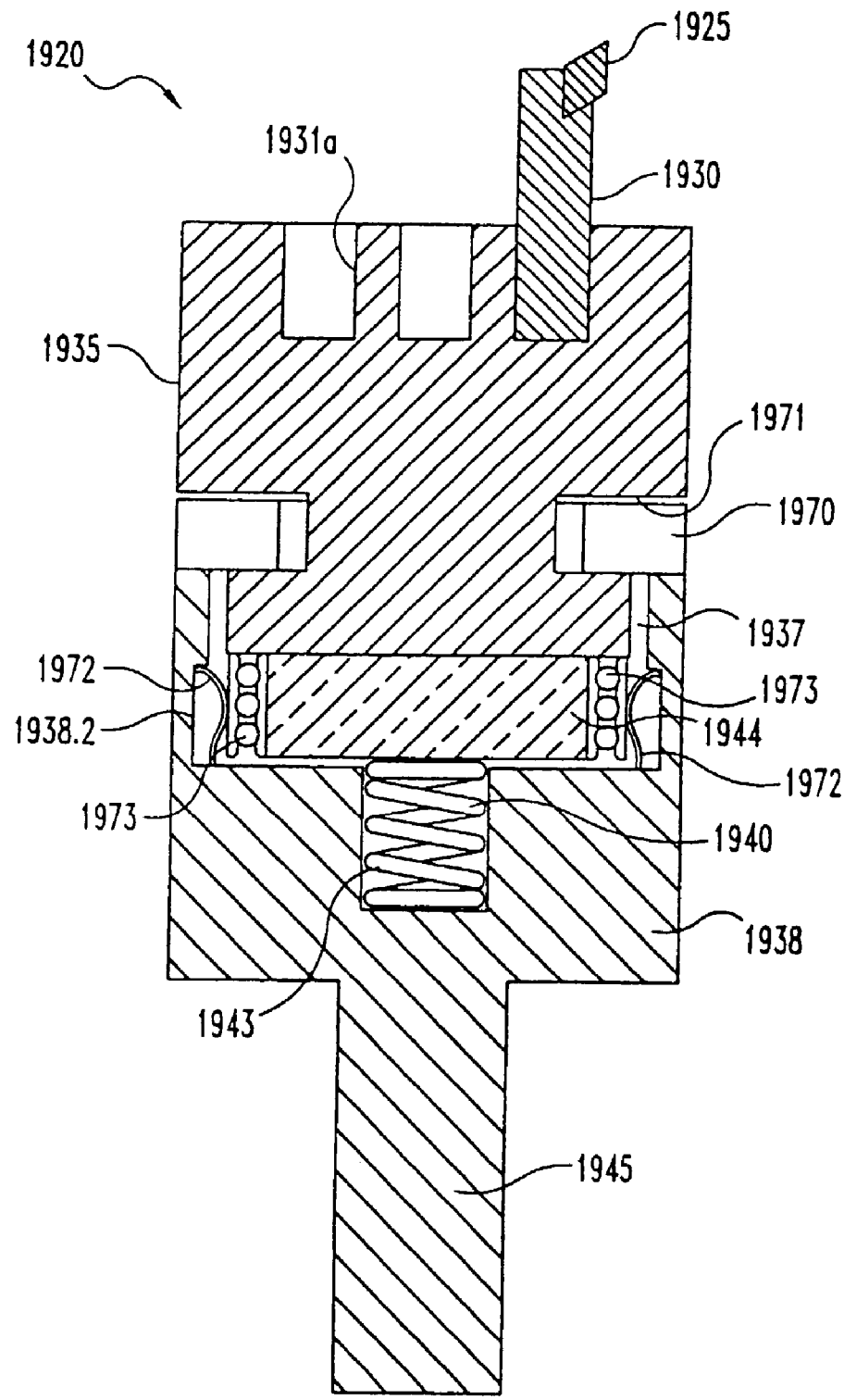
FIG. 38 is a schematic, cross-sectional view of an apparatus according to another embodiment of the present invention.

FIG. 38 is a schematic representation of another embodiment according to the present invention, shown in sectional view through the centerline of the apparatus. Apparatus 1920 is a boring tool assembly which includes a slidably adjustable cutting tool 1925. Cutting tool 1925 is fixedly supported by a tool support 1930, which extends from a slidably adjustable tool holder 1935. Preferably, apparatus 1925 further includes a coupling element 1945 which includes a coupling element body 1938, as well as various internal components which will be described. Tool holder 1935 is slidably retained on coupling member 1945, preferably by a retention member 1970. Retention member 1970 permits sliding of tool holder 1935 in a direction permitting cutting tool 1925 to bore a variety of hole diameters or other features. As one example, referring to FIG. 38, the direction is sideways.

Boring tool assembly 1920 includes an internal frictional adjustment apparatus 1940 which includes a movable member 1944 preferably including a surface treatment or surface coating 1947 for controlling sliding friction and one or more biasing members 1943 which preferably provide an elastic biasing force. For sake of clarity, FIG. 38 includes a single biasing member 1943, but it is appreciated that various embodiments of the present invention contemplate multiple biasing members.

Movable member 1944 is guided within body 1938 of coupling element 1945 in a second direction that is at least partly orthogonal to the direction of sliding. Further, biasing member 1943 applies a force between body 1938 and movable member 1944 that urges movable member 1944 at least partly in the second direction. As will now be discussed, movable member 1944 is substantially restrained from motion in the direction of sliding.

Movable member 1944 is bearingly guided within a pocket 1938.2 of body 1938. An assembly of roller bearings 1973 is preferably located on opposing sides of pocket 1938.2, and reduces any frictional force which opposes the urging force from biasing member 1943.

To reduce the lateral motion of member 1944, preferably at least one of the bearing assemblies 1973 is biased laterally by a spring member 1972. In one embodiment, biasing member 1972 urges a bearing assembly 1973 toward the opposite bearing assembly 1973, such that in the unassembled state, the distance between bearing assemblies is less than the width of movable member 1944. Insertion of member 1944 between the opposing bearing assemblies 1973 results in lateral movement of the spring loaded bearing assembly and compression of spring 1972. When assembled against at least one spring loaded bearing assembly, movable member 1944 does not move laterally unless the lateral force is sufficient to overcome the spring force exerted by spring 1972. Spring 1972 is adapted and configured to urge against movable member 1944 with a lateral force that is preferably greater than the lateral force for adjustment of tool holder 1935.

In yet other embodiments of the present invention, there are bearing assemblies on opposing sides of movable member 1944, with only one side being spring loaded. In some of those embodiments, the non-spring loaded bearing is located on a side of movable member 1944 such that movement of tool holder 1935 in a direction to increase the size of a hole bored by cutting tool 1925 slides movable member 1944 toward the non-spring loaded bearing.

Figure 39:
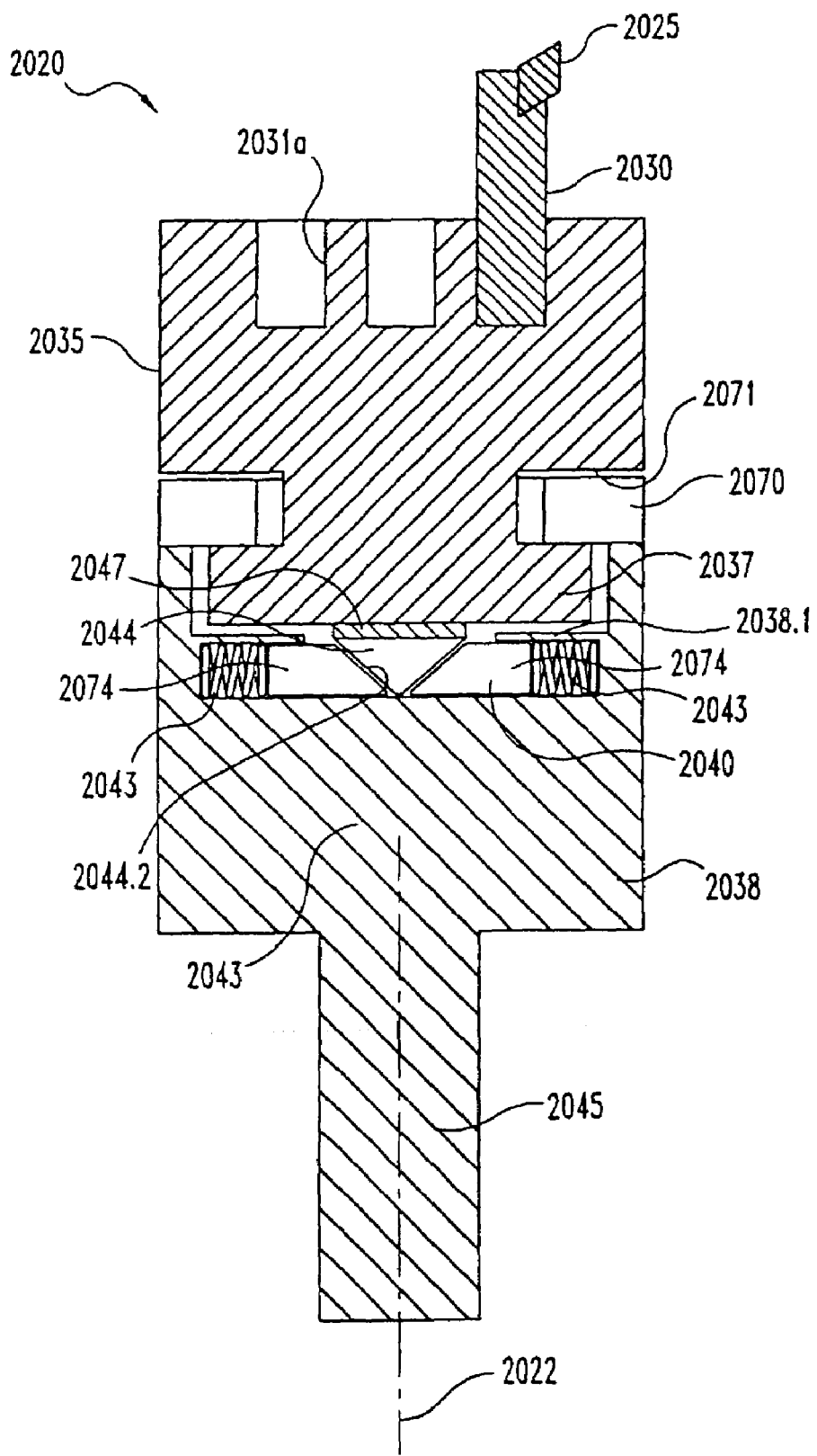
FIG. 39 is a schematic, cross-sectional view of an apparatus according to another embodiment of the present invention.

FIG. 39 is a schematic representation of another embodiment according to the present invention, shown in sectional view through the centerline of the apparatus. Apparatus 2020 is a boring tool assembly which includes a slidably adjustable cutting tool 2025. Cutting tool 2025 is fixedly supported by a tool support 2030, which extends from a slidably adjustable tool holder 2035. Preferably, apparatus 2025 further includes a coupling element 2045 which includes a coupling element body 2038, as well as various internal components which will be described. Tool holder 2035 is slidably retained on coupling member 2045, preferably by a retention member 2070. Retention member 2070 permits sliding of tool holder 2035 in a direction permitting cutting tool 2025 to bore a variety of hole diameters or other features. As one example, referring to FIG. 39, the direction is sideways.

Boring tool assembly 2020 includes an internal frictional adjustment apparatus 2040 which includes a movable member 2044 preferably including a surface treatment or surface coating 2047 for controlling sliding friction and one or more biasing members 2043 which preferably provide an elastic biasing force. For sake of clarity, FIG. 39 includes a single biasing member 2043, but it is appreciated that various embodiments of the present invention contemplate multiple biasing members.

Movable member 2044 is guided within body 2038 of coupling element 2045 in a second direction that is at least partly orthogonal to the direction of sliding. Further, biasing member 2043 applies a force between body 2038 and movable member 2044 that urges movable member 2044 at least partly in the second direction. As will now be discussed, movable member 2044 is substantially restrained from motion in the direction of sliding.

Frictional adjustment apparatus 2040 of boring tool 2020 preferably includes biasing members 2043 and movable member 2044 which are adapted and configured such that the force from biasing members 2043 urge movable member 2044 parallel to the direction of sliding and also in a second direction that is at least partly orthogonal to the direction of sliding. In one embodiment, springs 2043 are located within pockets 2038.1 such that the springs act in a direction with a directional component that is parallel to the direction of the sliding of tool holder 2035.

As shown in FIG. 39, springs 2043 act laterally. Each biasing member 2043 preferably acts upon an intermediate sliding member 2074. Each intermediate member 2074 preferably includes an angled surface in contact with a complementary-shaped surface 2044.2 of movable member 2044. As shown in the particular embodiment of FIG. 39, the angled surfaces of intermediate members 2074 are angled at approximately 45 degrees relative to the centerline 2022 of apparatus 2020. Therefore, the forces from biasing members 2043 act upon movable member 2044 in a direction parallel to the direction of sliding and also orthogonal to the direction of sliding. Therefore, any lateral motion imparted to movable member 2044 by sliding adjustment of tool holder 2035 is resisted by at least one of the biasing members 2043. Further, biasing members 2043 are effective in applying a normal force between movable member 2044 and tool holder 2035 that imparts a frictional force sufficient to restrain lateral motion of tool holder 2035 during machining.

Figure 40:
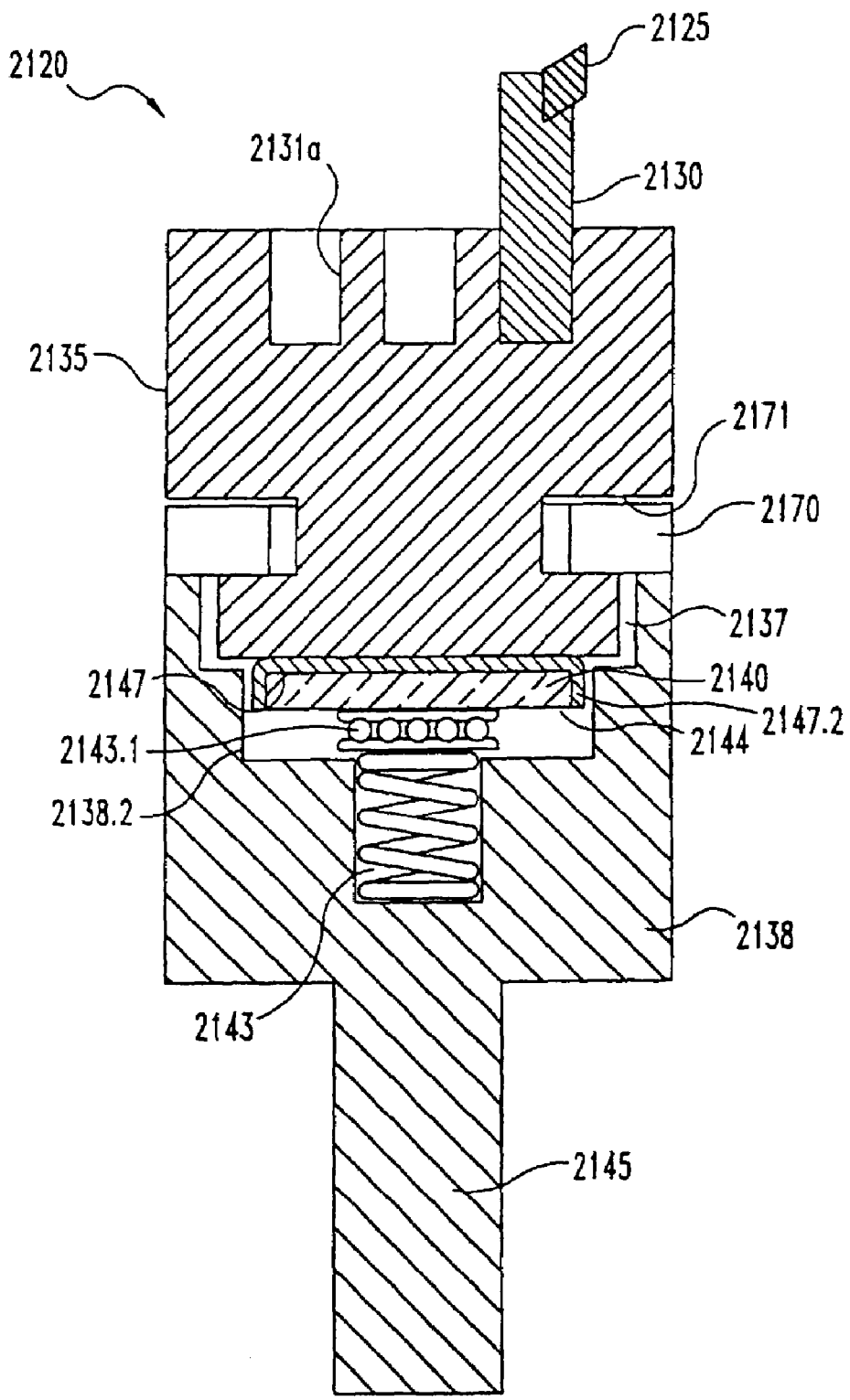
FIG. 40 is a schematic, cross-sectional view of an apparatus according to another embodiment of the present invention.

FIG. 40 is a schematic representation of another embodiment according to the present invention, shown in sectional view through the centerline of the apparatus. Apparatus 2120 is a boring tool assembly which includes a slidably adjustable cutting tool 2125. Cutting tool 2125 is fixedly supported by a tool support 2130, which extends from a slidably adjustable tool holder 2135. Preferably, apparatus 2125 further includes a coupling element 2145 which includes a coupling element body 2138, as well as various internal components which will be described. Tool holder 2135 is slidably retained on coupling member 2145, preferably by a retention member 2170. Retention member 2170 permits sliding of tool holder 2135 in a direction permitting cutting tool 2125 to bore a variety of hole diameters or other features. As one example, referring to FIG. 40, the direction is sideways.

Boring tool assembly 2120 includes an internal frictional adjustment apparatus 2140 which includes a movable member 2144 preferably including a surface treatment or surface coating 2147 for controlling sliding friction and one or more biasing members 2143 which preferably provide an elastic biasing force. For sake of clarity, FIG. 40 includes a single biasing member 2143, but it is appreciated that various embodiments of the present invention contemplate multiple biasing members.

Movable member 2144 is guided within body 2138 of coupling element 2145 in a second direction that is at least partly orthogonal to the direction of sliding. Further, biasing member 2143 applies a force between body 2138 and movable member 2144 that urges movable member 2144 at least partly in the second direction. Movable member 2144 is substantially restrained from motion in the direction of sliding. Movable member 2144 includes a coating 2147.2 on the sides of the movable member that maintain a close fit within bore 2138.2.

Boring tool apparatus 2120 is the same as apparatus 1620 except that there is an assembly of roller bearing 2143.1 interposed between spring 2143 and movable member 2144 that transmit the biasing force from member 2143 to member 2144. Roller bearings 2143.1 minimize any "restoring" lateral force imparted by biasing member 2143 upon movable member 2144.

Figure 41:
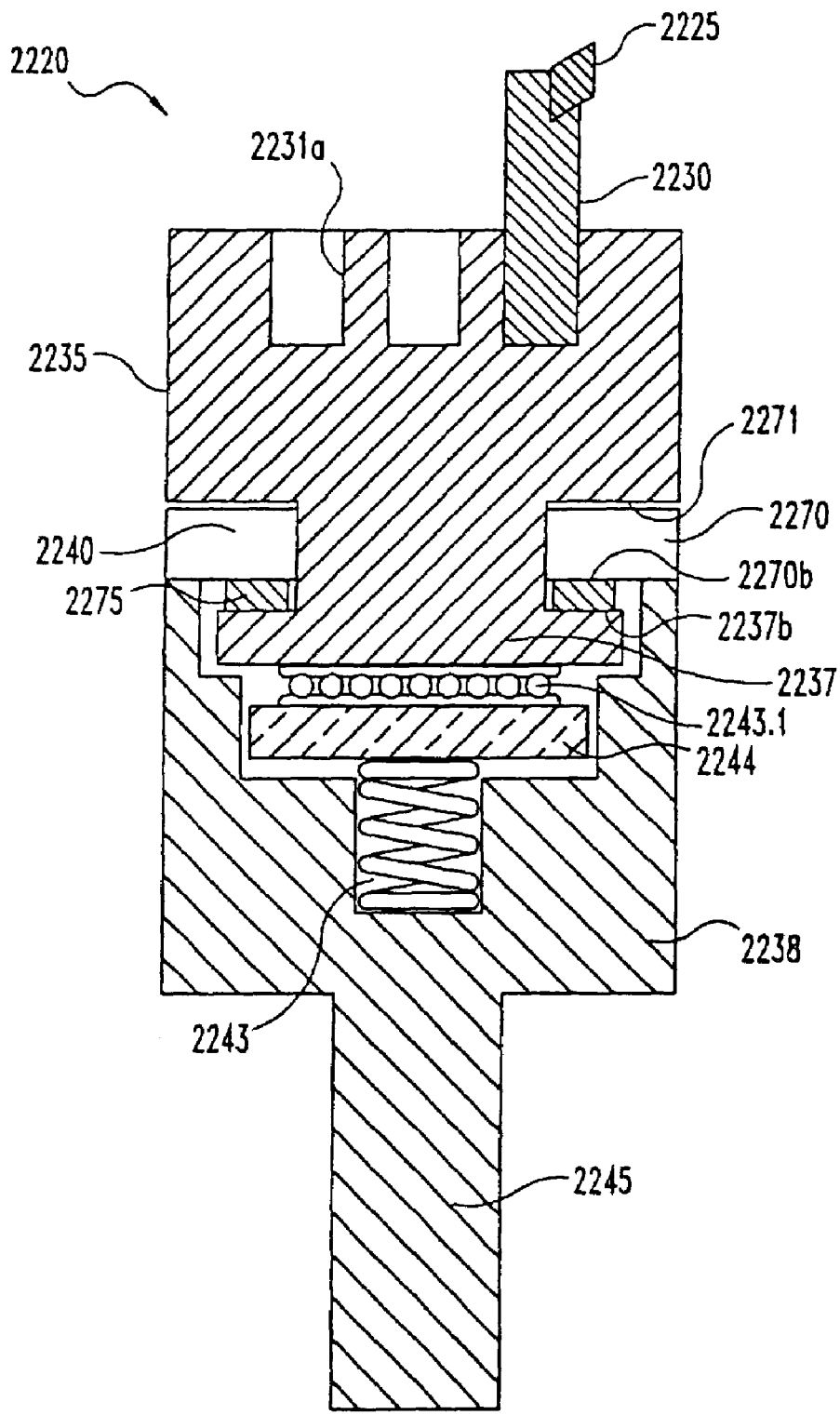
FIG. 41 is a schematic, cross-sectional view of an apparatus according to another embodiment of the present invention.

FIG. 41 is a schematic representation of another embodiment according to the present invention, shown in sectional view through the centerline of the apparatus. Apparatus 2220 is a boring tool assembly which includes a slidably adjustable cutting tool 2225. Cutting tool 2225 is fixedly supported by a tool support 2230, which extends from a slidably adjustable tool holder 2235. Preferably, apparatus 2225 further includes a coupling element 2245 which includes a coupling element body 2238, as well as various internal components which will be described. Tool holder 2235 is slidably retained on coupling member 2245, preferably by a retention member 2270. Retention member 2270 permits sliding of tool holder 2235 in a direction permitting cutting tool 2225 to bore a variety of hole diameters or other features. As one example, referring to FIG. 41, the direction is sideways.

Boring tool assembly 2220 includes an internal frictional adjustment apparatus 2240 which includes a movable member 2244, and one or more biasing members 2243 which preferably provide an elastic biasing force. For sake of clarity, FIG. 41 includes a single biasing member 2243, but it is appreciated that various embodiments of the present invention contemplate multiple biasing members and other types of biasing members.

Movable member 2244 is guided within body 2238 of coupling element 2245 in a second direction that is at least partly orthogonal to the direction of sliding. Further, biasing member 2243 applies a force between body 2238 and movable member 2244 that urges movable member 2244 at least partly in the second direction. As will now be discussed, movable member 2244 is substantially restrained from motion in the direction of sliding.

Boring tool apparatus 2220 includes an internal frictional adjustment apparatus 2240 in which the frictional force restraining the movement of tool holder 2235 during machining is applied between surface 2237*b* of joint 2237 and surface 2270*b* of retention member 2270. Preferably, either or both surfaces 2237*b* and 2270*b* include a surface coating or treatment 2275 which provides for a controlled frictional interface between slidable tool holder 2235 and retention member 2270 of coupling element 2245. The normal force which provides the aforementioned frictional force comes from a biasing member 2243 which acts on a movable member 2244. An assembly of roller bearings 2243.1 placed between movable member 2244 and the opposing surface of joint 2237 reduces any lateral forces between member 2244 and joint 2237. The present invention also contemplates those embodiments in which a force from the biasing member acts directly upon tool holder 2235.

Figure 42:
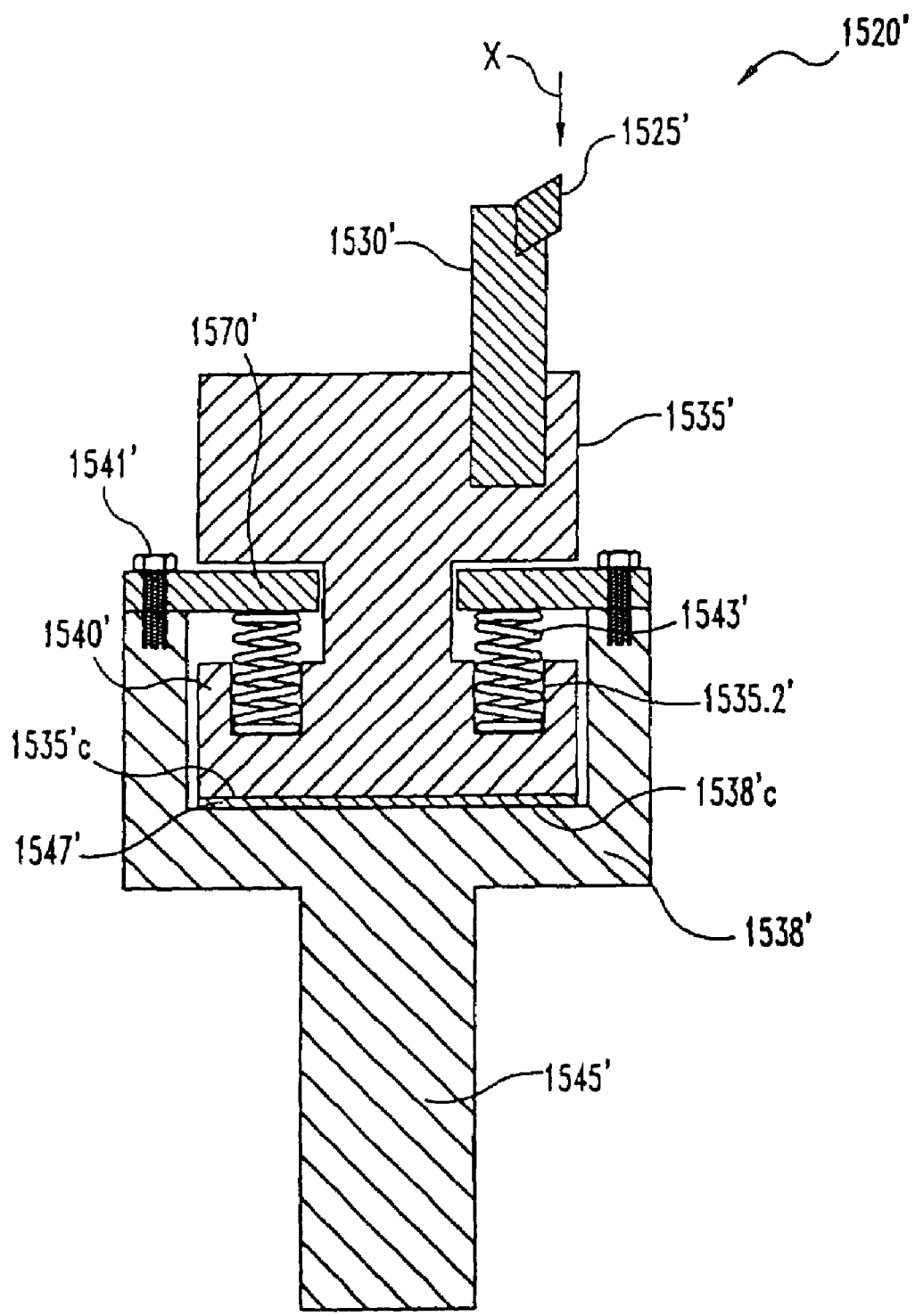
FIG. 42 is a schematic, cross-sectional view of an apparatus according to another embodiment of the present invention.

FIG. 42 is a schematic representation of another embodiment 1520', similar except as described and depicted to apparatus 1520, and shown in sectional view through the centerline of the apparatus. Apparatus 1520' is a boring tool assembly which includes a slidably adjustable cutting tool 1520'. Cutting tool 1525' is fixedly supported by a tool support 1530', which extends from a slidably adjustable tool holder 1535'. Preferably, apparatus 1525' further includes a coupling element 1545' which includes a coupling element body 1538', as well as various internal components which will be described. Although various embodiments shown herein depict various components of the coupling element or the tool support, the present invention also contemplates those alternate embodiments in which these same or equivalent components are included in the other one of the coupling element or tool holder. Tool holder 1535' is slidably retained on coupling member 1545', preferably by a retention member 1570'. Retention member 1570' permits sliding of tool holder 1535' in a direction permitting cutting tool 1525' to bore a variety of hole diameters or other features. As one example, referring to FIG. 42, the direction is sideways.

Boring tool assembly 1520' includes an internal frictional adjustment apparatus 1540' which includes a tool holder 1535', a surface treatment or surface coating 1547' on either tool holder 1535' and/or body 1538' for controlling sliding and static friction, and one or more biasing members 1543' which preferably provide an elastic biasing force.

Tool holder 1535' is located within body 1538' of coupling element 1545' in a second direction that is at least partly orthogonal to the direction of sliding. Further, biasing members 1543' apply a force between body 1538' and tool holder 1535' that urges tool holder 1535' at least partly in the second direction.

One difference between apparatus 1520 and 1520' relates to the direction of biasing force applied by biasing members 1543 and 1543'. Referring briefly to FIG. 30A, springs 1543 are adapted and configured to push apart coupling element 1545 and sliding tool holder 1535. Biasing elements 1543 urge cutting tool 1525 toward the object being machined. In contrast, tool holder 1535' of apparatus 1520' is adapted and configured so that springs 1543' urge tool holder 1535' toward coupling element 1545'. The arrangement and configuration of springs 1543' place a biasing force against the bottom of pockets 1535.2' that is in the same direction as the axial force X applied against cutting tool 1525' during machining of an object. Thus, apparatus 1520' is arranged and configured such that the normal force creating the frictional force is "self-energized" by the axial machining forces X.

Biasing elements 1543' apply a normal force between contact surfaces 1535c' and 1538c' that result in a measure of sliding friction therebetween that is sufficient to restrain lateral motion of tool holder 1535' during machining, but insufficient to prevent lateral sliding of tool holder 1535' relative to coupling element 1545' during adjustment. It is to be appreciated that any of the various embodiments described herein for producing this frictional force can be adapted and configured such that the resultant applied normal force is additive to the axial machining forces in a "self-energizing" manner.

In a variation of this embodiment, springs 1543' are located within pockets of tool holder 1535' on the opposite side of retention members 1570'. For those embodiments in which coil springs 1543' are compression springs, tool holder 1535' is urged away from coupling member 1545', with the frictional interface being between the inner surface of retention members 1570' and the upper, inner surface of tool member 1535'. Because of the pockets being located on the opposite side of retention members 1570', the weight of tool holder 1535' is reduced. Further, the length of coupling element 1545' can be reduced, further reducing its weight.

Figure 43:
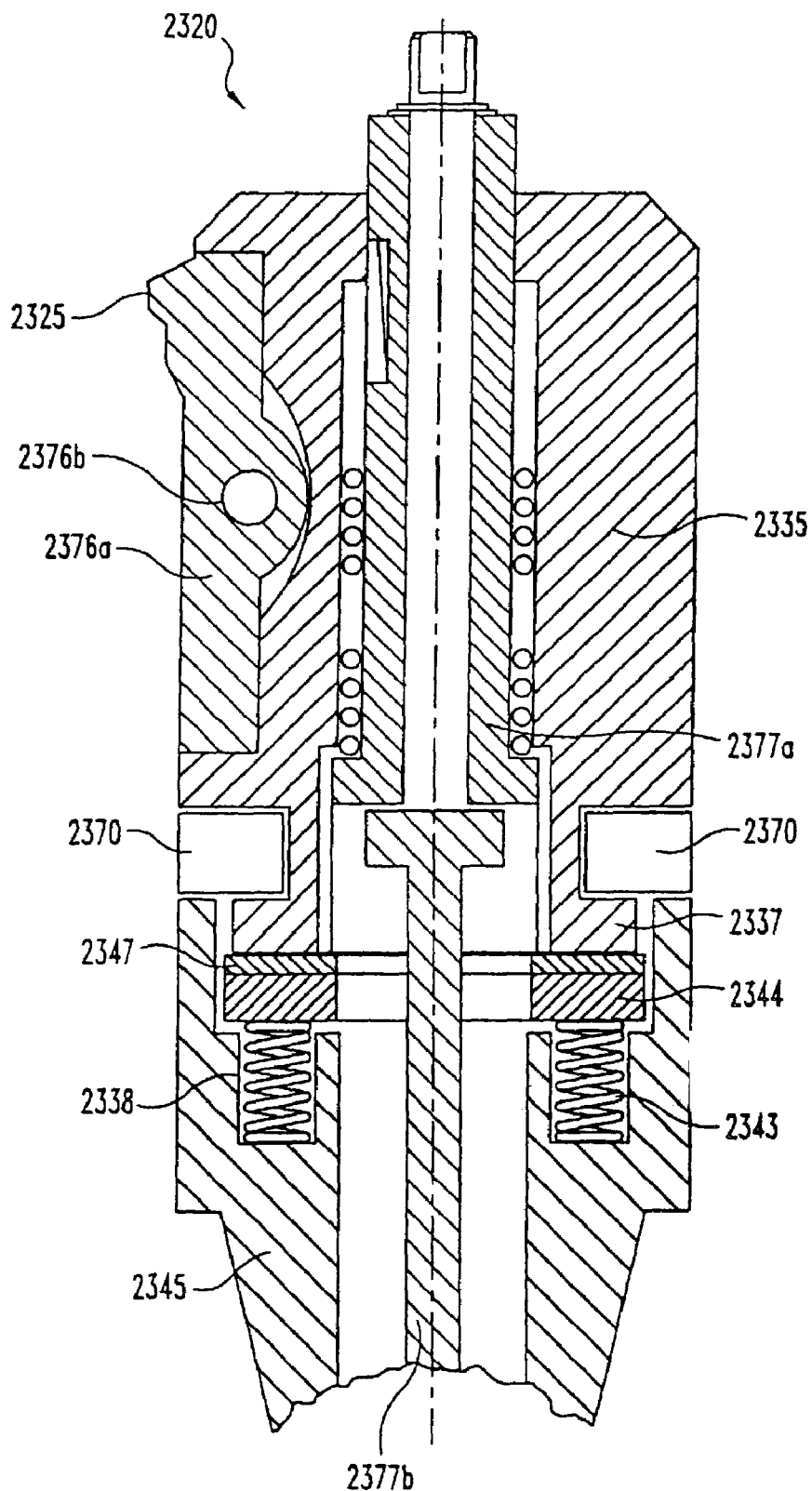
FIG. 43 is schematic, cross-sectional view of an apparatus according to another embodiment of the present invention.

FIG. 43 is a schematic representation of another embodiment according to the present invention, shown in sectional view through the centerline of the apparatus. Apparatus 2320 is a boring tool assembly which includes a slidably adjustable cutting tool 2325. Cutting tool 2325 is fixedly supported by a tool support 2330, which extends from a slidably adjustable tool holder 2335. Preferably, apparatus 2325 further includes a coupling element 2345 which includes a coupling element body 2338, as well as various internal components which will be described. Tool holder 2335 is slidably retained on coupling member 2345, preferably by a retention member 2370. Retention member 2370 permits sliding of tool holder 2335 in a direction permitting cutting tool 2325 to bore a variety of hole diameters or other features. As one example, referring to FIG. 43, the direction is sideways.

Boring tool assembly 2320 includes an internal frictional adjustment apparatus 2340 which includes a movable member 2344 preferably including a surface treatment or surface coating 2347 for controlling sliding friction and one or more biasing members 2343 which preferably provide an elastic biasing force. For sake of clarity, FIG. 43 includes a single biasing member 2343, but it is appreciated that various embodiments of the present invention contemplate multiple biasing members.

Apparatus 2320 includes a pivotal boring tool which can be actuated by one or more draw bars as disclosed in PCT WO 98/48964, DE 4022579, and U.S. patent application Ser. No. 2001/0028832, all incorporated herein by reference.

Apparatus 2320 includes a pivotal tool holder 2376a which is pivotal about a pin 2376b, and thereby pivotally coupled to tool holder 2335. In one embodiment, pivotal cutting tool holder 2376a can be pivoted outward by a mechanism (not shown) which is interposed between the top portion of the pivoting tool holder and the ramped portion of a first draw bar 2377a, as described in one of the references. Draw bar 2377a is axially actuated by a second draw bar 2377b which is guided within coupling element 2345. There is sufficient lateral clearance between draw bar 2377b and an internal bore of tool holder 2335, such that sliding adjustment of tool holder 2335 relative to coupling element 2345 is not interfered with.

FIGS. 44–55 depicted various views of apparatus 3020 and 3120, according to other embodiments of the present invention. These embodiments are similar to the various embodiments previously described herein. However, apparatus 3020 and 3120 incorporate adjustment members which permit fine adjustment of the position of the cutting tool. Preferably, these embodiments include an adjusting member which can be moved, by either translation or rotation, from a first position to a second position by placing a surface of the adjustment member in contact with another member.

For example, in one embodiment, a surface of an adjustment member protrudes outwardly and is spaced apart from an external surface of a boring tool. When the boring tool is coupled to a CNC boring machine, the machine can move the boring tool laterally so that the surface of the adjustment member comes into contact with another member. Further movement of the boring tool toward the member results in sliding movement of the adjustment member. The adjustment member is coupled to the cutting tool such that this sliding motion of the adjustment member in a first direction results in sliding motion of the cutting tool in a second direction. Preferably, the second direction is different than the first direction, although the present invention contemplates those embodiments in which the directions are the same.

In yet other embodiments of the present invention, the boring tool is adapted and configured such that movement of the adjustment member by a first amount, either in a rotation or translation, results in movement of the cutting tool by a second amount, either in rotation or translation. Preferably, the boring tool is adapted and configured such that the first amount is greater than the second amount. Such embodiments of the present invention permit fine adjustments of the position of the cutting tool. For example, in some embodiments there is a conversion relationship between a translatable adjustment member and a translatable cutting tool holder such that translation of the adjustment member by 0.001 inch results in translation of the cutting tool holder by 0.0001 inch.

FIGS. 44–48 depict various views of an apparatus 3020 according to another embodiment of the present invention. Apparatus 3020 is a boring tool assembly which includes a slidably adjustable cutting tool 3025. Cutting tool 3025 is fixedly supported, such as by a tool support 3030, which extends from a slidably adjustable tool holder 3035. Tool holder 3035 preferably includes a joint 3037 such as a dovetail joint or a T-joint which slidably couples within a complementary-shaped joint formed by pocket 3038.3 and underside surface 3070b of retention member 3070. Coupling element 3045 includes a coupling element body 3038 which attaches to tool holder 3035, and locates boring tool assembly 3020 on a drive unit such as drive unit 3088 of machine 3082 (referring to FIG. 54). Coupling element 3045 couples tool holder 3035 to the boring machine. Coupling element 3045 is slidable in a direction relative to tool holder 3035. Tool holder 3035 is adjustable over a range of positions in the direction for machining a hole within a range of dimensions that correspond to the range of positions.

Figure 46B:
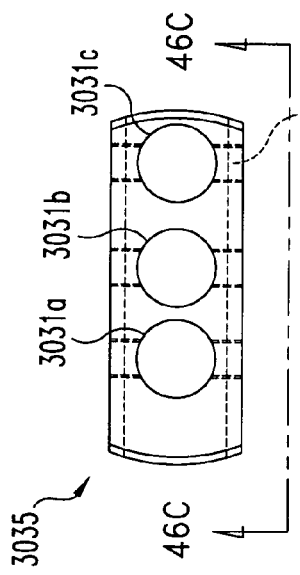
FIG. 46B is a view of the apparatus of FIG. 46A as taken along the line 46B—46B of FIG. 46A.
Figure 46D:
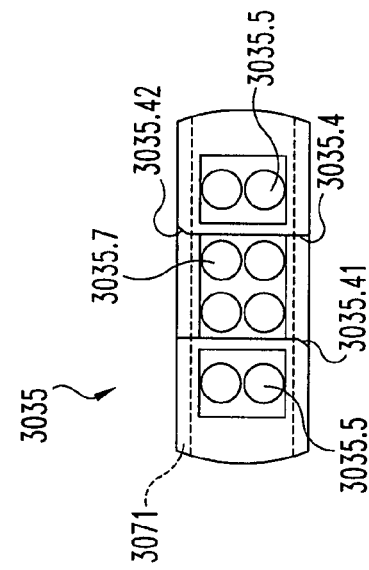
FIG. 46D is a view of the apparatus of FIG. 46A as taken along the line 46D—46D of FIG. 46C.

Boring tool 3020 preferably includes a multiple piece tool holder 3035 which comprises a joint portion 3037. Referring to FIG. 46B, tool holding portion 3035.1 of tool holder 3035 includes a plurality of bores 3031a, 3031b, and 3031c for receiving an inserted tool support 3030. A set screw (not shown) received within the appropriate threaded hole 3018 locks tool support 3030 within the specific hole.

Figure 46A:
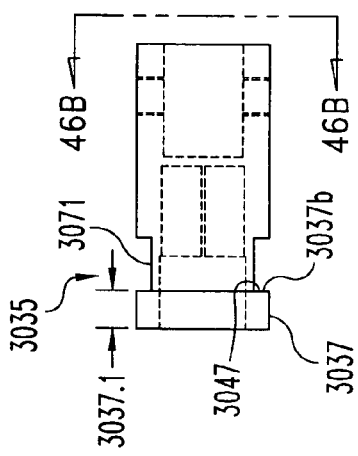
FIG. 46A is a side elevational view of a portion of the apparatus of FIG. 44A.
Figure 46C:
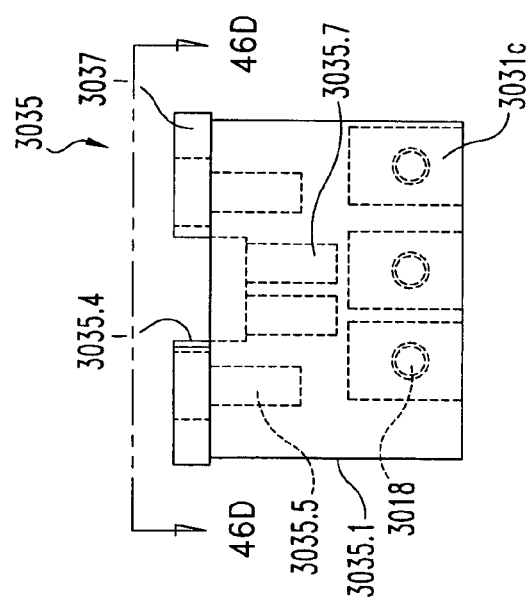
FIG. 46C is a view of the apparatus of FIG. 46A as taken along the line 46C—46C of FIG. 46B.
Figure 48B:
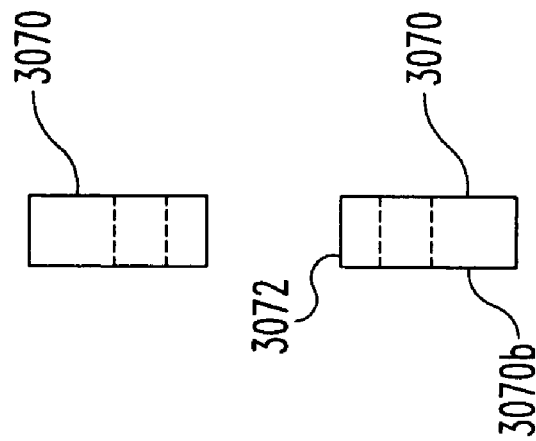
FIG. 48B is a side elevational view of the apparatus of 48A as taken along the line 48B—48B of FIG. 48A.
Figure 48A:
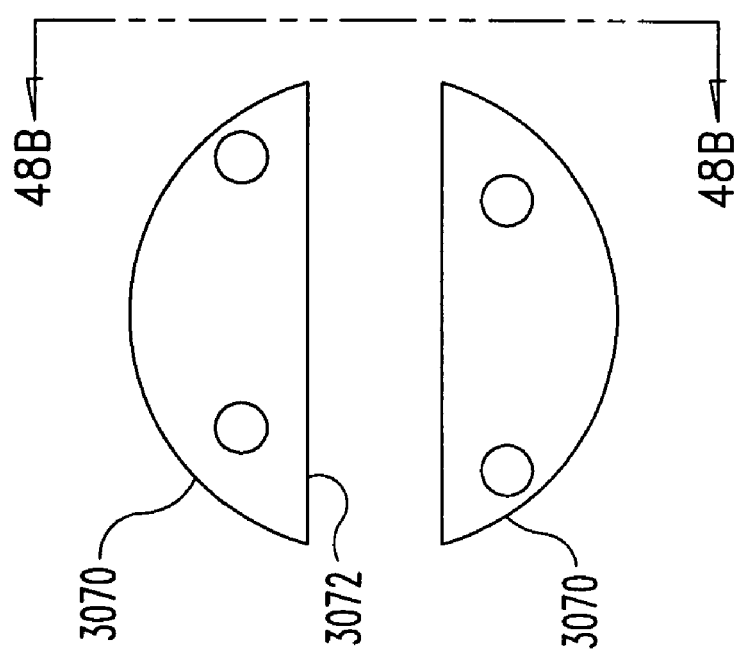
FIG. 48A is a top plan view of a portion of the apparatus of FIG. 44B.
Figure 51B:
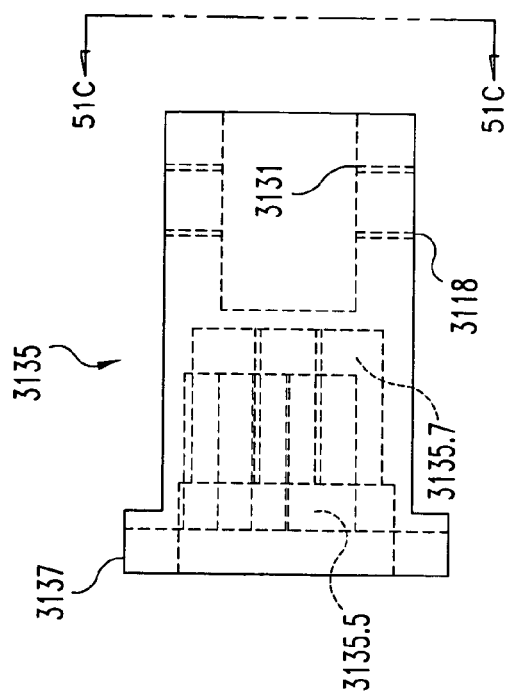
FIG. 51B is a view of the apparatus of FIG. 51A as taken along the line 51B—51B of FIG. 51A.
Figure 51A:
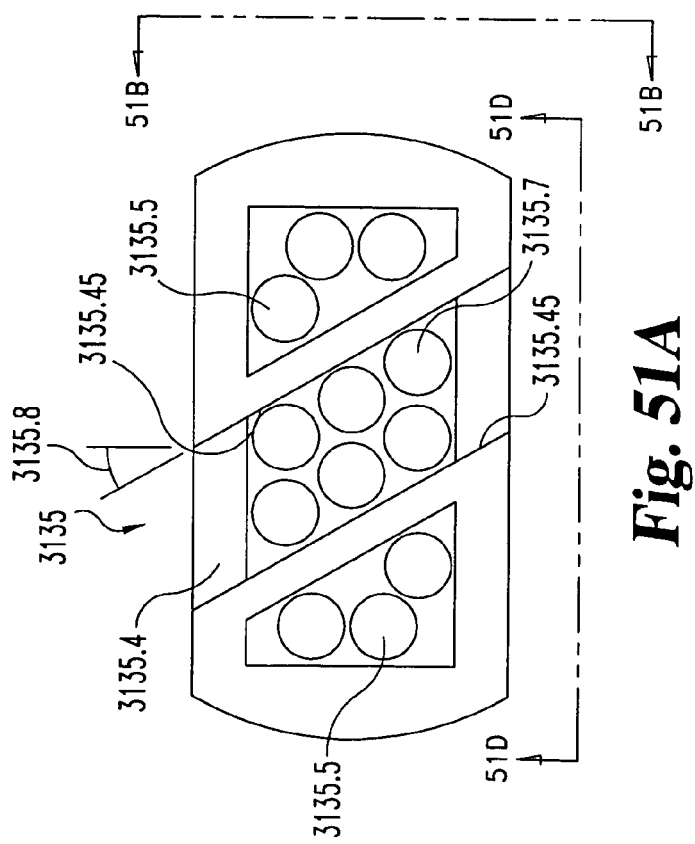
FIG. 51A is a side elevational view of a portion of the apparatus of FIG. 49A.
Figure 51D:
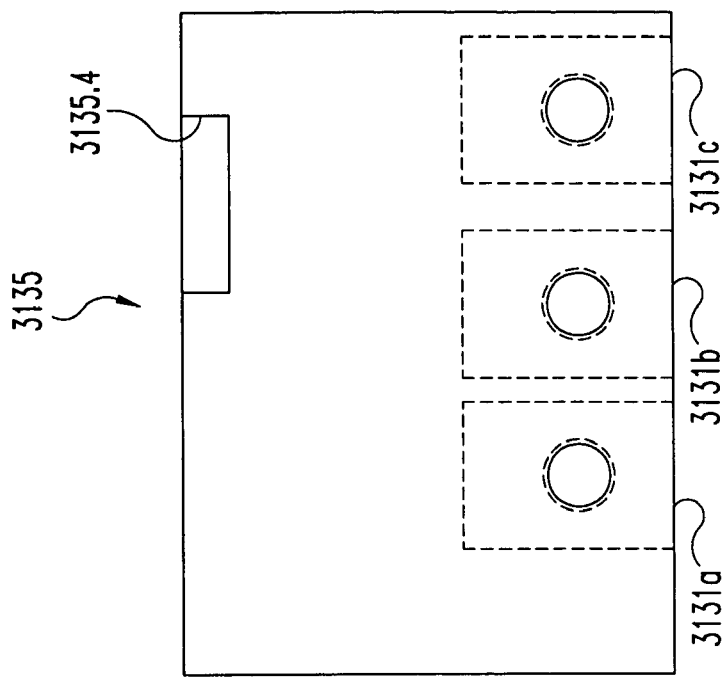
FIG. 51D is a view of the apparatus of FIG. 51A as taken along the line 51D—51D of FIG. 51C.
Figure 51C:
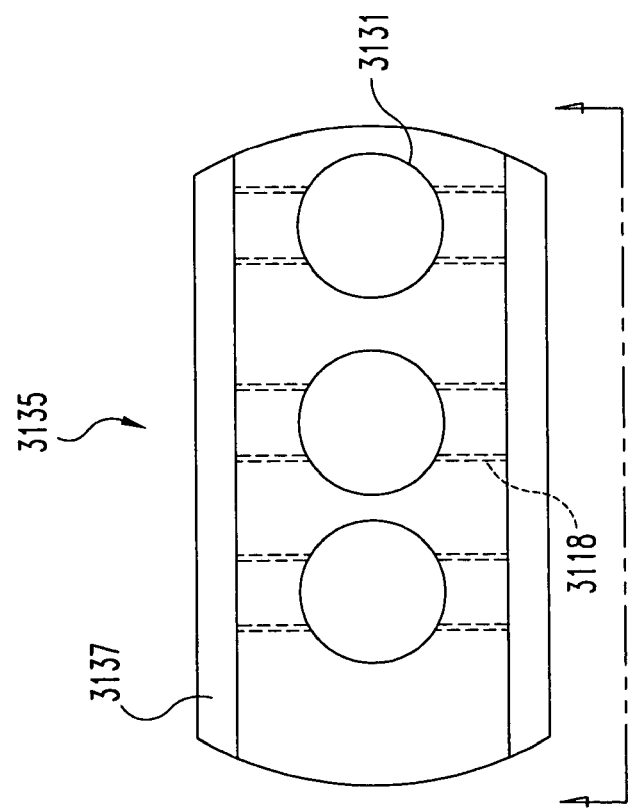
FIG. 51C is a view of the apparatus of FIG. 51A as taken along the line 51C—51C of FIG. 51B.
Figure 52B:
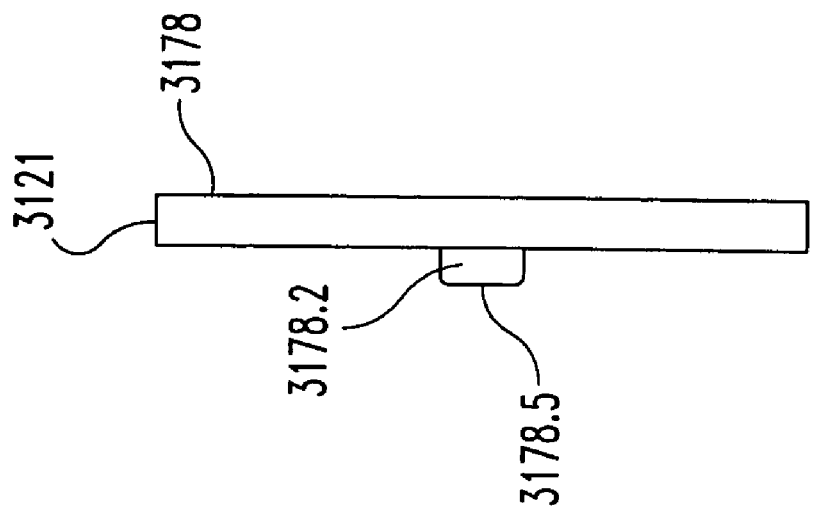
FIG. 52B is a view of the apparatus of FIG. 52A as taken along a line 52B—52B of FIG. 52A.
Figure 52A:
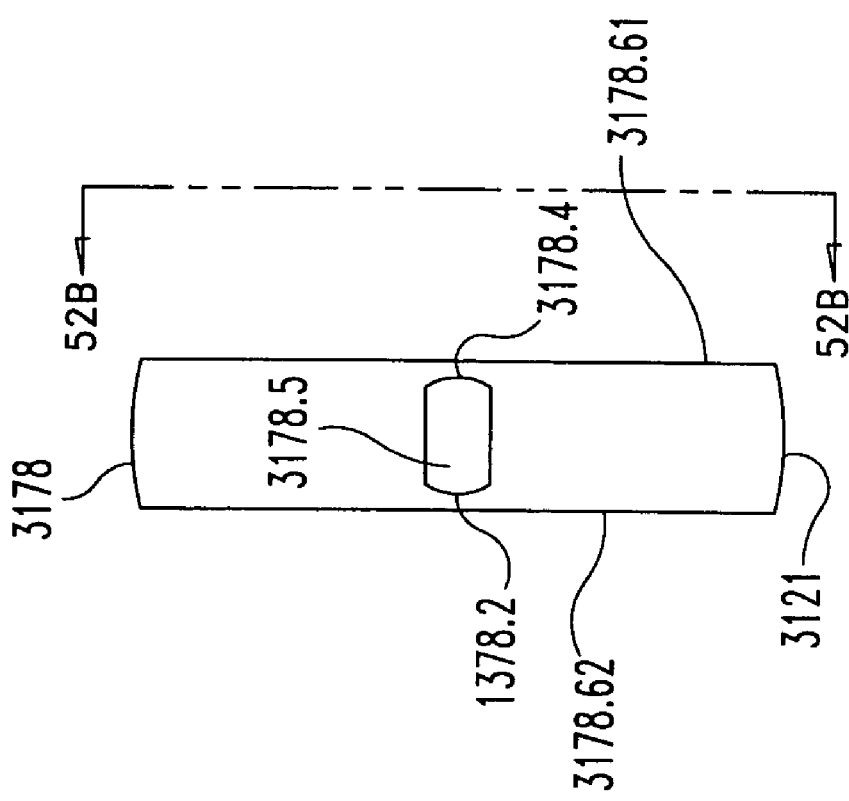
FIG. 52A is an top plan view of a portion of the apparatus of FIG. 49B.

Referring to FIGS. 46A, B, C, and D, tool holder 3035 is slidably captured within the assembly of coupling element 3045, as will be described. Tool holder 3035 includes a plurality of spring pockets 3035.5 and 3035.7. In one embodiment, each spring pocket accepts therein a biasing member 3043. As shown in FIG. 44A, in one embodiment, biasing member 3043 is a coil spring. However, the present invention contemplates other types of biasing members, including, for example, pneumatically or hydraulically actuated expandable pressure vessels, coil springs, leaf springs, and belleville springs. Preferably, each spring 3043 has a height that is greater than the depth of the corresponding pocket 3038.1. With this arrangement, each spring will "stand proud" when placed within the corresponding pocket.

Although what has been shown and described is an arrangement in which the springs have an end that extends beyond the top of the corresponding pocket, the present invention also contemplates those embodiments in which the springs are equal in height to the pocket, or lesser in height.

Tool holder 3035 preferably includes a scalloped recess 3071 which slidably receives the retention edge 3072 of members 3070. A pair of retention members 3070 are received within recess 3071 and fastened to body 3038. Members 3070 compress the assembly of springs 3043 and joint portion 3037 of holder 3035. Fasteners 3041 are preferably tightened until the underside surface 3070b of retention 3070 is in contact with body 1538. In one embodiment, there are eight springs 3043, and each is compressed about 0.1 inches in this assembled condition. These eight springs preferably provide from about 10 to 100 pounds of force per spring against body 3038.

As will be appreciated from FIG. 44A, there is a frictional interface between surface 3037b of tool holder 3035 and surface 3070b of retention members 3070. These facing surfaces are maintained in compression by springs 3043. Facing contact surfaces 3037b and 3070b are adapted and configured to provide a frictional force that is sufficient to maintain tool support 3035 in place during machining, but insufficient to prevent sliding adjustment of tool holder 3035 to a new position, in a manner as will be described. The clamping load of the four fasteners, the compressed springs 3043, and the frictional contact surfaces provide a means for applying a frictional force that maintains the cutting tool in place during machining, but permits sliding adjustment of the cutting tool. Tightening of the four fasteners maintains retention members 3070 in contact with surface 3037b and the clamping surface of body 3038. However, T-joint 3037 is of a height 3037.1 (refer to FIG. 46A) that is less than the corresponding depth of pocket 3038.3 in which it is received (referring to FIG. 45A). Therefore, tightening of the four fasteners does not "bottom out" T-joint 3037 within channel 3038.3 of coupling member 3045.

The present invention contemplates application of frictional coating to either one or both of the contact mating surfaces 3037b and 3070b. In addition to the use of a frictional material such as a brake pad material for a frictional coating, 3047, the present invention further contemplates other types of materials applied to one or more contact surfaces, including surface coatings for increased resistance to abrasion, wear, galling, and the like. Such coatings may provide this increased resistance by a drop in the coefficient of friction. In such applications, the required frictional force can be achieved by increasing the normal or contact force between contacting surfaces. Non-limiting examples of various surface coatings providing increased resistance to abrasion, wear, galling, and the like include the use of a Babbitt bearing alloy, polyvinyl chloride polymer, polyethylene polymer, TFE fluorocarbon polymer, molybdenum-disulfide (with or without solid film lubricants such as graphite), and oil. Further, as non-limiting examples, the present invention contemplates the use of thermochemical coatings, hot-dipped coatings, plating, mechanical cladding, deposited coatings, and heat treating of the contact surfaces to achieve the appropriate wear and frictional characteristics.

Some embodiments of the present invention use one pair of contact surfaces to provide most of the frictional force holding the tool holder stationary relative to the coupling element during machining. Other contact surfaces placed against the tool holder can include surface finishes or surface coatings which have a low coefficient of friction. By limiting the high coefficient of friction coatings, materials, and surfaces to a single pair of mating contact surfaces, the total amount and location of sliding friction applied against the tool holder can be reliably and accurately maintained.

Apparatus 3020 includes an adjustment member 3078 for effecting the sliding movement of tool holder 3035. Referring to FIGS. 47A and 47B, adjustment member 3078 includes a pair of lobes 3078a and 3078b. Referring to lobe 3078b, it includes a first, a longer sliding surface 3078.61 on one side, and a shorter, parallel surface 3078.62 on the other side. The remainder of the length of the second side includes an angled adjustment surface 3078.21. In one embodiment, angle 3078.8 is about 30 degrees. However, the present invention contemplates angles from about one degree to about 45 degrees. At the end of lobe 3078b is an external contact surface 3021 used during tool position adjustment, as will be described Although lobe 3078b has been described, similar features are found on lobe 3078a.

Referring to FIG. 45B, adjustment member 3078 fits slidably within offset channel 3038.5 of body 3038 of coupling 3045. Further, tool holder 3035 fits slidably within channel 3038.3 of body 3038 of coupling 3045. Retention members 3070 are placed on top of tool holder 3035, and fastened onto body 3038, as best seen in FIGS. 44A and 44B. When body 3038, adjustment member 3078, and tool holder 3035 are assembled together, the central portion of adjustment member 3078 also slides within channel 3035.4 of tool holder 3035. Adjustment member 3078 is able to slide in direction C and tool holder 3035 is able to slide in direction D, as referenced on FIG. 45B.

Body 3038, adjustment member 3078, and sliding tool holder 3035 are slidably coupled together and adapted and configured such that sliding motion of adjustment member 3078 in direction C results in sliding motion of tool holder 3035 in direction D. As one example, sliding motion of member 3078 in a first direction results in contact of angled surface 3078.21 with chamfered corner 3035.42 of tool holder 3035. Contact of chamfered corner 3035.42 with angled surface 3078.21 forces surfaces 3078.61 to be in contact with walls 3038.71 of channel 3038.5. However, adjustment member 3078 is constrained to slide or translate by channel (or slot) 3038.5. Because of the constraint to move within channel 3038.5, further sliding motion of adjustment member 3078 increases the force applied between adjustment surfaces 3078.21 and 3035.42. Since tool holder 3035 is constrained to slide within channel 3038.3, continued motion of 3078 in direction C overcomes the frictional force between tool holder 3035 and retention members 3070, such that tool holder 3035 moves to the left in direction D (referring to FIG. 45B) for upward motion of adjustment member 3078 in direction C. Likewise, downward motion in direction C of adjustment member 3078 results in motion of tool member 3035 to the right in direction D (again referring to FIG. 45B).

Boring tool 3020 is preferably adapted and figured such that channels 3038.5 and 3038.3 are arranged at right angles. Angle 3078.8 of adjustment member 3078 is chosen such that movement of member 3078 by a first amount in direction C results in sliding motion of tool holder 3035 by a second, lesser amount in direction D. Thus, motion of member 3078 is converted by the angled surfaces of member 3078, the chamfered corners of holder 3035, and the offset channels of body 3038 to a reduced motion of tool holder 3035 (equivalent to a "gain" less than one). The conversion ratio, or gain, from motion in direction C to motion in direction D is determined by angle 3078.8. As one example, selection of angle 3078.8 as 30 degrees results in a conversion ratio of about 0.58 (equivalent to the tangent of angle 3078.8). Therefore, motion of adjustment member by 0.001 inches in direction C results in sliding motion of tool holder 3035 in direction D by 0.00058 inches. The geometrical arrangement of channels 3038.5, 3038.3, and selection of angle 3078.8 permit fine adjustment of the position of tool holder 3035. Gross movement of the adjustment member is converted to fine movement of the tool holder.

Tool holder 3035 includes a plurality of spring pockets 3035.7 which contain springs 3045 that bear against adjustment member 3078 after the four fasteners of boring tool 3020 are tightened. These four springs provide a frictional force that maintains adjustment member 3078 in a fixed position during machining with cutting tool 3025. However, this frictional force is insufficient to maintain the position of adjustment member 3078 during adjustment of the position of cutting tool 3025. Referring to FIG. 47B, in some embodiments of the present invention adjustment member 3078 is provided with coatings and/or surface treatments which control the friction between member 3078 and body 3038 and member 3078 and tool holder 3035. As previously discussed herein, this frictional treatment may increase the friction at some surfaces of member 3078, and decrease the friction at other surfaces. Further, some embodiments contemplate hardening by coating, surface treatment, heat treating, or other method of angled surfaces 3078.21, 3078.22, as well as chamfered corners 3035.41 and 3035.42.

Although what has been shown and described are a plurality of springs 3043 which are located in pockets 3035.5 and 3035.7, it is understood that the present invention contemplates springs and/or biasing units of different spring constants and/or actuated normal forces of differing quantities. For example, the springs in pockets 3035.5 can have a greater spring constant than the springs used in pocket 3035.7, since the forces applied to the adjustment member during machining are less, in some applications, than the forces applied to tool holder 3035 during machining. Further, it is understood that although springs have been shown and described, the present invention contemplates the use of any of the force-actuating means shown and described herein, including pneumatic, magnetic, electromagnetic, centrifugal, and other means.

FIG. 54A schematically depicts a system 3080 according to another embodiment of the present invention. An electronically controlled machine (such as a CNC boring machine) 3082 uses a slidably adjustable boring tool 3020 to bore a hole 3084 in a workpiece or product 3086, such as a transmission case. Boring machine 3082 includes a drive unit 3088 which releaseably couples to coupling element 3045 in a conventional manner. Drive unit 3088 provides power from a motor 3090 to rotate boring tool 3020 during the boring process. In one embodiment, motor 3090 and drive unit 3088 maintain boring tool 3020 in a fixed location, and machining of bore 3084 is accomplished by mounting product 3086 to a table 3092 which is capable of movement in multiple axes. However, the present invention also contemplates lateral and axial movement of boring tool 3020 relative to table 3092, or lateral and axial motions of both boring tool 3020 and table 3092. Preferably, machine 3082 includes a computer 3094 which includes memory 3095 for storing a software algorithm 3096. Machine 3082 preferably includes a plurality of position sensors (not shown) which detect translational movement of table 3092 and/or drive unit 3088. Although a CNC boring machine has been shown and described, the present invention also contemplates boring machines which are electronically controlled without the use of a computer, as well as boring machines which are mechanically controlled.

One manner of adjusting the location of cutting tool 3025 of boring tool 3020 is as follows. The operator machines a feature on the object such as a bore, measures a characteristic of the feature such as the diameter of the bore, and determines the magnitude of error in the size of the feature. The operator then issues instructions to the CNC machine, or alternatively runs software on the CNC machine or electronically positions an electronically controlled boring machine or manually positions a manually controlled boring machine, to adjust the position of cutting tool 3025 by a distance corresponding to the measured error. In the case of an electronically or mechanically controlled boring machine that is not computer controlled, the operator uses the appropriate electrical or manual controls for sideways movement of the boring tool. Further, the present invention contemplates those embodiments in which the measurement of the diameter of the bore is performed automatically by one or more position sensors of the electronically controlled machine 3082. The present invention contemplates the use of any type of position sensor, including LVDTs, potentiometers, lasers, or any other devices known in the art.

Adjustment of the lateral position of cutting tool 3025 relative to coupling element 3045 is accomplished by placing external surface 3021 of adjustment member 3078 against a surface 3051 of a static member 3050. In one embodiment of the present invention, drive unit 3088 and the coupled boring tool are moved laterally at a first, high travel rate until surface 3021 is close to surface 3051, at which time a slower travel rate is used. This placement of external surface 3021 against rigid surface 3051 is angularly offset from the direction in which tool holder 3035 slides relative to coupling element 3045. For example, for a boring tool 3020 as shown in FIG. 1B, the rigid member 3050 extends vertically as shown on FIG. 1B and touches the side external surface 3021 of member 3078. Forces exerted between rigid member 3050 and surface 3021 are preferably perpendicular to the direction of sliding motion of tool holder 3035 relative to coupling element 3045. However, the present invention is not limited to the use of a vertically oriented rigid member, and contemplates any orientation for a surface that permits contact between the surface 3051 and an external surface 3021 of the adjustment member tool holder for exerting a force for sliding movement of the tool holder 3035 relative to coupling element 3045. In some embodiments of the present invention, the boring tool is moved relative to a static member. In other embodiments, a member, preferably a member under control of the CNC machine, is moved relative to a static boring tool.

Figure 55:
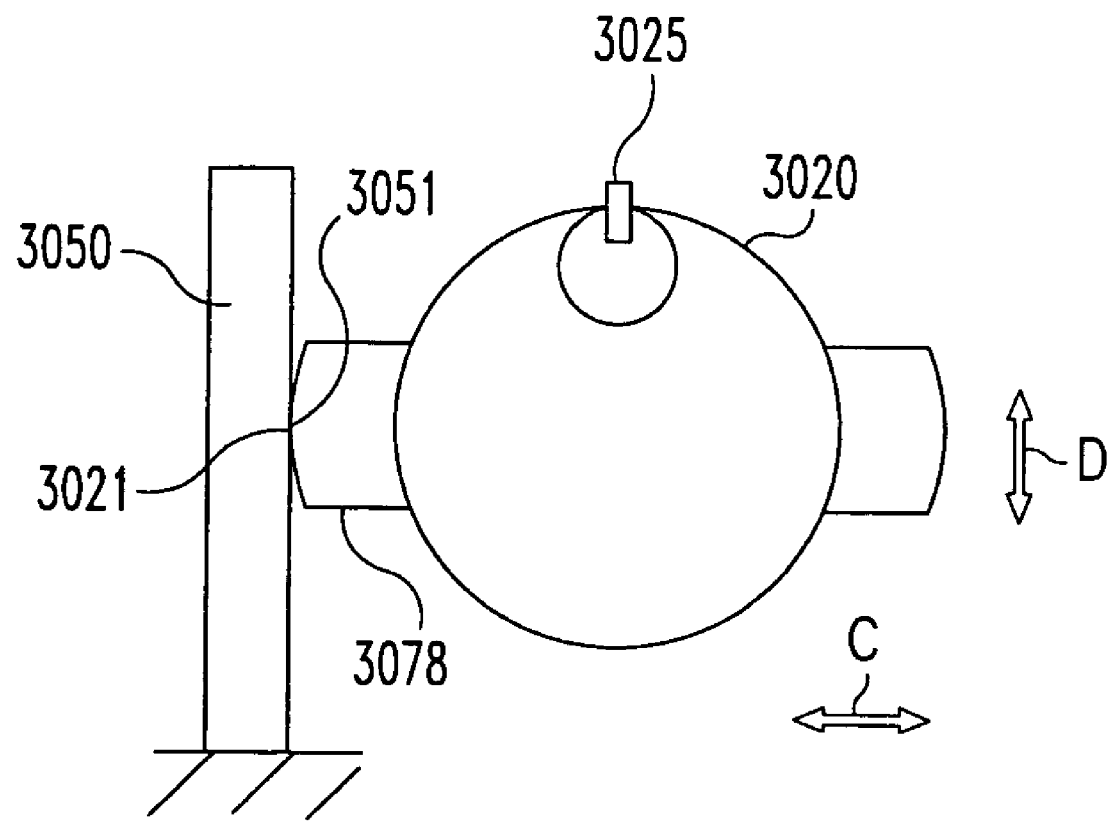
FIG. 55 is an end-view of a portion of the system of FIG. 54 as taken along line 55—55 of FIG. 54.
Figure 56:
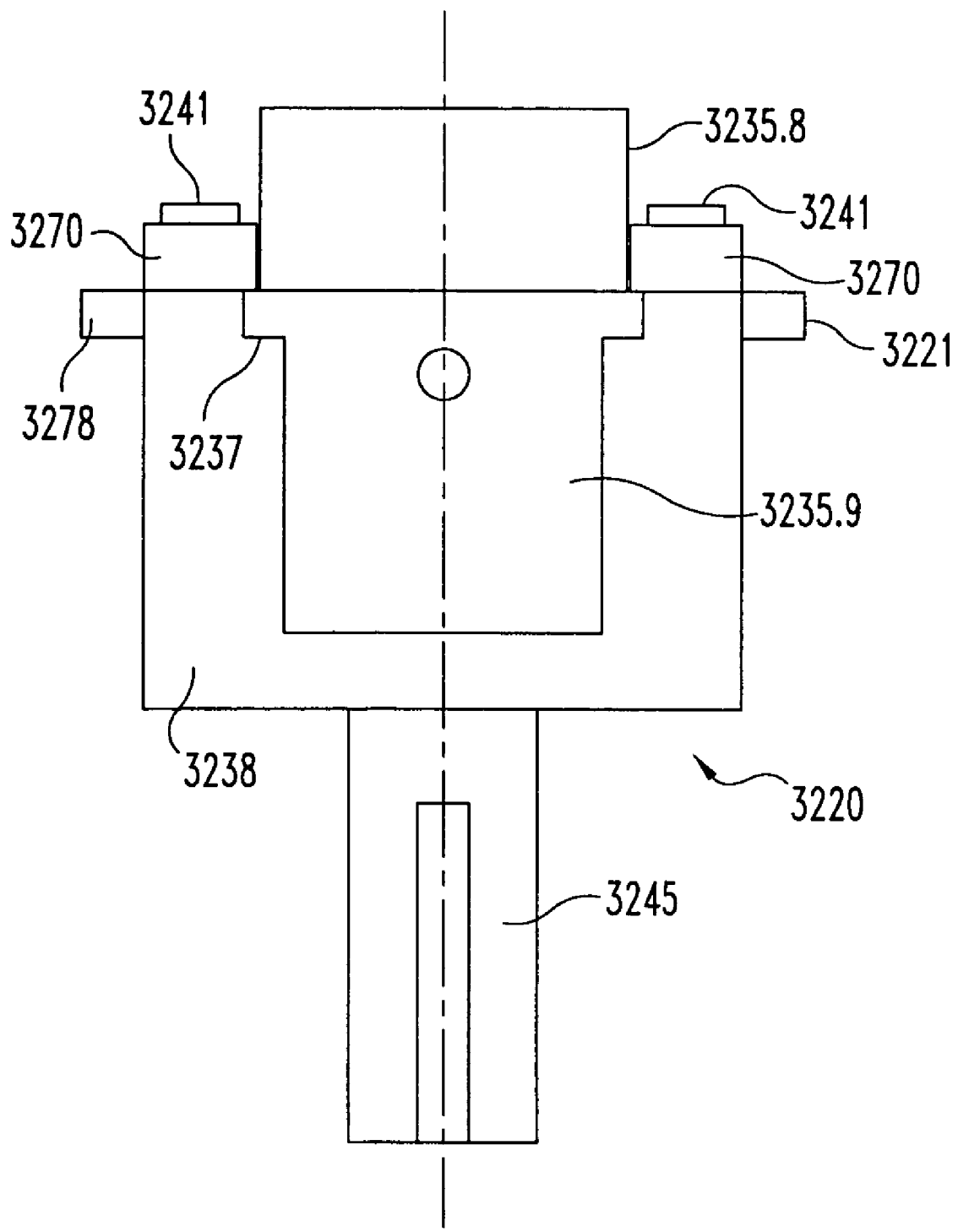
FIG. 56 is a side elevational view of an apparatus according to another embodiment of the present invention.
Figure 57:
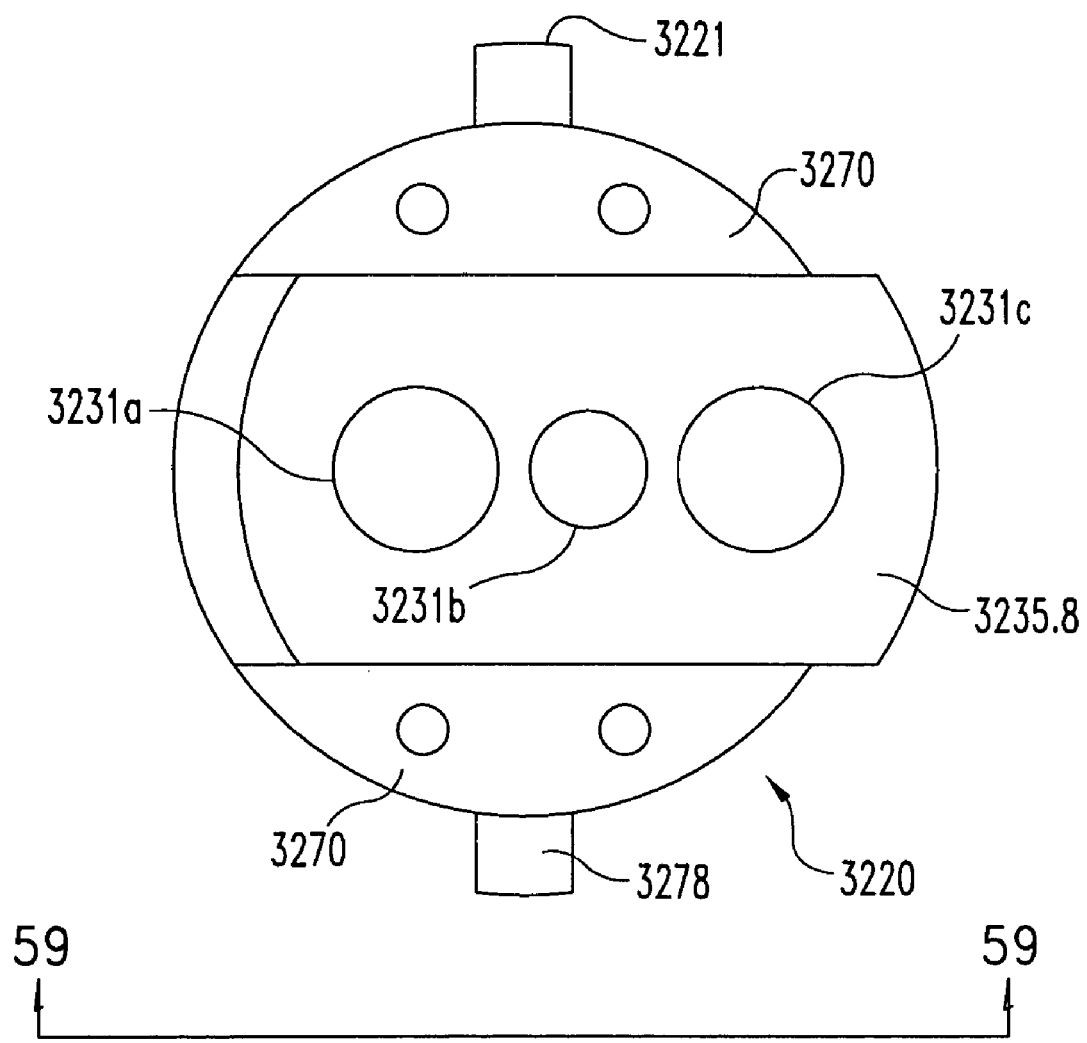
FIG. 57 is a top elevational view of the apparatus of FIG. 56 with the tool holder slid to the right.

As best seen in FIG. 55, surface 3051 of member 3050 is placed in contact with surface 3021 of adjustment member 3078. After the surfaces contact each other, any further movement of boring tool 3020 in direction C toward member 3050 results in sliding motion of cutting tool 3052 in direction D.

This pressing together of the two surfaces does not result in sliding movement of tool holder 3035 until the static friction force holding tool holder 3035 in place is overcome. Once the lateral force exerted by the machine overcomes the static frictional force, tool holder 3035 moves laterally as long as the force applied by the machine is greater than the dynamic (or moving) frictional force applied against tool holder 3035. The machine continues to apply a lateral force until position sensors (not shown) of the electronic machine, or alternatively the human operator of a manually controlled machine, indicates that sufficient movement has occurred to place the cutting tool at the new, proper location.

Apparatus 3020 permits the operator of the CNC machine to move the boring tool 3020 by an amount that is greater than the desired movement of the cutting tool. As previously explained for the particular geometry shown and described for boring tool 3020, movement of adjustment member 3078 by one unit results in movement of tool holder 3035 by 0.58 units. Inversely, if the operator intends to move the tool holder by one unit, the operator should move the adjustment member by 1.72 units (the inverse of 0.58). However, as previously explained herein, the operator can select movement of the adjustment member based on other considerations, including consideration of "stiction", machine wear, tool wear, and other factors known to machine operators.

Although what has been shown and described is a boring tool 3020 in which the adjustment member and tool holder slide at right angles relative to each other, the present invention is not so limited. The present invention contemplates other embodiments in which boring tool 3020 is adapted and configured to include an adjustment member and slidable tool holder which slide at non-perpendicular angles. With non-perpendicular movements of the adjusting member relative to the tool holder, it is possible to further reduce the conversion ratio (or gain) and further increase the fineness by which the position of the cutting tool can be adjusted. As another example, selection of angle 3078.8 closer to parallel with side 3078.62 or 3078.61 of member 3078 further increases the fineness by which the position of the cutting tool can be adjusted. For example, for an angle 3078.8 selected as 5–6 degrees, it is possible to achieve a fineness ratio of about 10:1 (i.e., movement of the adjustment member by 10 units results in movement of the cutting tool by 1 unit).

Figure 54:
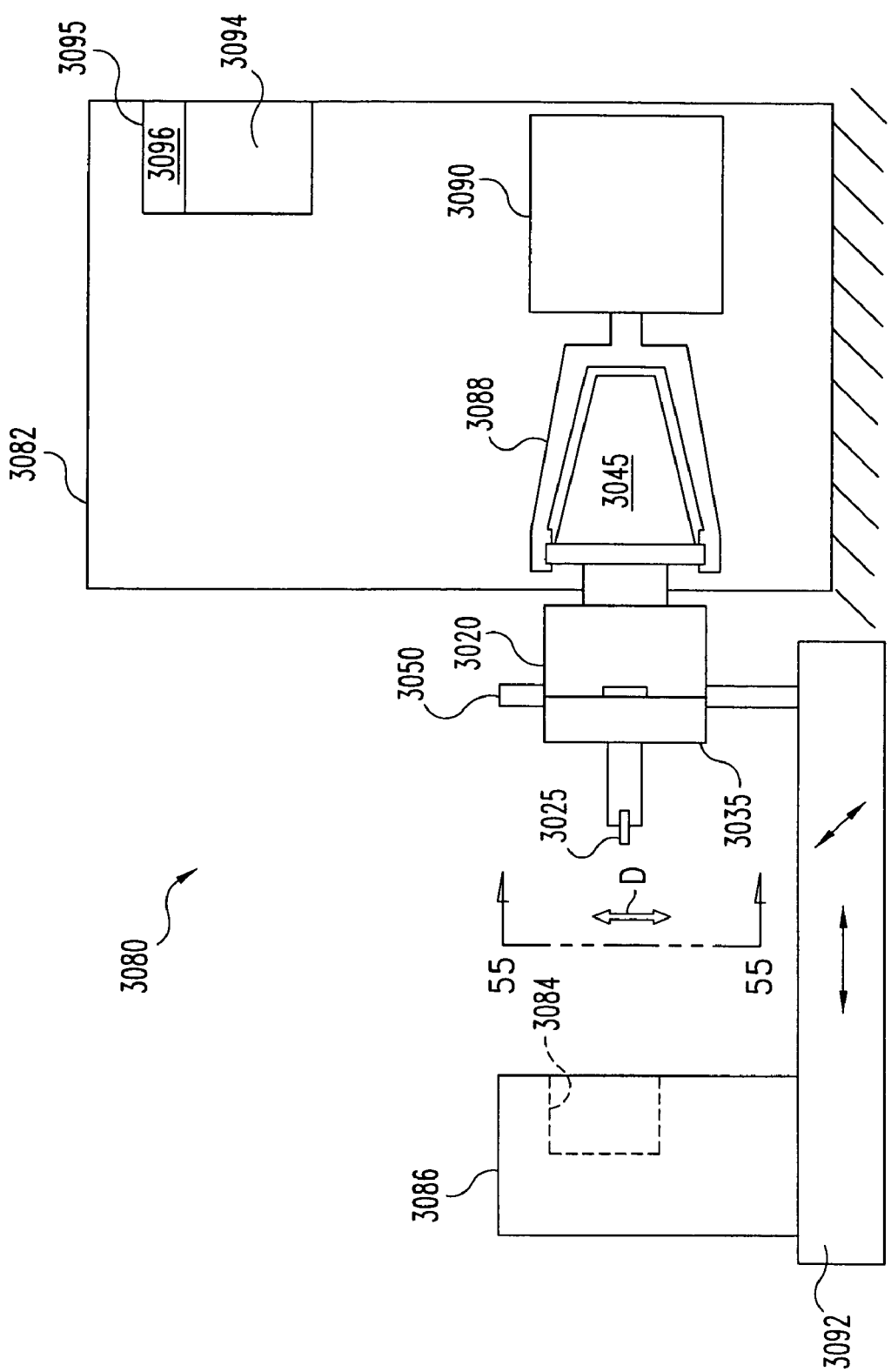
FIG. 54 is a schematic representation of a system for boring holes and adjusting a boring tool according to another embodiment of the present invention.

In addition, the present invention also contemplates those embodiments in which the adjustment member is rotated rather than translated during adjustment by the CNC machine. In these embodiments, the adjustment member can be linked by various gear mechanisms and/or linkages to the tool holder, such that movement of the drive unit 3088 of system 3080 by a first amount results in translation of cutting tool 3025 by a second, lesser amount. Further, as best seen in FIGS. 44A, 44B, and 54, the adjustment member and the tool holder translate in directions that are generally perpendicular to the rotational axis of drive unit 3088. However, the present invention also contemplates those embodiments in which the adjustment member is movable in a direction that is partly orthogonal to the rotational axis, and in which movement of the tool holder is partly orthogonal to the rotational axis.

FIGS. 49–53 depict an apparatus 3120 according to another embodiment of the present invention. In apparatus 3120, as will be described, the internal, angled surfaces that convert motion of the adjustment member in a first direction to motion of a cutting tool in a second direction are provided on the cutting tool.

FIGS. 49–53 depict various views of an apparatus 3120 according to another embodiment of the present invention. Apparatus 3120 is a boring tool assembly which includes a slidably adjustable cutting tool 3125. Cutting tool 3125 is fixedly supported, such as by a tool support 3130, which extends from a slidably adjustable tool holder 3135. Tool holder 3135 preferably includes a joint 3137 such as a dovetail joint or a T-joint which slidably couples within a complementary-shaped joint formed by pocket 3138.3 and underside surface 3170b of retention member 3170. Coupling element 3145 includes a coupling element body 3138, and locates boring tool assembly 3120 on a drive unit such as drive unit 3188 of machine 3182 (referring to FIG. 54). Coupling element 3145 couples tool holder 3135 to the boring machine. Coupling element 3145 is slidable in a direction relative to tool holder 3135. Tool holder 3135 is adjustable over a range of positions in the direction for machining a hole within a range of dimensions that correspond to the range of positions.

Apparatus 3120 is the same as apparatus 3020 except as hereafter shown and described. Both apparatus 3020 and 3120 preferably include at least one sliding member which includes a contact surface angled in a direction that is not parallel to the sliding direction of either the adjustment member or the cutting tool holder. However, the angled direction preferably does include a directional component parallel to the sliding direction of the adjustment member and the tool holder (i.e., the directional component is not at a right angle relative to the sliding direction). Since the direction of the angled surface is not parallel to either of the sliding directions (for instance, sliding directions C and D as shown on FIG. 45B) and since the direction of the angled surface is not perpendicular to either sliding direction, any movement along the angled surface is movement in both the C and D directions.

Preferably, either the adjustment member or the tool holder includes an angled contact surface as previously described. Since this contact surface is located on an angle that includes directional components in both sliding directions, movement of either the adjustment member or the tool holder results in sliding motion of the other component. In apparatus 3020, the angled surface 3078.21 and 3078.22 are located on the adjustment member. In apparatus 3120, the angled surfaces 3135.45 are located on cutting tool holder 3135.

What has been described is the placement of an angled contact surface on either the adjustment member or the cutting tool holder. Further, apparatus 3020 and 3120 each show a cutting tool holder that slides orthogonally relative to the adjustment member. However, the present invention also contemplates those embodiments in which the cutting tool holder moves along a path that is non-perpendicular to the path of the adjustment member. Further, the present invention contemplates those embodiments in which both the adjustment member and the cutting tool holder include sliding surfaces that contact each other, each sliding surface preferably being oriented at an angle that includes a directional component in the sliding direction of the adjustment member and a directional component in the sliding direction of the tool holder. Referring to FIG. 51, a tool holder 3135 includes a channel 3135.4 which is adapted and configured to convert sliding motion of adjustment member 3178 to sliding motion of tool holder 3135 in a different direction. Channel 3135.4 includes a pair of parallel sidewalls 3135.45. Sidewalls 3135.45 are skewed at an angle 3135.8 relative to the path of adjustment member 3178. In one embodiment, angle 3135.8 is about 30 degrees, but the present invention contemplates angles as low as about 1 degree up to about 45 degrees.

Adjustment member 3178 in one embodiment includes a pair of generally parallel sidewalls 3178.61 and 3178.62, which are guided and slidably received within slot (or channel) 3138.5 (referring to FIG. 50B). Adjustment member 3178 includes a pin or projection 3178.5 which stands apart from a flat surface of member 3178. Projection 3178.5 preferably includes a pair of rounded sidewalls 3178.2 and 3178.4 which contact wall 3135.45 of tool holder 3135, as will be described.

Referring FIG. 50B, adjustment member 3178 fits slidably within channel 3138.5 of body 3138 of coupling 3145. Tool holder 3135 fits slidably within channel 3138.3 of body of 3138 of coupling 3145. Retention members 3170 are then placed on top of tool holder 3135 and fastened to body 3138 as best seen in FIGS. 49A and 49B.

When body 3138, adjustment member 3178, and tool holder 3135 are assembled together, projection 3178.5 of adjustment member 3178 is slidably received within channel 3135.4 of tool holder 3135. Referring to FIG. 50B, adjustment member 3178 is able to slide in direction C and tool holder 3135 is able to slide in direction D. Body 3138, adjustment member 3178, and sliding tool holder 3135 are slidably coupled together and adapted and configured such that sliding motion of adjustment member 3178 in direction C results in sliding motion of tool holder 3135 in direction D. As one example, and as best seen on FIG. 49B, projection 3178.5 of adjustment member 3178 is in sliding contact with walls 3135.45 of channel 3135.4. As adjustment member 3178 slides in a first direction, the contact surfaces 3178.2 or 3178.4 place a force against the corresponding channel wall 3135.45. This force between projection 3178.5 and the walls of the angled channel 3135.4 couple the sliding motion of member 3178 in a first direction into sliding motion of tool 3135 in a second, different direction. For example, movement of member 3178 in an upward C direction (as seen on FIG. 49B) results in movement of tool holder 3135 to the right along direction D.

Movement of projection 3178.5 within angled channel 3135.4 also places a sideways force on adjustment member 3178. However, sides 3178.62 and 3178.61 are preferably constrained to sliding translation between the walls of slot 3138.5 (as best seen on FIG. 50B). Therefore, member 3178 is constrained to slide in direction C when pushed or pulled during adjustment. Because of this constraint, sliding motion of member 3178 provides a force that is applied from projection 3178.5 to the walls of channel 3135.4 until the static friction holding tool holder 3135 is overcome. Subsequent sliding motion of member 3178 overcomes the frictional force which is otherwise sufficient to retain tool holder 3135 in place during machining operations.

Bore tool 3120 is adapted and configured such that channels 3138.5 and 3138.3 are arranged at right angles. Therefore, angle 3135.8 of tool holder 3135 is chosen such that movement of adjustment member 3178 by a first amount in direction C results in sliding motion of tool holder 3135 by a second, lesser amount in direction D. Thus, body 3138, tool holder 3135, and adjustment member 3178 are adapted and configured such that motion of member 3178 converts to a reduced motion of tool holder 3135 (equivalent to a "gain" less than one). The conversion ratio, or gain, from motion in direction C to motion in direction D is determined by angle 3135.8. As one example, selection of angle 3135.8 as 30 degrees results in a conversion ratio of about 0.58 (equivalent to the tangent of angle 3135.8). Therefore, motion of adjustment member 3178 by 0.001 inches in direction C results in sliding motion of tool holder 3135 in direction D by 0.00058 inches. The geometrical arrangement of channels 3138.5, 3138.3, and selection of angle 3135.8 permit fine adjustment of the position of tool holder 3135.

Apparatus 3120 permits the operator of a CNC machine to move the boring tool 3120 by an amount that is greater than the desired movement of cutting tool 3125. Apparatus 3120 can be substituted for apparatus 3020 in the system 3080, which has been previously described.

In one embodiment of the present invention, the boring tool assembly includes a mechanism and/or material that provides dampening of the vibratory motion. In one embodiment of the present invention, the boring tool assembly includes a first member spring-loaded into contact with a second member. Preferably, the first and/or the second member are fabricated from a friction material, coated with a friction material, and/or coated in a manner as described previously in this application. In one embodiment, the first member is a piece of HF35 friction material made by Hibbing International of New Castle, Ind. This piece of friction material is in contact with a second member on one side, and on the other side is in contact with one or more biasing elements, such as coil springs. Although the use of coil springs has been described, the invention is not so limited, and includes any of the biasing devices shown herein, including centrifugal, electromagnetic, hydraulic, and other means of applying a normal force.

It has been found that a boring tool assembly including a first friction member biased into sliding contact with a second friction member has been successful in substantially reducing the chatter of a tool during a machining operation. The exact mechanisms which contribute to the reduced chatter are not fully understood. For example, it is possible that the first member and second member exhibit relative motion, in which case the dampening mechanism could be friction at the sliding interface. Further, the friction material is known to contain some amount of rubber, which could dampen the vibratory motion by flexing of the rubber (thus generating internal heat). In addition, it is possible that the frictional interface occurs between the friction material and the biasing mechanism (in one case, the coil springs). Yet still, it is possible, that the placement, geometry, and stiffness of the springs results in an internal vibrational mode which influences the otherwise vibratory motion of the boring tool assembly into vibration at a lesser amplitude.

In one embodiment, several dampening mechanisms were incorporated into a boring tool assembly in which the cutting tool was slidably adjustable as described previously. In that embodiment, the dampening mechanism also provided static friction for holding one or more of the sliding members in place. During use, it was found that the tool exhibited greatly reduced chatter. Those of ordinary skill in the art will recognize that the use of a dampening mechanism as described herein is not limited to those embodiments which include slidably adjustable cutting tool holders, and is adaptable to other types of boring tool assemblies. Further, the dampening mechanism is applicable to squared-off joints between the body and the cutting tool holder, as well as dovetail joints and V joints.

FIGS. 56–65 depict various views of an apparatus 3220 according to another embodiment of the present invention. Apparatus 3220 is a boring tool assembly which includes a slidably adjustable cutting tool 3225 (not shown) Cutting tool 3225 is fixedly supported, such as by a tool support 3230 (not shown), which extends from a slidably adjustable tool holder which preferably is in two separable pieces, a retained tool holder 3235.9 and a changeable tool holder 3235.8. During adjustment of apparatus 3220, retained tool holder 3235.9 moves laterally in response to motion of adjustment member 3278. Changeable tool holder 3235.8 is fastened onto retained tool holder 3235.9, and moves along with it. The use of a two-piece, separable tool holder system permits easy change out of apparatus 3220 from one type of tool cutting apparatus to another kind of tool cutting apparatus, without the need to change anything except changeable tool holder 3235.8. This two-piece, separable concept permits significant commonality of boring tool apparatuses for many different types of jobs on a boring machine, thus reducing the inventory cost for the machine shop owner.

Tool holder 3235.9 preferably forms a joint 3237 such as a dovetail joint or a T-joint which slidably couples within a complementary-shaped joint formed by pocket 3238.3 and underside surface 3270*b* of retention member 3270. Coupling element 3245 includes a coupling element body 3238, and locates boring tool assembly 3220 on a drive unit of a boring machine. Coupling element 3245 couples tool holder 3235.9 to the boring machine. Coupling element 3245 is slidable in a direction relative to tool holder 3235.9. Tool holder 3235.9 is adjustable over a range of positions in the direction for machining a hole within a range of dimensions that correspond to the range of positions.

Apparatus 3220 is similar to other apparatuses, except as hereafter shown and described. Apparatus 2320 preferably includes at least one sliding member which includes a contact surface angled in a direction that is not parallel to the sliding direction of either the adjustment member or the cutting tool holders. However, the angled direction preferably does include a directional component parallel to the sliding direction of the adjustment member and the tool holder (i.e., the directional component is not at a right angle relative to the sliding direction). Since the direction of the angled surface is not parallel to either of the sliding directions (sliding directions C and D) and since the direction of the angled surface is not perpendicular to either sliding direction, any movement along the angled surface is movement in both the C and D directions.

Preferably, either the adjustment member or the retained tool holder includes an angled contact surface as previously described. Since this contact surface is located on an angle that includes directional components in both sliding directions, movement of either the adjustment member or the tool holder results in sliding motion of the other component. On apparatus 3220, the angled surfaces 3235.45 are located on retained tool holder 3235.9 (as best seen in FIG. 62*c*).

What has been described is the placement of an angled contact surface on either the adjustment member or the retained cutting tool holder. Further, apparatus 3220 shows a cutting tool holder that slides orthogonally relative to the adjustment member. However, the present invention also contemplates those embodiments in which the cutting tool holder moves along a path that is non-perpendicular to the path of the adjustment member. Further, the present invention contemplates those embodiments in which both the adjustment member and the retained cutting tool holder include sliding surfaces that contact each other, each sliding surface preferably being oriented at an angle that includes a directional component in the sliding direction of the adjustment member and a directional component in the sliding direction of the tool holder.

Adjustment member 3278 fits slidably within channel 3128.5 of body 3238 of coupling 3245. Retained tool holder 3235.9 fits slidably within channel 3238.3 of body of 3238 of coupling 3245. Retention members 3270 are then placed on top of tool holder 3235 and fastened to body 3238.

Bore tool 3220 is adapted and configured such that channels 3238.5 and 3238.3 are arranged at right angles. Therefore, angle 3235.8 of tool holder 3235.9 is chosen such that movement of adjustment member 3278 by a first amount in direction C results in sliding motion of tool holder 3235 by a second, lesser amount in direction D. Thus, body 3238, retained tool holder 3235.9, and adjustment member 3278 are adapted and configured such that motion of member 3278 converts to a reduced motion of tool holder 3235 (equivalent to a "gain" less than one). The conversion ratio, or gain, from motion in direction C to motion in direction D is determined by application of the angular relationships and conversion ratios previously discussed.

Apparatus 3220 permits the operator of a CNC machine to move the boring tool 3220 by an amount that is greater than the desired movement of cutting tool 3225. Apparatus 3220 can be substituted for apparatus 3020 in the system 3080, which has been previously described.

FIGS. 66–71 depict various views of an apparatus 3320 according to another embodiment of the present invention. Apparatus 3320 is a boring tool assembly which includes a slidably adjustable cutting tool 3325 (not shown) Cutting tool 3325 is fixedly supported, such as by a tool support 3330 (not shown), which extends from a slidably adjustable tool holder which preferably is in two separable pieces, a retained tool holder 3335.9 and a changeable tool holder 3335.8. During adjustment of apparatus 3320, retained tool holder 3335.9 moves laterally in response to motion of adjustment member 3378. Changeable tool holder 3335.8 is fastened onto retained tool holder 3335.9, and moves along with it. The use of a two-piece, separable tool holder system permits easy change out of apparatus 3320 from one type of tool cutting apparatus to another kind of tool cutting apparatus, without the need to change anything except changeable tool holder 3335.8. This two-piece, separable concept permits significant commonality of boring tool apparatuses for many different types of jobs on a boring machine, thus reducing the inventory cost for the machine shop owner.

Tool holder 3335.9 preferably forms a joint 3337 such as a dovetail joint or a T-joint which slidably couples within a complementary-shaped joint formed by pocket 3338.3 and underside surface 3370*b* of retention member 3370. Coupling element 3345 includes a coupling element body 3338, and locates boring tool assembly 3320 on a drive unit of a boring machine. Coupling element 3345 couples tool holder 3335.9 to the boring machine. Coupling element 3345 is slidable in a direction relative to tool holder 3335.9. Tool holder 3335.9 is adjustable over a range of positions in the direction for machining a hole within a range of dimensions that correspond to the range of positions.

Apparatus 3320 is similar to other apparatuses, except as hereafter shown and described. Apparatus 3320 preferably includes at least one sliding member which includes a contact surface angled in a direction that is not parallel to the sliding direction of either the adjustment member or the cutting tool holders. However, the angled direction preferably does include a directional component parallel to the sliding direction of the adjustment member and the tool holder (i.e., the directional component is not at a right angle relative to the sliding direction). Since the direction of the angled surface is not parallel to either of the sliding directions (sliding directions C and D) and since the direction of the angled surface is not perpendicular to either sliding direction, any movement along the angled surface is movement in both the C and D directions.

Preferably, either the adjustment member or the retained tool holder includes an angled contact surface as previously described. Since this contact surface is located on an angle that includes directional components in both sliding directions, movement of either the adjustment member or the tool holder results in sliding motion of the other component. In apparatus 3320, the angled surfaces 3335.45 are located within a slot 3335.4 that is defined within adjusting member 3378 (as best seen in FIG. 68*b*).

What has been described is the placement of an angled contact surface on either the adjustment member or the retained cutting tool holder. Further, apparatus 3320 shows a cutting tool holder that slides orthogonally relative to the adjustment member. However, the present invention also contemplates those embodiments in which the cutting tool holder moves along a path that is non-perpendicular to the path of the adjustment member. Further, the present invention contemplates those embodiments in which both the adjustment member and the retained cutting tool holder include sliding surfaces that contact each other, each sliding surface preferably being oriented at an angle that includes a directional component in the sliding direction of the adjustment member and a directional component in the sliding direction of the tool holder.

Adjustment member 3378 fits slidably within channel 3328.5 of body 3338 of coupling 3345. Retained tool holder 3335.9 fits slidably within channel 3338.3 of body of 3338 of coupling 3345. Retention members 3370 are then placed on top of tool holder 3335 and fastened to body 3338.

Boring tool 3320 is adapted and configured such that channels 3338.5 and 3338.3 are arranged at right angles. Therefore, angle 3335.8 of tool holder 3335.9 is chosen such that movement of adjustment member 3378 by a first amount in direction C results in sliding motion of tool holder 3335 by a second, lesser amount in direction D. Thus, body 3338, retained tool holder 3335.9, and adjustment member 3378 are adapted and configured such that motion of member 3378 converts to a reduced motion of tool holder 3335 (equivalent to a "gain" less than one). The conversion ratio, or gain, from motion in direction C to motion in direction D is determined by application of the angular relationships and conversion ratios previously discussed.

Apparatus 3320 permits the operator of a CNC machine to move the boring tool 3320 by an amount that is greater than the desired movement of cutting tool 3325. Apparatus 3320 can be substituted for apparatus 3020 in the system 3080, which has been previously described.

FIGS. 72–78 depict various views of an apparatus 3420 according to another embodiment of the present invention. Apparatus 3420 is a boring tool assembly which includes a slidably adjustable cutting tool 3425 (not shown) Cutting tool 3425 is fixedly supported, such as by a tool support 3430 (not shown), which extends from a slidably adjustable tool holder which preferably is in two separable pieces, a retained tool holder 3435.9 and a changeable tool holder 3435.8. During adjustment of apparatus 3420, retained tool holder 3435.9 moves laterally in response to motion of adjustment member 3478. Changeable tool holder 3435.8 is fastened onto retained tool holder 3435.9, and moves along with it. The use of a two-piece, separable tool holder system permits easy change out of apparatus 3420 from one type of tool cutting apparatus to another kind of tool cutting apparatus, without the need to change anything except changeable tool holder 3435.8. This two-piece, separable concept permits significant commonality of boring tool apparatuses for many different types of jobs on a boring machine, thus reducing the inventory cost for the machine shop owner.

Tool holder 3435.9 preferably forms a joint 3437 such as a dovetail joint or a T-joint which slidably couples within a complementary-shaped joint formed by pocket 3438.3 and underside surface 3470*b* of retention member 3470. Coupling element 3445 includes a coupling element body 3238, and locates boring tool assembly 3220 on a drive unit of a boring machine. Coupling element 3445 couples tool holder 3435.9 to the boring machine. Coupling element 3445 is slidable in a direction relative to tool holder 3435.9. Tool holder 3435.9 is adjustable over a range of positions in the direction for machining a hole within a range of dimensions that correspond to the range of positions.

Apparatus 3420 is similar to other apparatuses, except as hereafter shown and described. Apparatus 3420 preferably includes at least one sliding member which includes a contact surface angled in a direction that is not parallel to the sliding direction of either the adjustment member or the cutting tool holders. However, the angled direction preferably does include a directional component parallel to the sliding direction of the adjustment member and the tool holder (i.e., the directional component is not at a right angle relative to the sliding direction). Since the direction of the angled surface is not parallel to either of the sliding directions (sliding directions C and D) and since the direction of the angled surface is not perpendicular to either sliding direction, any movement along the angled surface is movement in both the C and D directions.

Preferably, either the adjustment member or the retained tool holder includes an angled contact surface as previously described. Since this contact surface is located on an angle that includes directional components in both sliding directions, movement of either the adjustment member or the tool holder results in sliding motion of the other component. In apparatus 3420, the angled surfaces 3435.4 are located within either of a pair of slots defined within adjustment member 3478.

What has been described is the placement of an angled contact surface on either the adjustment member or the retained cutting tool holder. Further, apparatus 3420 shows a cutting tool holder that slides orthogonally relative to the adjustment member. However, the present invention also contemplates those embodiments in which the cutting tool holder moves along a path that is non-perpendicular to the path of the adjustment member. Further, the present invention contemplates those embodiments in which both the adjustment member and the retained cutting tool holder include sliding surfaces that contact each other, each sliding surface preferably being oriented at an angle that includes a directional component in the sliding direction of the adjustment member and a directional component in the sliding direction of the tool holder.

Adjustment member 3478 fits slidably within channel 3428.5 of body 3438 of coupling 3445. Retained tool holder 3435.9 fits slidably within channel 3438.3 of body of 3438 of coupling 3445. Retention members 3470 are then placed on top of tool holder 3435 and fastened to body 3438.

Bore tool 3420 is adapted and configured such that channels 3438.5 and 3438.3 are arranged at right angles.

Therefore, angle 3435.8 of tool holder 3435.9 is chosen such that movement of adjustment member 3478 by a first amount in direction C results in sliding motion of tool holder 3435 by a second, lesser amount in direction D. Thus, body 3438, retained tool holder 3435.9, and adjustment member 3478 are adapted and configured such that motion of member 3478 converts to a reduced motion of tool holder 3435 (equivalent to a "gain" less than one). The conversion ratio, or gain, from motion in direction C to motion in direction D is determined by application of the angular relationships and conversion ratios previously discussed.

Apparatus 3420 permits the operator of a CNC machine to move the boring tool 3420 by an amount that is greater than the desired movement of cutting tool 3425. Apparatus 3420 can be substituted for apparatus 3020 in the system 3080, which has been previously described.

FIGS. 56–79 depict various other embodiments according to the present invention. Several of these figures are scaled: FIGS. 60a, 60b, 60c, 61 (all), 62 (all), 64 (all), 65 (all), 66 (all), 67 (all), 68 (all), 69 (all), 70 (all), 71 (all), 74 (all), 75a, 75b, 76 (all), 77 (all), and 78. These scaled drawings also include many dimensions, all expressed in inches. The dimensions are recognizable apart from the element numbers, since the dimensions generally include one or more arrows that extend to lead lines that are aligned with various features of the particular apparatus.

Figure 58:
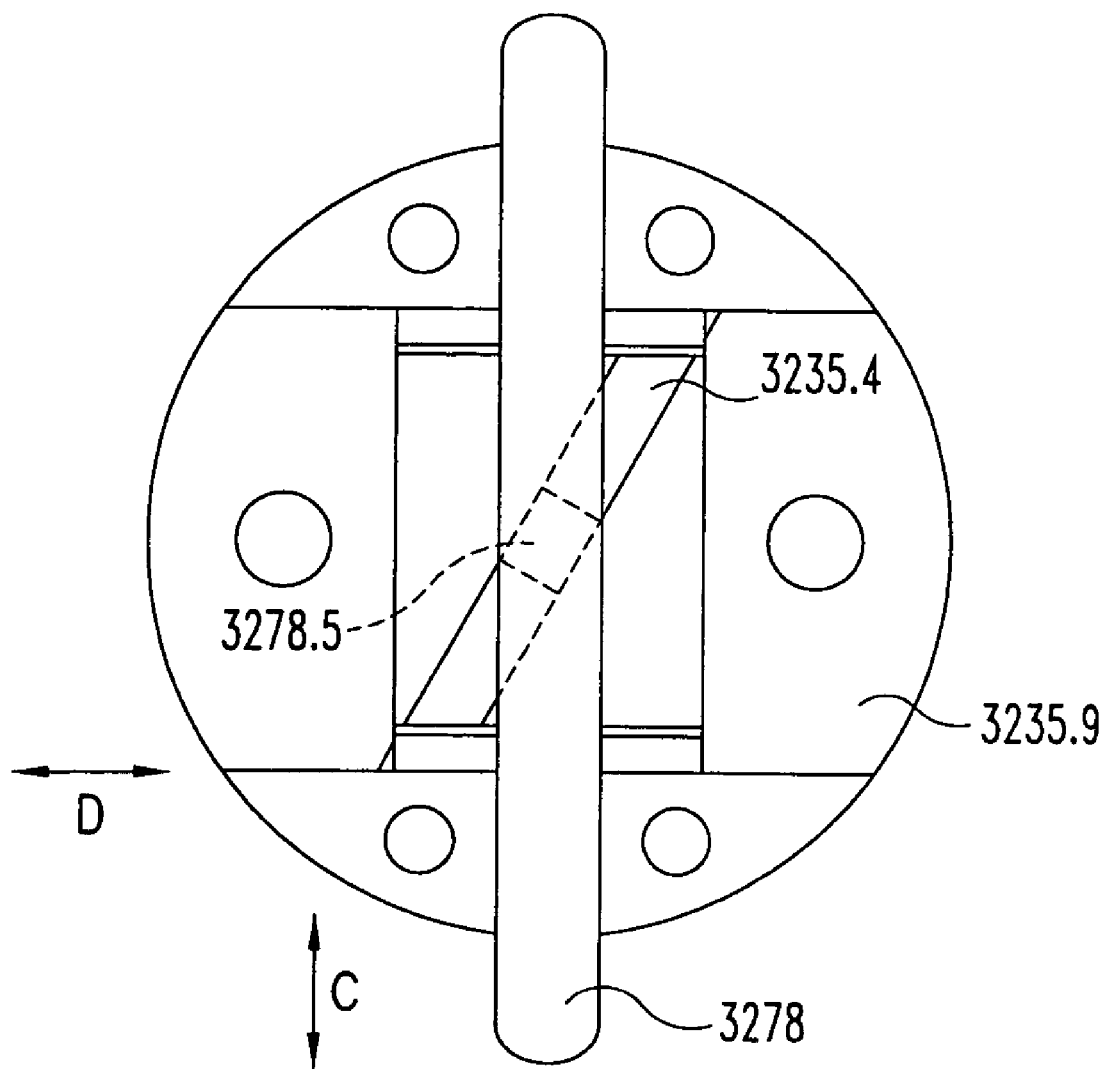
FIG. 58 is a top elevational view of the apparatus of FIG. 57 with the top changeable tool holder removed, the bottom retained tool holder centered, and with the retention members removed.

Referring to FIG. 58, the boring tool apparatus 3220 is shown with the retention members and changeable tool holder removed. Adjustment member 3278 slidingly fits within a channel of body 3138. Projection or tang 3278.5 is slidingly received within slot 3235.4 of retained tool holder 3235.9. Movement of adjustment member 3278 in a first direction C results in sliding movement of retained tool holder 3235.9 in a direction D that is at least partly orthogonal to direction C. As projection 3278.5 moves in direction C, a side surface of projection 3278.5 pushes in direction C upon a wall of channel of 3235.4. Because of the angular geometry previously discussed, tool holder 3235.9 slides in direction D.

Figure 59:
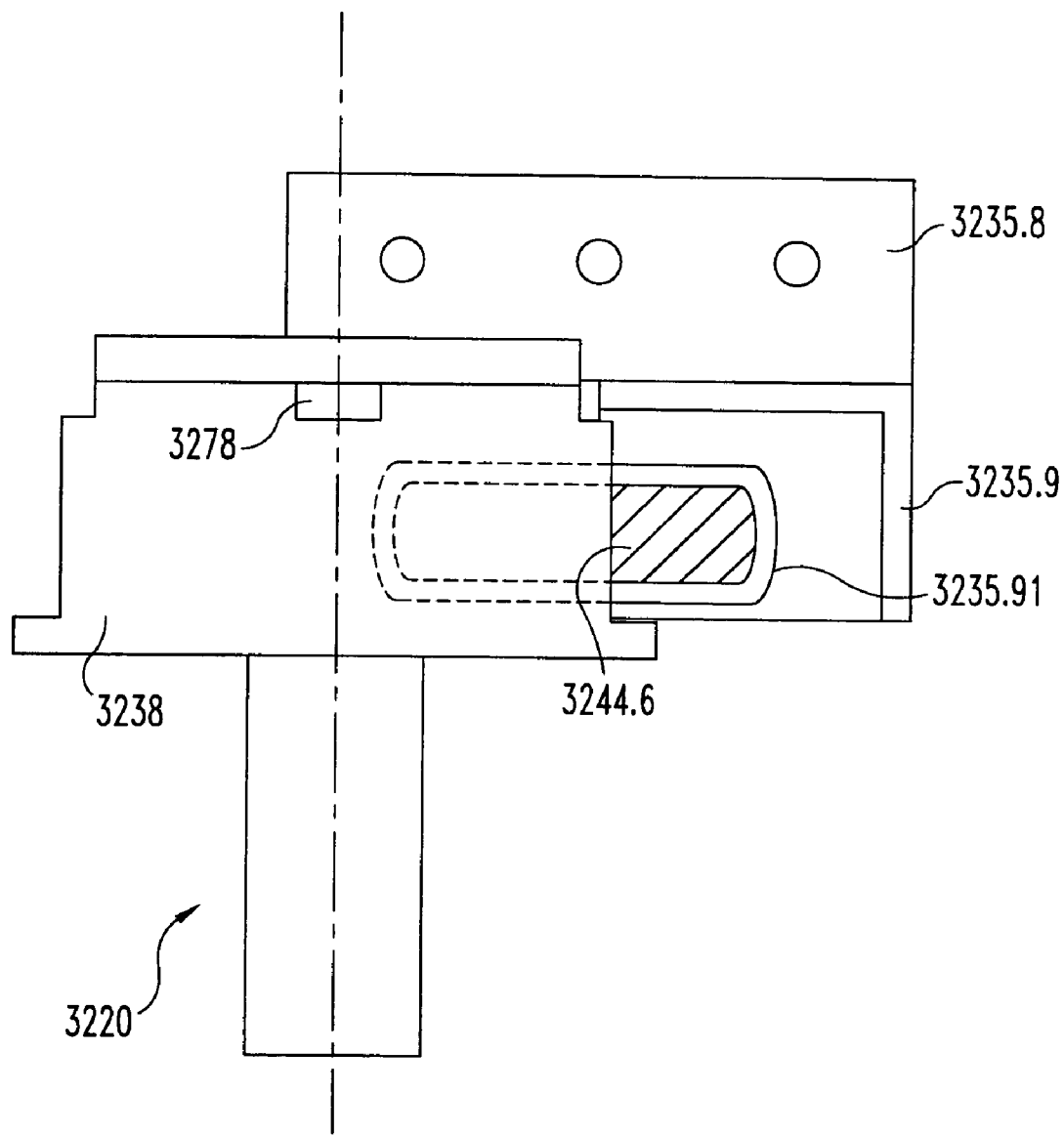
FIG. 59 is a side elevational view of the apparatus of FIG. 57, as viewed along the line 59—59 of FIG. 57.

FIG. 59 is a side elevational view of apparatus 3220 with tool holders 3235.8 and 3235.9 extended to the left so as to show internal components of the retained tool holder. A brake member 3244.6 (with surface shown in crosshatch) is retained within a pocket 3235.91 which is milled into a face of retained tool holder 3235.9 (which can also be seen in FIG. 62d). A plurality of coil springs (not shown) reside within individual pockets 3238.1 and urge brake member 3244.6 laterally against a surface L of body 3238, as best seen in FIG. 60b. Preferably, springs and brake members are placed on opposing sides of retained tool holder 3235.9, and press outward against both walls L of body 3238. In one embodiment, each spring is a coil spring. In one particular embodiment, the springs were Fastenall ⅝ by 1-inch gold springs, Part No. 300450. In yet another particular embodiment, the springs were Fastenall ⅝ by 1-inch red springs, Part No. 300353. However, those of ordinary skill will recognize that the biasing of brake member 3244.6 can be accomplished by any of the biasing methods and apparatus described herein. In some embodiments of the present invention, it is believed that the springs and brake member contribute to dampening of vibratory motion that would otherwise be manifested as tool chatter.

Figure 61B:
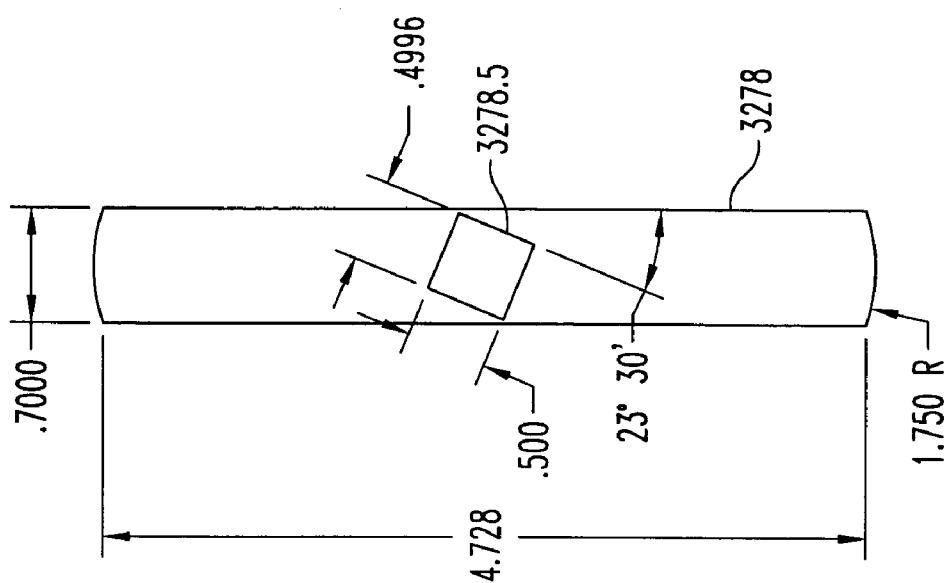
Figure 61A:
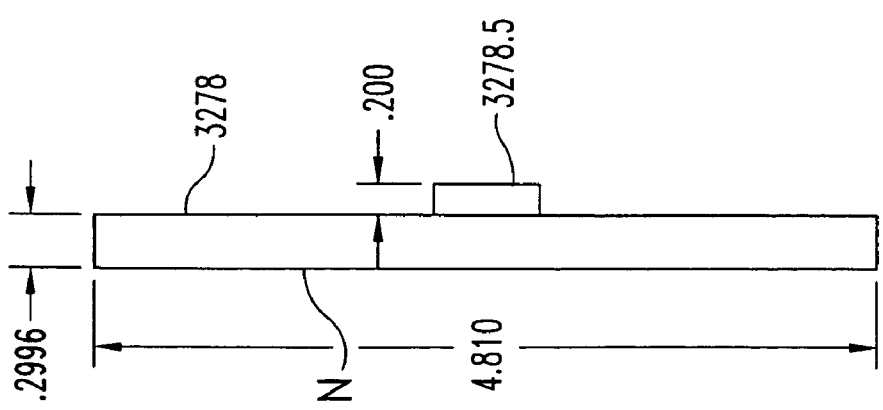
FIG. 61a is a side elevational view of the sliding adjustment member for the apparatus of FIG. 56.
Figure 63B:
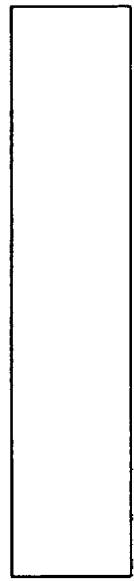
Figure 64B:
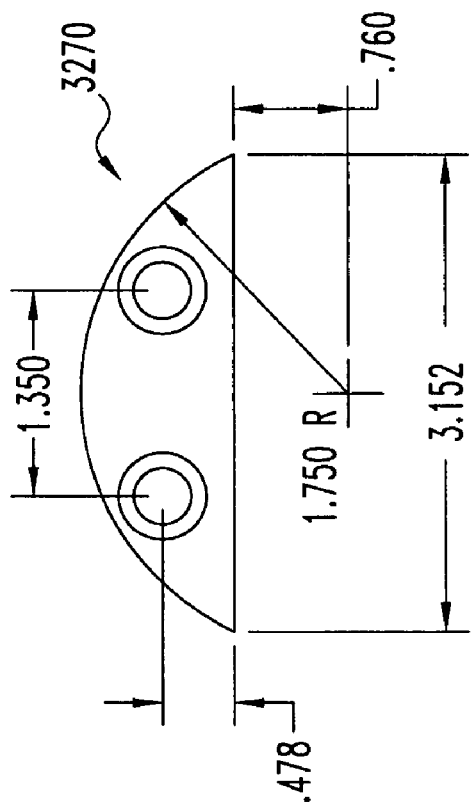
Figure 63A:
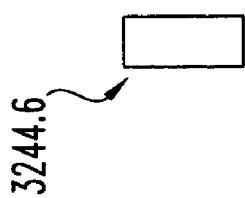
FIG. 63a is an end elevational view of a brake member as used in the apparatus of FIG. 56.
Figure 64A:
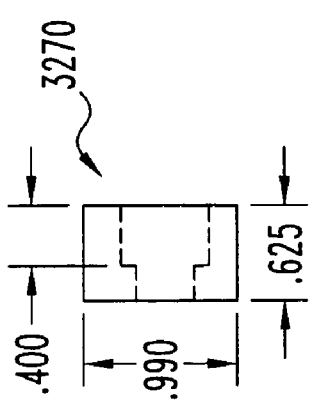
FIG. 64a is a side elevational view of a retention member as used in the apparatus of FIG. 56.

Referring to FIG. 60c, body 3238 preferably defines a plurality of spring pockets M and a generally rectangular brake pad pocket 3238.5. A coil spring or other biasing member presses against a surface of body 3238, and urges a brake pad 3244.5 against the underside of the underside N of adjustment member 3278 (as best seen in FIG. 61a). The biasing apparatus, such as coil springs, place a force on brake member 3244.5 which results in a frictional force to retain adjustment member 3278 in a particular location. Thus, boring tool apparatus 3220 includes frictional and/or damping mechanisms to retain both the adjustment member 3278 and the retained tool holder 3235.9 in location.

Referring to FIG. 59, placement of the brake member 3244.6 so as to apply frictional loads laterally to the centerline of boring tool 3220 results in an overall reduction in the length of boring tool 3220. This reduction in length further decreases the likelihood of tool chatter by reducing the weight of apparatus 3220.

Referring to FIG. 65b, changeable tool holder 3235.8 includes a pilot A1 projecting from a pair of pilots A1 projecting from the bottom thereof. Pilots A1 are received within bores B1 of tool holder 3235.9, as best seen in FIG. 62c. A set screw received within a perpendicular tapped hole provides a compression force to hold the changeable tool holder firmly within the retained tool holder.

Referring to FIGS. 66a and 66b, a changeable tool holder 3335.8 includes a pair of counterbored through slots. A fastener received within each of the slots clamps changeable tool holder 3335.8 to a retained tool holder 3335.9. Retained tool holder 3335.9 further includes a lengthwise channel B1 (as best seen in FIG. 69c) that slidingly receives rectangular projection A1 of changeable tool holder 3335.8 (as best seen in FIG. 71b). Tool holder 3335.9 includes a projection 3378.5 (FIG. 69b) that is slidingly received within slot 3335.4 of adjustment member 3378 (FIG. 68b). Referring again to FIG. 69b, retained tool holder 3335.9 defines a pair of pockets M which are adapted and configured to receive therein a generally rectangular piece of friction material 44, as previously described. One or more coil springs located within a pocket 3338.1 urge the brake member (not shown) against a first surface of N of adjustment member 3378 (FIG. 68a). A third separable brake member (not shown) is retained within pocket 3338.1B of body 3338 (as best seen in FIG. 67c). This third brake member is urged by one or more biasing members, such as coil springs within pockets 3338.1, against surface O of adjustment 3378 (FIG. 78a). Thus, adjustment member 3378 is "sandwiched" between frictional brake members that are biased so as to compress adjustment member 3378.

FIGS. 72a and 72b are front and side views, respectively, of an apparatus 3420 according to another embodiment of the present invention. In both of these views retaining members 3470 have been removed. When retaining members 3470 are in place, surface P and surface Q are at approximately the same height. With the members removed, it is possible to better see the brake members within apparatus 3420. Referring to FIG. 72a, the inner edges of two brake members 3444 can be seen between the top surface of adjustment member 3478 and the bottom surfaces of tool holders 3435a and 3435b. Another brake member 3444.6 can be seen in contact with the underside of adjustment member 3478. Biasing members such as coil springs urge brake members 3444 into frictional contact with the top surface of 3478. Additional biasing members, such as coil springs located within pockets of body 3438, urge brake member 3444.6 into frictional contact against 3478. Adjustment member 3478 is "sandwiched" between these frictional members. Brake member 3444.6 fits within pocket 3438p (FIG. 74c). A brake member 3444 fits within pockets 3435P of tool holders 3435a and 3435b (FIGS. 77a and 78a).

Referring to FIG. 73b, it can be seen that projections 3478.5a and 3478.5b (FIGS. 77c and 78c) are slidingly received within corresponding channels 3435.4 of adjustment member 3478 (FIG. 75b).

Referring to FIGS. 60b and 60c, frictional or damping mechanisms thus act between tool holder 3235.9 and surface L of body 3238. Separate frictional forces are applied by brake members 3244.5 within pockets M against adjusting member 3278. Thus, both the tool holder and adjusting member are separately dampened.

Referring to FIG. 79, some embodiments of the present invention include a body 3538 which has on it a plurality of grooves R on a surface Q. Surface Q is in sliding contact with a biased brake member. Grooves R assist in channeling away any lubricating fluid and/or cutting fluid that is used in the machining operation. Grooves R thus act similar to rain grooves in an automobile tire. Although grooves R are shown on a surface of a body 3538, the present invention contemplates the use of grooves at any of the frictional interfaces, where a brake member is in contact with another member. Further, although a semicircular pattern of grooves is shown, any pattern of closely spaced grooves is contemplated by the present invention. In one embodiment, these grooves have a radius of approximately 0.030 inches, and are approximately 0.030 inches deep.

Other embodiments of the present invention pertain to the use of a two-piece, separable tool holder. A first, changeable tool holder is fastened (such as by bolts) to a retained tool holder. The retained tool holder is adjustable in the manner described herein in the various embodiments by application of a force against a moving member of the boring tool apparatus. For example, the force can be placed directly against the retained tool holder, or can be placed against an adjustment member which is in sliding contact with the retained tool holder. Further, the embodiments including two-piece, separable tool holders are not limited to slidingly adjustable tool holders according to embodiments of the present invention, but are also applicable to conventional boring tool apparatus.

The retained slidable tool holder is adapted and configured to be in sliding contact with another component of the boring tool. The changeable tool holder is provided with a relatively simple interface and fastens to the retained tool holder. In this way, a variety of different changeable tool holders can be used with the same retained tool holder, thus decreasing the expensive tool inventory in a machine shop.

Yet other embodiments of the present invention pertain to the use of dampening in a boring tool assembly to reduce tool chatter. Those of ordinary skill in the art recognize that tool chatter is a time consuming, expensive, and damaging phenomenon in the area of machining. Tool chatter occurs when the cutting tool exhibits vibratory motion during machining. In some cases the chatter is a response initiated by contact of the cutting tool with the workpiece which results in vibratory motion of the cutting tool, the cutting tool holder, and other components of the boring tool assembly. This vibratory motion can be a result of bending or flexing of one or more components of the boring tool assembly, and can also be relative movement between two adjacent components of the boring tool assembly.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A system for boring a hole, comprising:
   a computer numerically controlled machining apparatus having a rotating drive member rotatable about an axis;
   a member with a first surface, the member being proximate said machining apparatus;
   a boring tool including a coupling member for coupling said boring tool to said drive member, a cutting tool holder slidably coupled to said boring tool, and a slidable adjustment member slidably coupled to said boring tool, said adjustment member having a second surface; and
   an electronic controller operably coupled to said machine, said controller performing an algorithm which adjusts the sliding position of said cutting tool holder by placing the first surface in contact with the second surface and applying a force thereacross.

2. The system of claim 1 wherein the second surface of said adjustment member is spaced apart from and external to the outer surface of said boring toot and application of the force pushes the second surface in a direction toward said boring tool.

3. The system of claim 1 wherein the second surface of said adjustment member is spaced apart from and external to the outer surface of said boring tool, and application of the force pulls the second surface in a direction away from said boring tool.

4. The system of claim 1 wherein said machining apparatus is a boring machine.

5. The system of claim 1 wherein said electronic controller is a computer with a memory and said algorithm is a software program.

6. A method for reducing tool chatter, comprising:
   providing a boring tool assembly including a body adapted and configured to be driven by a baring machine, a cutting tool holder adapted and configured to be retained by the body, and a cutting tool adapted and configured to be held by the cutting tool holder, and a separable member and a spring;
   biasing the separable member against one of to body or the cutting tool holder by the, spring; and
   placing the other end of the spring in contact wit the other of the body for the cutting tool holder.

7. The method of claim 6 wherein the separable member has a first surface, the one of the body or cutting tool holder has a second surface, said biasing results in the first surface being in contact with the second surface, and one of the first surface or the second surface is hardened.

8. The method of claim 6 wherein the separable member has a first surface, the one of the body or totting tool holder has a second surface, and one of the first surface or the second surface is coated with a friction-enhancing material.

9. The method of claim 6 wherein the separable member has a first surface, the one of the body or cutting tool holder has a second surface, and one of the first surface or the second surface is coated with a fiction-reducing material.

10. The method of claim 6 wherein the spring is a coil spring.

11. The method of claim 6 wherein the spring is a leaf spring.

12. The method of claim 6 wherein the spring is a Belleville spring.

13. A method for adjusting the position of a cutting tool holder for boring holes, comprising:
   providing a boring tool having a rotational axis and including a cutting tool holder slidable in a first direction and an adjustment member, to adjustment member being slidable in a second direction at least partly orthogonal to the rotational axis, wherein the second direction is different than the first direction;

sliding the adjustment member in the second direction;

coupling the movement of the adjustment member to the movement of the cutting tool holder; and sliding the cutting tool holder in the first direction by said sliding the adjustment member.

14. The method of claim 6 wherein the separable member has a first surface, the one of the body or cutting tool holder has a second surface, said biasing results in the first surface being in contact with the second surface, and one of the first surface or the second surface includes a treatment for modifying the sliding friction between the first surface and the second surface.

15. The method of claim 13 wherein the second direction is generally perpendicular to the rotational axis.

16. The method of claim 13 wherein said coupling includes a surface of the adjustment member being in contact with a surface of the cutting tool holder.

17. The method of claim 13 wherein the second direction is generally perpendicular to the rotational axis and the first direction is generally perpendicular to the rotational axis.

18. The method of claim 17 wherein first direction is generally perpendicular to the second direction.

19. An apparatus for machining a feature with a boring machine, comprising:

an adjustable position tool holder for holding a cutting tool;

a slidable adjustment member for adjusting the position of said tool holder and slidably coupled to said tool holder;

a coupling element for coupling the tool holder to the boring machine; said tool holder and said adjusting member being slidably coupled to said coupling element; and means for biasing said coupling element relative to said tool holder for providing a frictional force which resists motion of said tool holder relative to said coupling element;

wherein said coupling element is adapted and configured to rotate about an axis, said tool holder is slidable relative to said coupling element in a fist direction at least partly orthogonal to the axis, said adjustment member is slidable relative to said coupling element in a second direction different than the first direction, and said tool holder is adapted and configured to slide in the first direction in response to sliding of said adjustment member in the second direction.

20. The apparatus of claim 19 wherein said coupling member includes a first channel which slidably receives said tool holder and a second channel which slidably receives said adjustment member.

21. The method of claim 14 wherein the treatment is for reducing the coefficient of sliding friction between the first surface and the second surface.

22. The apparatus of claim 19 wherein the second direction is at least partly orthogonal to the first direction.

23. The apparatus of claim 19 wherein one of said adjustment member or said tool holder includes a first linear adjustment surface adapted and configured for sliding contact with a second adjustment surface of to other of said adjustment member or said tool holder, and the first adjustment surface is arranged at an angle which includes a directional component of the first direction and a directional component of the second direction.

24. An apparatus for machining a feature with a boring machine, comprising:

an adjustable position tool holder for holding a cutting tool;

a coupling element for coupling the tool holder to the boring machine, said tool holder being slidable relative to said coupling element in a first direction;

a slidable adjustment member slidably coupled to said coupling element and slidable in a second direction, said adjustment member having an external surface adapted and configured to be externally actuated;

wherein said tool holder, said coupling element and said adjustment member are adapted and configured such that said tool holder slides in the first direction in response to sliding of said adjustment member in the second direction, and said tool holder slides by a first amount in response to sliding of said adjustment member by a second amount, the first amount being less than the second amount.

25. The apparatus of claim 24 wherein the sliding motion of said adjustment member is translation and the sliding motion of said tool holder is translation.

26. The apparatus of claim 24 wherein the ratio of the second amount to the first amount is greater than about two to one.

27. The apparatus of claim 24 wherein said tool holder and said adjustment member are in sliding contact along a surface that is non-parallel to the first direction and non-parallel to the second direction.

28. The apparatus of claim 26 wherein the ratio of the second amount to the first amount is greater than or equal to about ten to one.

29. A method for adjusting the position of a cutting tool holder for boring holes, comprising:

providing a boring tool having a rotational axis and including a cutting tool holder slidable in a first direction and an adjustment member, the adjustment member being slidable in a second direction at least partly orthogonal to the rotational axis;

sliding the adjustment member in the second direction;

coupling the movement of the adjustment member to the movement of the cutting tool holder, a surface of the adjustment member being in contact with a surface of the cutting tool holder; and sliding the cutting tool holder in the first direction by said sliding the adjustment member.

30. The method of claim 29 wherein the second direction is generally perpendicular to the rotational axis and the first direction is generally perpendicular to the rotational axis.

31. The method of claim 29 wherein first direction is generally perpendicular to the second direction.

32. The system of claim 1 wherein said boring tool is adapted and configured to rotate about an axis, said cutting tool holder is slidable in a first direction at least partly orthogonal to the axis, said adjustment member is slidable in, a second direction different than the first direction, and said tool holder is adapted and configured to slide in the first direction in response to sliding of said adjustment member in the second direction.

33. The system of claim 32 wherein said cutting tool holder is slidable in a first range, said adjustment member is slidable in a second range, said tool holder slides in the first range by a first amount in response to sliding of said adjustment member in the second range by a second amount, and the second amount is greater than the first amount.

34. The system of claim 33 wherein the ratio of the second amount to the first amount is greater than or equal to about ten to one.

35. The system of claim 1 wherein said cutting tool holder is slidable in a first range, said adjustment member is slidable in a second range, said tool holder slides in the first range by a first amount in response to sliding of said adjustment member in the second range by a second amount, and the second amount is greater than the first amount.

36. The system of claim 35 wherein the ratio of the second amount to the first amount is greater than or equal to about ten to one.

37. The apparatus of claim 19 wherein said biasing means includes a hydraulic actuator.

38. The apparatus of claim 19 wherein said biasing means includes an electrical actuator.

39. The apparatus of claim 19 wherein said biasing means includes a spring.

40. The apparatus of claim 19 wherein said biasing means includes a pneumatic actuator.

41. The apparatus of claim 19 wherein said biasing means includes a centrifugal actuator.

42. The method of claim 14 wherein the treatment is for increasing the coefficient of sliding friction between the first surface and the second surface.

* * * * *

UNITED STATES PATENT AND TRADEMARK OFFICE
CERTIFICATE OF CORRECTION

PATENT NO. : 7,029,209 B2 Page 1 of 1
APPLICATION NO. : 10/424652
DATED : April 18, 2006
INVENTOR(S) : Richard A. Cardemon et al.

It is certified that error appears in the above-identified patent and that said Letters Patent is hereby corrected as shown below:

On the Title page of the patent, item (73) Assignee, please remove "Muncia" and insert in lieu thereof --Muncie--

Column 54, line 35, please delete "baring" and insert in lieu thereof --boring--.

Column 54, line 42, please delete "wit" and insert in lieu thereof --with--.

Column 54, line 50, please delete "totting" and insert in lieu thereof --cutting--.

Column 55, line 63, please delete "to" and insert in lieu thereof --the--.

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,029,209 B2  Page 1 of 1
APPLICATION NO. : 10/424652
DATED : April 18, 2006
INVENTOR(S) : Richard A. Cardemon et al.

It is certified that error appears in the above-identified patent and that said Letters Patent is hereby corrected as shown below:

In column 54, line 43, please delete "for" and insert in lieu thereof --or--.

Signed and Sealed this

Thirteenth Day of May, 2008

JON W. DUDAS
*Director of the United States Patent and Trademark Office*